United States Patent
Froy et al.

(10) Patent No.: US 9,558,620 B2
(45) Date of Patent: *Jan. 31, 2017

(54) SYSTEMS AND METHODS FOR MULTI-PLAYER REMOTE GAMING

(71) Applicant: IGT CANADA SOLUTIONS ULC, Moncton (CA)

(72) Inventors: David Froy, Lakeville-Westmorland (CA); Peter Babin, Dieppe (CA); Bharat Gadher, Dieppe (CA); Fayez Idris, Dieppe (CA); Dragan Pleskonjic, Belgrade (RS); Peter Post, Lieboch (AT); Andrew McIntyre, Halifax (CA)

(73) Assignee: IGT Canada Solutions ULC, Moncton (CA)

( * ) Notice: Subject to any disclaimer, the term of this patent is extended or adjusted under 35 U.S.C. 154(b) by 506 days.

This patent is subject to a terminal disclaimer.

(21) Appl. No.: 13/951,846

(22) Filed: Jul. 26, 2013

(65) Prior Publication Data

US 2013/0337895 A1  Dec. 19, 2013

Related U.S. Application Data

(63) Continuation of application No. 13/941,062, filed on Jul. 12, 2013, now Pat. No. 9,295,908, which is a
(Continued)

(30) Foreign Application Priority Data

Jan. 14, 2013 (CA) ..................................... 2801740
Jan. 14, 2013 (CA) ..................................... 2801741
Jan. 14, 2013 (WO) ................ PCT/CA2013/000027

(51) Int. Cl.
*G07F 17/32* (2006.01)
*A63F 13/30* (2014.01)
(Continued)

(52) U.S. Cl.
CPC .......... *G07F 17/3225* (2013.01); *A63F 13/12* (2013.01); *A63F 13/30* (2014.09); *A63F 13/323* (2014.09);
(Continued)

(58) Field of Classification Search
CPC .............. G07F 17/3218; G07F 17/3225; G07F 17/3227; G07F 17/3239; G07F 17/323; G07F 17/3267; G07F 17/3263; G07F 17/32; G07F 17/3262; A63F 13/32; A63F 13/79; A63F 2300/403

See application file for complete search history.

(56) References Cited

U.S. PATENT DOCUMENTS 3,940,136 A  2/1976 Runte
4,976,438 A  12/1990 Tashiro et al.
(Continued)

FOREIGN PATENT DOCUMENTS

AU  2012202208 A1  5/2012
AU  2013200781 A1  2/2013
(Continued)

OTHER PUBLICATIONS

Patent Cooperation Treaty, International Search Report and Written Opinion dated Sep. 13, 2013, issued on PCT Application No. PCT/CA2013/050053.
(Continued)

*Primary Examiner* — Damon Pierce
(74) *Attorney, Agent, or Firm* — Myers Bigel, P.A.

(57) ABSTRACT

A mobile gaming device may be a player's own personal tablet, smartphone, PDA, etc., with an application program installed via the internet for carrying out a remote gaming session. All gaming functions are carried out by a stationary gaming terminal communicating with the mobile device,
(Continued)

such as by using WiFi. The mobile device operates as a user interface The games involve a plurality of players.

54 Claims, 24 Drawing Sheets

Related U.S. Application Data continuation-in-part of application No. 13/738,780, filed on Jan. 10, 2013, now Pat. No. 9,079,098, said application No. 13/941,062 is a continuation-in-part of application No. 13/738,790, filed on Jan. 10, 2013, now Pat. No. 9,084,932, application No. 13/951,846, filed on Jul. 26, 2013, which is a continuation-in-part of application No. 13/722,518, filed on Dec. 20, 2012, now Pat. No. 8,696,428, and a continuation-in-part of application No. 13/722,543, filed on Dec. 20, 2012, now Pat. No. 8,858,316, and a continuation-in-part of application No. 13/722,587, filed on Dec. 20, 2012, now Pat. No. 8,715,061.

(60) Provisional application No. 61/586,547, filed on Jan. 13, 2012.

(51) Int. Cl.
*A63F 13/323* (2014.01)
*A63F 13/327* (2014.01)

(52) U.S. Cl.
CPC ......... *A63F 13/327* (2014.09); *G07F 17/3204* (2013.01); *G07F 17/3211* (2013.01); *G07F 17/3218* (2013.01); *G07F 17/3227* (2013.01); *G07F 17/3239* (2013.01); *G07F 17/3262* (2013.01)

(56) References Cited

U.S. PATENT DOCUMENTS

| | | |
|---|---|---|
| 5,114,157 A | 5/1992 | Kita |
| 6,607,441 B1 | 8/2003 | Acres |
| 6,846,238 B2 | 1/2005 | Wells |
| 7,140,962 B2 | 11/2006 | Okuda et al. |
| 7,682,239 B2 | 3/2010 | Friedman et al. |
| 7,804,995 B2 | 9/2010 | Lipton et al. |
| 7,976,372 B2 | 7/2011 | Baerlocher et al. |
| 8,235,811 B2 | 8/2012 | Joshi et al. |
| 8,430,408 B2 | 4/2013 | Baerlocher et al. |
| 2002/0122585 A1 | 9/2002 | Swift et al. |
| 2002/0142825 A1 | 10/2002 | Lark et al. |
| 2002/0185981 A1 | 12/2002 | Dietz et al. |
| 2003/0032479 A1 | 2/2003 | LeMay et al. |
| 2003/0064805 A1 | 4/2003 | Wells |
| 2004/0029636 A1 | 2/2004 | Wells |
| 2004/0218269 A1 | 11/2004 | Divelbiss et al. |
| 2005/0020278 A1 | 1/2005 | Krumm et al. |
| 2005/0117637 A1 | 6/2005 | Routhier et al. |
| 2005/0190180 A1 | 9/2005 | Jin et al. |
| 2006/0148547 A1 | 7/2006 | Montgomery et al. |
| 2007/0054738 A1 | 3/2007 | Muir |
| 2007/0219000 A1 | 9/2007 | Aida |
| 2007/0257101 A1 | 11/2007 | Alderucci et al. |
| 2007/0296859 A1 | 12/2007 | Suzuki |
| 2008/0020845 A1 | 1/2008 | Low et al. |
| 2008/0032787 A1 | 2/2008 | Low et al. |
| 2008/0102916 A1* | 5/2008 | Kovacs ............... G07F 17/3211 463/16 |
| 2008/0188308 A1 | 8/2008 | Shepherd et al. |
| 2008/0234040 A1 | 9/2008 | Davies |
| 2008/0268959 A1 | 10/2008 | Bryson et al. |
| 2008/0311971 A1 | 12/2008 | Dean |
| 2008/0318652 A1 | 12/2008 | Lima et al. |
| 2008/0318684 A1 | 12/2008 | Rofougaran |
| 2009/0143141 A1 | 6/2009 | Wells et al. |
| 2009/0197676 A1 | 8/2009 | Baerlocher et al. |
| 2009/0253487 A1 | 10/2009 | Gagner et al. |
| 2009/0325686 A1 | 12/2009 | Davis et al. |
| 2010/0130280 A1 | 5/2010 | Arezina et al. |
| 2010/0240445 A1 | 9/2010 | Friedman et al. |
| 2010/0267439 A1 | 10/2010 | Englman et al. |
| 2010/0285878 A1* | 11/2010 | Tarantino ............ G07F 17/3239 463/36 |
| 2010/0298040 A1 | 11/2010 | Joshi et al. |
| 2010/0317435 A1 | 12/2010 | Velu |
| 2011/0032329 A1 | 2/2011 | Bauza et al. |
| 2011/0045891 A1 | 2/2011 | Ansari |
| 2011/0201406 A1 | 8/2011 | Jaffe et al. |
| 2011/0250960 A1 | 10/2011 | Nguyen |
| 2011/0298795 A1 | 12/2011 | Van Der Heijden et al. |
| 2012/0004036 A1 | 1/2012 | Hill |
| 2012/0165101 A1 | 6/2012 | Krishnamoorthy et al. |
| 2012/0208623 A1 | 8/2012 | Friedman et al. |
| 2012/0270653 A1 | 10/2012 | Kareemi et al. |
| 2012/0294352 A1 | 11/2012 | Koum et al. |
| 2013/0019024 A1 | 1/2013 | Sheth et al. |
| 2013/0093752 A1 | 4/2013 | Yuan |
| 2013/0184070 A1 | 7/2013 | Gadher et al. |
| 2013/0184071 A1 | 7/2013 | Gadher et al. |

FOREIGN PATENT DOCUMENTS

| | | |
|---|---|---|
| CA | 2601560 A1 | 10/2006 |
| CA | 2660176 A1 | 3/2008 |
| CA | 2660176 A1 | 10/2012 |
| WO | 2008118800 A1 | 10/2008 |
| WO | 2009097538 A1 | 8/2009 |

OTHER PUBLICATIONS

Patent Cooperation Treaty, International Search Report and Written Opinion dated Apr. 9, 2013, issued on PCT Application No. PCT/CA2013/000027.
Ardagna et al.—Location Privacy in Pervasive Computing—Universita degli Studi di Milano—26013 Crema, Italy, 2006.
Poolsappasit; Ray—Towards Achieving Personalized Privacy for Location-Based Services—Transactions on Data Privacy 2 (2009) 77-99—Computer Science Department, Colorado State University, Fort Collins, Colorado 80523, USA.
United States Patent and Trademark Office, Office Action dated Jan. 27, 2015 issued on U.S. Appl. No. 13/861,278.
United States Patent and Trademark Office, Office Action dated Dec. 10, 2014 issued on U.S. Appl. No. 13/861,261.
United States Patent and Trademark Office, Office Action dated Dec. 8, 2014 issued on U.S. Appl. No. 13/861,264.
United States Patent and Trademark Office, Office Action dated Dec. 19, 2014 issued on U.S. Appl. No. 13/861,269.
United States Patent and Trademark Office, Office Action dated Dec. 3, 2014 issued on U.S. Appl. No. 13/861,274.
United States Patent and Trademark Office, Office Action dated Dec. 23, 2014 issued on U.S. Appl. No. 13/861,282.
United States Patent and Trademark Office, Office Action dated Jan. 26, 2015 issued on U.S. Appl. No. 13/738,790.
United States Patent and Trademark Office, Office Action dated Jan. 22, 2015 issued on U.S. Appl. No. 13/738,780.
United States Patent and Trademark Office, Notice of Allowance dated Mar. 2, 2015 issued on U.S. Appl. No. 13/861,282.
PCT/CA2013/050053 International Search Report and Written Opinion, 17 pages.
United States Patent and Trademark Office, Office Action Summary dated Mar. 12, 2014, issued on U.S. Appl. No. 13/722,543.
United States Patent and Trademark Office, Office Action Summary dated Nov. 19, 2013, issued on U.S. Appl. No. 13/722,587.
United States Patent and Trademark Office, Office Action Summary dated Sep. 6, 2013, issued on U.S. Appl. No. 13/722,518.
United States Patent and Trademark Office, Office Action dated Aug. 25, 2014, issued on U.S. Appl. No. 13/861,282.

(56) References Cited

OTHER PUBLICATIONS

Patent Cooperation Treaty, Written Opinion and International Search Report dated Oct. 30, 2013, issued on PCT Application No. PCT/CA2013/000636.
United States Patent and Trademark Office, Office Action dated Aug. 21, 2014, issued on U.S. Appl. No. 13/738,780.
United States Patent and Trademark Office, Office Action dated Aug. 29, 2014, issued on U.S. Appl. No. 13/738,790.
Canadian Intellectual Property Office, Office Action for corresponding CA Patent Application No. 2,801,740 dated Nov. 12, 2015.
Canadian Intellectual Property Office, Office Action for corresponding CA Patent Application No. 2,801,741 dated Nov. 12, 2015.
Canadian Office Action Corresponding to Application No. 2,821,175; Dated: Sep. 19, 2016; 4 pages.

* cited by examiner

SYSTEMS AND METHODS FOR MULTI-PLAYER REMOTE GAMING

CROSS-REFERENCE TO RELATED APPLICATIONS

This application is a continuation-in-part of U.S. patent application Ser. No. 13/941,062 filed Jul. 12, 2013 which is a continuation-in-part of U.S. patent application Ser. No. 13/738,780 filed Jan. 10, 2013, and U.S. patent application Ser. No. 13/738,790 filed Jan. 10, 2013, both of which claim the benefit of U.S. Provisional Patent Application No. 61/586,547 filed Jan. 13, 2012. This application also claims priority to International Patent Application No. PCT/CA2013/000027 filed Jan. 14, 2013, Canadian Patent Application No. 2,801,740 filed Jan. 14, 2013, and Canadian Patent Application No. 2,801,741 filed Jan. 14, 2013, both of which claim the benefit of U.S. Provisional Patent Application No. 61/586,547 filed Jan. 13, 2012. This application further claims priority to U.S. patent application Ser. Nos. 13/722,518, 13/722,543 and 13/722,587, all of which filed on Dec. 20, 2012. Each of the above-mentioned applications is hereby incorporated by reference in its entirety.

FIELD

Embodiments described herein relate to electronic gaming systems, such as gaming systems in casinos or other establishments, and, in particular, to a gaming systems where games may be recommended to a player.

INTRODUCTION

A player may play games on a gaming machine in a casino.

A wireless hand-held device, such as a tablet, may also be used to remotely play an otherwise conventional gaming machine in a casino. The gaming machine, for security and central monitoring/accounting purposes, may perform all the processing to deduct a bet from the remote player's stored bank of credits, randomly select a game outcome, determine the award to be paid to the player, and credit the player's bank of credits. The information processed by the gaming machine may be wirelessly communicated to the tablet, and the predetermined outcome may be displayed to the player (such as by displaying stopped reels). The tablet may function as a user interface and display.

The tablet may display on its screen essentially what the player would see if the player was at the gaming machine, but the gaming machine makes all the game decisions. Virtually all player inputs are performed via the tablet's touch screen.

When the tablet is in use, another player may not use the gaming machine. Alternatively, one player may play the gaming machine using the tablet, and another player may simultaneously and independently play the gaming machine in the conventional way.

One type of tablet is described in U.S. Pat. No. 6,846,238 to Wells, incorporated herein by reference.

Since the player may walk around the casino with the tablet and be distracted, various issues may arise. Some of these issues include actions to be taken in the event the communications link is broken during a game and actions to be taken if a maximum time between games is exceeded. The link can be broken by the player moving beyond the reception range, moving beyond an allowable range, interference, battery failure, or equipment malfunction.

In the Wells patent (column 20, lines 29-47), for example, the gaming machine internally stores video frames of the game outcome in the event there is a communications link failure during the game, since the tablet could not display the outcome of the game and the outcome needs to be later verified. In case of such a link failure, it is very important to eventually prove or reveal to the player the actual outcome of the game. In the Wells patent, if the communications link is broken between the time the player initiated the rotation of the reels and the time that the outcome should have been communicated to the tablet to stop the reels, the game displayed on the tablet stops, and the player does not see the outcome. The game is thus terminated. The player becomes confused and agitated by the failure of the system. If the communications link was broken due to the player walking out the reception area, the player must determine this herself and walk back toward the gaming machine console. The tablet must then re-establish communications with the gaming machine. For the player to then determine the outcome of the game, the player must somehow view the stored video frames at the gaming machine. Wells describes the game being "terminated" once the communications link becomes inactive (see column 27, lines 1-2; column 29, lines 35-36; column 31, lines 19-20; column 32, lines 44-47; and column 34, lines 1-3). Such termination of the game prior to the player seeing the result of the game is a significant drawback of the Wells tablet.

Losing the communications link between games, rather than during a game, is much less frustrating, and re-establishing the communications link does not require any verification of a game's outcome.

Accordingly, there exists a need for an improved technique for dealing with a communications link being broken in the middle of a game, or at least a useful alternative.

Further, in the Wells patent, there is no provision for allowing the player to temporarily suspend play without the system automatically terminating the playing session due to the period between games exceeding an allowable limit. A player may not be able to pause play for a legitimate reason and will lose rights to the gaming machine to another player.

Accordingly, there exists a need for an improved technique to allow the player to pause play on the tablet without the playing session being automatically terminated due to the period between games exceeding an allowable limit, or at least a useful alternative.

Another disadvantage of the Wells tablet is that it is customized for use as a gaming tablet to be used in conjunction with the licensed gaming machine (see column 12, lines 11-21). In one embodiment, the Wells tablet is a modified version of a commercially available tablet. This adds cost to the system since the casino must provide the tablets, and the players will initially be unfamiliar with the operation of the tablet, inhibiting wide spread acceptance of the system.

Accordingly, there exists a need for an improved mobile gaming device, such as a tablet, that is an off-the-shelf commercially available device, running a suitable application, that may be personally owned by the players and which communicates with licensed gaming machines located in the same jurisdiction in which the mobile gaming device is located, or at least a useful alternative.

It is known to access a gaming site via the internet using any suitable computing device, but such an internet connection only connects the computing device to a server running a gaming program, typically located outside of the United States. The server is not a licensed gaming machine in the jurisdiction in which the computing device is located. Therefore, operating the computing device to carry out the game may be illegal in the jurisdiction in which it is operated. Additionally, even operating such an internet-connected computing device in a jurisdiction that allows gaming does not typically authorize the player to operate the computing device for gaming purposes since the operation is not performed in an authorized venue.

There may be no provision to remotely select another gaming machine and automatically set up the communications link to the new machine. The remote player has no way of knowing which other games or other gaming machines are available for play. Further, the player may not be allowed to use the tablet for different gaming machines/servers in different gaming venues. There exists a need for improved recommendations of other games or other gaming machines that are available for play, or at least a useful alternative.

If the player does not have a central account, cashing out may not convenient since the player must either go to the gaming machine to receive a printed ticket or somehow identify the game on a separate printer terminal, such as by using a keypad.

Gaming machines and tablets may incorporate 3D image viewing capability, such as by having a lenticular lens over the screen to direct two interlaced stereoscopic images to the player's respective left and right eyes. There may be no provision for converting the gaming machine's 3D format of the original stereoscopic image to the tablet's particular 3D or 2D format. If the tablet does not have 3D capability, the original stereoscopic images cannot be displayed on the tablet's screen without appearing blurry. Further, with a gaming machine, the 3D image is tuned for a particular viewing distance, while the viewing distance for the tablet may be different, typically closer since the screen is much smaller. Embodiments described herein may allow the remote player to adjust the 3D viewing distance (or image depth).

There may be no forced prevention of the player initiating a game when the battery power runs low. Therefore, an incomplete game may result if the battery power runs out during a game.

SUMMARY

In one aspect, embodiments described herein relate to a remote gaming method comprising: establishing a communications link between a mobile gaming device operated by a player and a first gaming terminal, the mobile gaming device running a remote gaming program to play at least a first game, the first gaming terminal programmed to carry out at least the game functions of pseudo-randomly determining a game outcome and determining an award to a player; receiving player control signals by the first gaming terminal from the mobile gaming device to initiate the first game; carrying out the first game by the first gaming terminal, including determining a final outcome of the first game and any award for the outcome; transmitting signals from the first gaming terminal to the mobile gaming device identifying the final outcome of the first game and the award; detecting the player's real time game play; based on detecting the player's real time game play, determining a set of recommended games available to be played on the mobile gaming device; transmitting signals to the mobile gaming device identifying at least a second game of the set of recommended games; detecting a selection by the player of the second game; carrying out the second game, including determining a final outcome of the second game and any award for the outcome; and transmitting signals to the mobile gaming device identifying the final outcome of the second game and the award.

In some embodiments, the method may further comprise: operating the first gaming terminal in a first jurisdiction, the first gaming terminal being licensed for the first jurisdiction, the mobile gaming device being located in the first jurisdiction;

In some embodiments, the second game is available to be played on a second gaming terminal, wherein the method may further comprise: establishing a wireless communications link between the mobile gaming device and the second gaming terminal; transferring credits from the first gaming terminal to the second gaming terminal; carrying out the second game by the second gaming terminal; and transmitting signals by the second gaming terminal to the mobile gaming device identifying the final outcome of the second game and the award.

In some embodiments, the first gaming terminal is a gaming machine having a display screen, and wherein the gaming machine may be directly played using the display screen.

In some embodiments, the gaming machine and mobile gaming device are operated within a same venue.

In some embodiments, the mobile gaming device is not required to be licensed in the first jurisdiction.

In some embodiments, the player is playing anonymously, without the use of a player tracking card.

In some embodiments, the first gaming terminal and the second gaming terminal are located in different gaming venues.

In some embodiments, the method may further comprise: periodically controlling the mobile gaming device to communicate between a plurality of transceivers in a venue; using Received Signal Strength Indicator (RSSI) level signals derived by communications with the transceivers to determine whether the mobile gaming device is within a designated area within the venue; and if it is determined that the mobile gaming device is outside of the designated area, blocking the mobile gaming device from carrying out the first or second game.

In some embodiments, the first gaming terminal is licensed for use in a first gaming zone operated by a first operator, and the second gaming terminal is licensed for use in a second gaming zone operated by a second operator, wherein the player is located in the first gaming zone.

In some embodiments, at least a portion of revenue generated by the player playing the second type game is provided to the second operator.

In some embodiments, the method may further comprise: applying data from the player's real time game play to an algorithm to determine that the player is a certain type of player, then selecting the set of recommended games based on the certain type of player.

In some embodiments, the carrying out the first game by the first gaming terminal comprises displaying game animation on the mobile gaming device conveying to the player that the first game is presently occurring, and wherein the method further comprises: in the event of a communications link failure between the mobile gaming device and the first gaming terminal during the game, prior to receiving the signals by the mobile gaming device identifying the final outcome of the game and the award but after the game animation has begun, continuing the game animation by the mobile gaming device during the communications link failure for a time until the communications link has been re-established; once the communication link has been re-established, transmitting the signals to the mobile gaming device identifying the final outcome of the first game and the award, stopping the game animation; and displaying, by the mobile gaming device, the final outcome of the game and the award, such that the game perceived by the player is not interrupted during the communications link failure.

In some embodiments, the gaming program comprises game inactivity rules requiring game play within a maximum allowable time to prevent a remote gaming session from being terminated, and wherein the method further comprises: allowing the player to pause the remote gaming session by entering a command via the mobile gaming device to pause the remote gaming session for a certain time; suspending the game inactivity rules, by the first gaming terminal, for the certain time so the remote gaming session does not terminate due to game inactivity; receiving a first signal by the first gaming terminal indicating that the player is again using the mobile gaming device to play the first game; re-applying the game activity rules after the first signal is received; and terminating the gaming session if the player does not use the mobile gaming device to play the first game within the certain time.

In some embodiments, the method may further comprise: providing a stationary registration terminal within a first regulated gaming venue, the registration terminal having a transceiver for communicating with the mobile gaming device, operated by the player within the first regulated gaming venue, the registration terminal being coupled to a network with a plurality of gaming machines including a first gaming terminal; and establishing, via the registration terminal, the wireless communications link between the mobile gaming device and the first gaming terminal to play the first game.

In some embodiments, the registration terminal includes a printer, the method further comprising: identifying credits, by the registration terminal, associated with the first player; and printing out a ticket for redemption by the player.

In some embodiments, the first gaming terminal is located in a second regulated gaming venue and coupled to the network, wherein the first gaming terminal communicates with the mobile gaming device via the registration terminal.

In some embodiments, the plurality of gaming terminals includes gaming terminals located in the first regulated gaming venue and gaming terminals located in a second regulated gaming venue.

In some embodiments, the first gaming machine generate video animation in an original format when displaying a the first game on the display screen, wherein the method further comprises: detecting a required video animation second format for the mobile gaming device which is different from the original format; converting the video animation from the original format to the second format for the mobile gaming device; and displaying the game to the player on the mobile gaming device using the second format.

In some embodiments, the set of recommended games is associated with a gaming model of a plurality of gaming models, and wherein the method further comprises: detecting a threshold amount of data for the player's real time game play; partitioning the data for the player's real time game play into a plurality of game events; and determining that the gaming model corresponds to the one or more events of the plurality of game events.

In some embodiments, the set of recommended games is associated with a gaming model of a plurality of gaming models, and wherein the method further comprises: determining each of the plurality of models from collected game play data using cluster analysis; and associating a set of recommended games with each of the plurality of gaming models.

In some embodiments, the player's real time game play is associated with game factors, and wherein the gaming model comprises a collection of game factors representing a predetermined gaming and play behavior model of game player.

In some embodiments, the game factors comprise one or more members selected from the grouping consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

In some embodiments, the set of recommended games is associated with a game player type, wherein the game player type is associated with a gaming model of a plurality of gaming models, and wherein the method further comprises: detecting a threshold amount of data for the player's real time game play; determining the game player type based on analysis of the data for the player's real time game play determining that the gaming model corresponds to the game player type.

In some embodiments, the method may further comprise: transferring game assets to the mobile gaming device, wherein the game assets comprise game content for the first game or the second game; if it is determined that the mobile gaming device is outside of the designated area, deleting the game assets on the mobile gaming device.

In some embodiments, the first game or the second game comprises a wagering mode and a free mode, wherein the method further comprises: transferring game assets to the mobile gaming device, wherein the game assets comprise game content for the first game or the second game; carrying out, using the game assets, the first game or the second game in the wagering mode; if it is determined that the mobile gaming device is outside of the designated area, continuing to carry out, using the game assets, the first game or the second game in the free mode.

In some embodiments, the method may further comprise: collecting game play data corresponding to the player's real time game play; determining one or more processing, storing or transmitting actions permitted on the collected game play data based on user preferences and regulatory restrictions; and upon determining that the one or more processing, storing or transmitting actions are permitted on the collected game play data, performing the one or more processing, storing or transmitting actions are permitted on the collected game play data.

In some embodiments, the method may further comprise: providing, on a display of the mobile gaming device, a designated area assigned to the player as part of the first game, wherein there are additional designated areas assigned to different players; receiving a signal initiated by the player that identifies the player as an active player in the first game; initiating the display of an individual game in the designated area assigned to the player as part of the first game, while the remaining players have an option to concurrently play a community game displayed on the additional designated areas; concurrently displaying, on the mobile gaming device, a plurality of icons in the designated area assigned to the player, each icon being associated with a particular wager amount, wherein the icons concurrently displayed are associated with a plurality of different wager amounts, and wherein at least some of the icons are associated with a hidden prize; receiving a signal identifying a particular icon being touched; deducting the wager amount associated with the icon touched by the player from a bank of credits associated with the first player; and granting any award to the player associated with the icon touched by the player.

In another aspect, there is provided a remote gaming system comprising one or more processors and one or more data storage devices storing one or more sequences of instructions which, when executed by the one or more processors, causes the one or more processors to: establish a communications link between a mobile gaming device, operated by a player and a first gaming terminal, the mobile gaming device running a remote gaming program to play at least a first game, the first gaming terminal programmed to carry out at least the game functions of pseudo-randomly determining a game outcome and determining an award to a player; receive player control signals by the first gaming terminal from the mobile gaming device to initiate the first game; carry out the first game by the first gaming terminal, including determining a final outcome of the first game and any award for the outcome; transmit signals from the first gaming terminal to the mobile gaming device identifying the final outcome of the first game and the award; detect the player's real time game play; based on detecting the player's real time game play, determine a set of recommended games available to be played on the mobile gaming device; transmit signals to the mobile gaming device identifying at least a second game of the set of recommended games; detect a selection by the player of the second game; carry out the second game, including determining a final outcome of the second game and any award for the outcome; and transmit signals to the mobile gaming device identifying the final outcome of the second game and the award.

In a further aspect, there is provided a computer-readable storage medium storing one or more sequences of instructions which, when executed by one or more processors, causes the one or more processors to perform a method of remote gaming, the method comprising: establishing a communications link between a mobile gaming device, operated by a player and a first gaming terminal, the mobile gaming device running a remote gaming program to play at least a first game, the first gaming terminal programmed to carry out at least the game functions of pseudo-randomly determining a game outcome and determining an award to a player; providing player control signals to the first gaming terminal from the mobile gaming device to initiate the first game; carrying out the first game via the first gaming terminal, including determining a final outcome of the first game and any award for the outcome; receiving signals from the first gaming terminal at the mobile gaming device identifying the final outcome of the first game and the award; detecting the player's real time game play for use in determining a set of recommended games available to be played on the mobile gaming device; receiving signals at the mobile gaming device identifying at least a second game of the set of recommended games; detecting a selection by the player of the second game; carrying out the second game, including determining a final outcome of the second game and any award for the outcome; and receiving signals at the mobile gaming device identifying the final outcome of the second game and the award.

In another aspect, there is provided a remote gaming method comprising: providing a stationary registration terminal within a first regulated gaming venue, the registration terminal having a transceiver for communicating with a mobile gaming device, operated by a player within the first regulated gaming venue, the registration terminal being connected in a network with a plurality of gaming machines including a first gaming terminal; establishing, via the registration terminal, a wireless communications link between the mobile gaming device and the first gaming terminal to play at least a first game; receiving player control signals by the first gaming terminal from the mobile gaming device to initiate the first game; carrying out the first game by the first gaming terminal, including determining a final outcome of the first game and any award for the outcome; transmitting signals from the first gaming terminal to the mobile gaming device identifying the final outcome of the first game and the award.

In some embodiments, the method may further comprise: detecting a selection by the player of the second game; carrying out the second game, including determining a final outcome of the second game and any award for the outcome; and transmitting signals to the mobile gaming device identifying the final outcome of the second game and the award.

In some embodiments, the second game is available to be played on a second gaming terminal, wherein the method further comprises: establishing, via the registration terminal, a wireless communications link between the mobile gaming device and the second gaming terminal; transferring credits, via the registration terminal, from the first gaming terminal to the second gaming terminal; carrying out the second game by the second gaming terminal; and transmitting signals by the second gaming terminal to the mobile gaming device identifying the final outcome of the second game and the award.

In some embodiments, the first gaming terminal and the second gaming terminal are located in different gaming venues.

In some embodiments, the first gaming terminal is licensed for use in a first gaming zone operated by a first operator, and the second gaming terminal is licensed for use in a second gaming zone operated by a second operator, wherein the player is located in the first gaming zone.

In some embodiments, at least a portion of revenue generated by the player playing the second type game is provided to the second operator.

In some embodiments, the method may further comprise: detecting the player's real time game play; based on detecting the player's real time game play, determining a set of recommended games available to be played on the mobile gaming device, wherein the set of recommended games comprises the second game; transmitting signals to the mobile gaming device identifying at least the second game of the set of recommended games.

In some embodiments, the method may further comprise: applying data from the player's real time game play to an algorithm to determine that the player is a certain type of player, then selecting the set of recommended games based on the certain type of player.

In some embodiments, the set of recommended games is associated with a gaming model of a plurality of gaming models, and wherein the method further comprises: detecting a threshold amount of data for the player's real time game play; partitioning the data for the player's real time game play into a plurality of game events; and determining that the gaming model corresponds to the one or more events of the plurality of game events.

In some embodiments, the set of recommended games is associated with a gaming model of a plurality of gaming models, and wherein the method further comprises: determining each of the plurality of models from collected game play data using cluster analysis; and associating a set of recommended games with each of the plurality of gaming models.

In some embodiments, the player's real time game play is associated with game factors, and wherein the gaming model comprises a collection of game factors representing a predetermined gaming and play behavior model of game player.

In some embodiments, the game factors comprise one or more members selected from the grouping consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

In some embodiments, the set of recommended games is associated with a game player type, wherein the game player type is associated with a gaming model of a plurality of gaming models, and wherein the method further comprises: detecting a threshold amount of data for the player's real time game play; determining the game player type based on analysis of the data for the player's real time game play determining that the gaming model corresponds to the game player type.

In some embodiments, the mobile gaming device is automatically identified by the registration terminal using a Near Field Communications (NFC) protocol.

In some embodiments, the first gaming terminal is located in a second regulated gaming venue, wherein the first gaming terminal communicates with the mobile gaming device via a network in the second regulated gaming venue.

In some embodiments, the plurality of gaming terminals includes gaming terminals located in the first regulated gaming venue and gaming terminals located in a second regulated gaming venue.

In some embodiments, the registration terminal acts a communications hub between the mobile gaming device and the first gaming terminal.

In some embodiments, the player is playing anonymously, without the use of a player tracking card.

In some embodiments, the registration terminal includes a printer, the method further comprising; identifying credits, by the registration terminal, associated with the first player; and printing out a ticket for redemption by the player.

In some embodiments, the mobile gaming device wirelessly transmit codes to the registration terminal identifying credits for being redeemed by the player.

In some embodiments, the method may further comprise periodically controlling the mobile gaming device to communicate between a plurality of transceivers in a venue; using Received Signal Strength Indicator (RSSI) level signals derived by communications with the transceivers to determine whether the mobile gaming device is within a designated area within the venue; and if it is determined that the mobile gaming device is outside of the designated area, blocking the mobile gaming device from carrying out the first game.

In some embodiments, the method may further comprise transferring game assets to the mobile gaming device, wherein the game assets comprise game content for the first game or the second game; if it is determined that the mobile gaming device is outside of the designated area, deleting the game assets on the mobile gaming device.

In some embodiments, the first game or the second game comprises a wagering mode and a free mode, wherein the method further comprises: transferring game assets to the mobile gaming device, wherein the game assets comprise game content for the first game or the second game; carrying out, using the game assets, the first game or the second game in the wagering mode; if it is determined that the mobile gaming device is outside of the designated area, continuing to carry out, using the game assets, the first game or the second game in the free mode.

In some embodiments, the carrying out the first game by the first gaming terminal comprises displaying game animation on the mobile gaming device conveying to the player that the first game is presently occurring, and wherein the method further comprises: in the event of a communications link failure between the mobile gaming device and the first gaming terminal during the game, prior to receiving the signals by the mobile gaming device identifying the final outcome of the game and the award but after the game animation has begun, continuing the game animation by the mobile gaming device during the communications link failure for a time until the communications link has been re-established; once the communication link has been re-established, transmitting the signals to the mobile gaming device identifying the final outcome of the first game and the award, stopping the game animation; and displaying, by the mobile gaming device, the final outcome of the game and the award, such that the game perceived by the player is not interrupted during the communications link failure.

In some embodiments, the gaming program comprises game inactivity rules requiring game play within a maximum allowable time to prevent a remote gaming session from being terminated, and wherein the method further comprises: allowing the player to pause the remote gaming session by entering a command via the mobile gaming device to pause the remote gaming session for a certain time; suspending the game inactivity rules, by the first gaming terminal, for the certain time so the remote gaming session does not terminate due to game inactivity; receiving a first signal by the first gaming terminal indicating that the player is again using the mobile gaming device to play the first game; re-applying the game activity rules after the first signal is received; and terminating the gaming session if the player does not use the mobile gaming device to play the first game within the certain time.

In some embodiments, the first gaming machine generates video animation in an original format when displaying a the first game on the display screen, wherein the method further comprises: detecting a required video animation second format for the mobile gaming device which is different from the original format; converting the video animation from the original format to the second format for the mobile gaming device; and displaying the game to the player on the mobile gaming device using the second format.

In some embodiments, the method may further comprise collecting game play data corresponding to the player's real time game play; determining one or more processing, storing or transmitting actions permitted on the collected game play data based on user preferences and regulatory restrictions; and upon determining that the one or more processing, storing or transmitting actions are permitted on the collected game play data, performing the one or more processing, storing or transmitting actions that are permitted on the collected game play data.

In some embodiments, the method may further comprise providing, on a display of the mobile gaming device, a designated area assigned to the player as part of the first game, wherein there are additional designated areas assigned to different players;

receiving a signal initiated by the player that identifies the player as an active player in the first game; initiating the display of an individual game in the designated area assigned to the player as part of the first game, while the remaining players have an option to concurrently play a community game displayed on the additional designated areas; concurrently displaying, on the mobile gaming device, a plurality of icons in the designated area assigned to the player, each icon being associated with a particular wager amount, wherein the icons concurrently displayed are associated with a plurality of different wager amounts, and wherein at least some of the icons are associated with a hidden prize; receiving a signal identifying a particular icon being touched; deducting the wager amount associated with the icon touched by the player from a bank of credits associated with the first player; and granting any award to the player associated with the icon touched by the player.

In another aspect, there is provided a remote gaming system comprising one or more processors and one or more data storage devices storing one or more sequences of instructions which, when executed by the one or more processors, causes the one or more processors to: provide a stationary registration terminal within a first regulated gaming venue, the registration terminal having a transceiver for communicating with a mobile gaming device, operated by a player within the first regulated gaming venue, the registration terminal being connected in a network with a plurality of gaming machines including a first gaming terminal; establish, via the registration terminal, a wireless communications link between the mobile gaming device and the first gaming terminal to play at least a first game; receive player control signals by the first gaming terminal from the mobile gaming device to initiate the first game; carry out the first game by the first gaming terminal, including determining a final outcome of the first game and any award for the outcome; transmit signals from the first gaming terminal to the mobile gaming device identifying the final outcome of the first game and the award.

In a further aspect, there is provided a computer-readable storage medium storing one or more sequences of instructions which, when executed by one or more processors, causes the one or more processors to perform a method of remote gaming, the method comprising: providing a stationary registration terminal within a first regulated gaming venue, the registration terminal having a transceiver for communicating with a mobile gaming device, operated by a player within the first regulated gaming venue, the registration terminal being connected in a network with a plurality of gaming machines including a first gaming terminal establishing, via the registration terminal, a wireless communications link between the mobile gaming device and the first gaming terminal to play at least a first game; receiving player control signals by the first gaming terminal from the mobile gaming device to initiate the first game; carrying out the first game by the first gaming terminal, including determining a final outcome of the first game and any award for the outcome; transmitting signals from the first gaming terminal to the mobile gaming device identifying the final outcome of the first game and the award.

In another aspect, there is provided a remote gaming method comprising: establishing a wireless communications link between the mobile gaming device operated by a player and a first gaming terminal, the gaming machine generating video animation in an original format when displaying a first game on the display screen; receiving player control signals by the first gaming terminal from the mobile gaming device to initiate the first game; detecting a required video animation second format for the mobile gaming device which is different from the original format; providing the video animation second format for the mobile gaming device; displaying the game to the player on the mobile gaming device using the second format; carrying out the first game by the first gaming terminal, including determining a final outcome of the first game and any award for the outcome; and transmitting signals from the first gaming terminal to the mobile gaming device identifying the final outcome of the first game and the award.

In some embodiments, the method further comprises converting the video animation from the original format to the second format for the mobile gaming device.

In some embodiments, the method further comprises converting the video animation from the original format to the second format for the mobile gaming device by the gaming machine performing the converting.

In some embodiments, the method further comprises converting the video animation from the original format to the second format for the mobile gaming device by the mobile gaming device performing the converting.

In some embodiments, the method further comprises transmitting by the mobile gaming device to the gaming machine information used by the gaming machine to determine whether converting the video animation from the original format to the second format is to be performed by the gaming machine or the mobile gaming device.

In some embodiments, the original format is a 3D format, wherein 3D images displayed on the display screen of the gaming machine have a first depth determined by an assumed viewing distance between the player and the display screen, and the 3D images displayed on the mobile gaming device are controlled by the player to have a selected depth based on the player's viewing distance from the mobile gaming device.

In some embodiments, the method further comprises further comprising identifying the video animation second format from a plurality of video animation formats.

In some embodiments, the original format is a 3D format.

In some embodiments, the second format is a 3D format.

In some embodiments, the second format is a 2D format.

In some embodiments, the method further comprises providing a stationary registration terminal within a first regulated gaming venue, the registration terminal having a transceiver for communicating with a mobile gaming device, within the first regulated gaming venue, the registration terminal being connected in a network with a plurality of gaming machines including a first gaming terminal; and establishing the wireless communications link via the registration terminal.

In some embodiments, the method further comprises detecting the player's real time game play; based on detecting the player's real time game play, determining a set of recommended games available to be played on the mobile gaming device;

transmitting signals to the mobile gaming device identifying at least a second game of the set of recommended games; detecting a selection by the player of the second game, the gaming machine generating video animation in an original format when displaying the second game on the display screen; receiving player control signals by the first gaming terminal from the mobile gaming device to initiate the second game; providing a video animation second format of the second game for the mobile gaming device; displaying the second game to the player on the mobile gaming device using the second format; carrying out the second game, including determining a final outcome of the second game and any award for the outcome; and transmitting signals to the mobile gaming device identifying the final outcome of the second game and the award.

In some embodiments, the method further comprises applying data from the player's real time game play to an algorithm to determine that the player is a certain type of player, then selecting the set of recommended games based on the certain type of player.

In some embodiments, the set of recommended games is associated with a gaming model of a plurality of gaming models, and wherein the method further comprises: detecting a threshold amount of data for the player's real time game play; partitioning the data for the player's real time game play into a plurality of game events; and determining that the gaming model corresponds to the one or more events of the plurality of game events.

In some embodiments, the set of recommended games is associated with a gaming model of a plurality of gaming models, and wherein the method further comprises: determining each of the plurality of models from collected game play data using cluster analysis; and associating a set of recommended games with each of the plurality of gaming models.

In some embodiments, the player's real time game play is associated with game factors, and wherein the gaming model comprises a collection of game factors representing a predetermined gaming and play behavior model of game player.

In some embodiments, the game factors comprise one or more members selected from the grouping consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

In some embodiments, the set of recommended games is associated with a game player type, wherein the game player type is associated with a gaming model of a plurality of gaming models, and wherein the method further comprises: detecting a threshold amount of data for the player's real time game play; determining the game player type based on analysis of the data for the player's real time game play determining that the gaming model corresponds to the game player type.

In some embodiments, the player is playing anonymously, without the use of a player tracking card.

In some embodiments, the method further comprises periodically controlling the mobile gaming device to communicate between a plurality of transceivers in a venue; using Received Signal Strength Indicator (RSSI) level signals derived by communications with the transceivers to determine whether the mobile gaming device is within a designated area within the venue; and if it is determined that the mobile gaming device is outside of the designated area, blocking the mobile gaming device from carrying out the first game.

In some embodiments, the method further comprises transferring game assets to the mobile gaming device, wherein the game assets comprise game content for the first game or the second game; if it is determined that the mobile gaming device is outside of the designated area, deleting the game assets on the mobile gaming device.

In some embodiments, the first game or the second game comprises a wagering mode and a free mode, wherein the method further comprises: transferring game assets to the mobile gaming device, wherein the game assets comprise game content for the first game or the second game; carrying out, using the game assets, the first game or the second game in the wagering mode; if it is determined that the mobile gaming device is outside of the designated area, continuing to carry out, using the game assets, the first game or the second game in the free mode.

In some embodiments the carrying out the first game by the first gaming terminal comprises displaying game animation on the mobile gaming device conveying to the player that the first game is presently occurring, and wherein the method further comprises: in the event of a communications link failure between the mobile gaming device and the first gaming terminal during the game, prior to receiving the signals by the mobile gaming device identifying the final outcome of the game and the award but after the game animation has begun, continuing the game animation by the mobile gaming device during the communications link failure for a time until the communications link has been re-established; once the communication link has been re-established, transmitting the signals to the mobile gaming device identifying the final outcome of the first game and the award, stopping the game animation; and displaying, by the mobile gaming device, the final outcome of the game and the award, such that the game perceived by the player is not interrupted during the communications link failure.

In some embodiments, the gaming terminal comprises game inactivity rules requiring game play within a maximum allowable time to prevent a remote gaming session from being terminated, and wherein the method further comprises: allowing the player to pause the remote gaming session by entering a command via the mobile gaming device to pause the remote gaming session for a certain time; suspending the game inactivity rules, by the first gaming terminal, for the certain time so the remote gaming session does not terminate due to game inactivity; receiving a first signal by the first gaming terminal indicating that the player is again using the mobile gaming device to play the first game; re-applying the game activity rules after the first signal is received; and terminating the gaming session if the player does not use the mobile gaming device to play the first game within the certain time.

In some embodiments, the method further comprises collecting game play data corresponding to the player's real time game play; determining one or more processing, storing or transmitting actions permitted on the collected game play data based on user preferences and regulatory restrictions; and upon determining that the one or more processing, storing or transmitting actions are permitted on the collected game play data, performing the one or more processing, storing or transmitting actions that are permitted on the collected game play data.

In some embodiments, the method further comprises providing, on a display of the mobile gaming device using the second format, a designated area assigned to the player as part of the first game, wherein there are additional designated areas assigned to different players; receiving a signal initiated by the player that identifies the player as an active player in the first game; initiating the display of an individual game in the designated area assigned to the player as part of the first game using the second format, while the remaining players have an option to concurrently play a community game displayed on the additional designated areas; concurrently displaying, on the mobile gaming device using the second format, a plurality of icons in the designated area assigned to the player, each icon being associated with a particular wager amount, wherein the icons concurrently displayed are associated with a plurality of different wager amounts, and wherein at least some of the icons are associated with a hidden prize; receiving a signal identifying a particular icon being touched; deducting the wager amount associated with the icon touched by the player from a bank of credits associated with the first player; and granting any award to the player associated with the icon touched by the player.

In another aspect, there is provided a remote gaming system comprising one or more processors and one or more data storage devices storing one or more sequences of instructions which, when executed by the one or more processors, causes the one or more processors to: establish a wireless communications link between the mobile gaming device operated by a player and a first gaming terminal, the gaming machine generating video animation in an original format when displaying a first game on the display screen; receive player control signals by the first gaming terminal from the mobile gaming device to initiate the first game; detect a required video animation second format for the mobile gaming device which is different from the original format; provide the video animation second format for the mobile gaming device; display the game to the player on the mobile gaming device using the second format; carry out the first game by the first gaming terminal, including determining a final outcome of the first game and any award for the outcome; and transmit signals from the first gaming terminal to the mobile gaming device identifying the final outcome of the first game and the award.

In a further aspect, there is provided a computer-readable storage medium storing one or more sequences of instructions which, when executed by one or more processors, causes the one or more processors to perform a method of remote gaming, the method comprising: establishing a wireless communications link between the mobile gaming device operated by a player and a first gaming terminal, the gaming machine generating video animation in an original format when displaying a first game on the display screen; receiving player control signals by the first gaming terminal from the mobile gaming device to initiate the first game; detecting a required video animation second format for the mobile gaming device which is different from the original format; providing the video animation second format for the mobile gaming device; displaying the game to the player on the mobile gaming device using the second format; carrying out the first game by the first gaming terminal, including determining a final outcome of the first game and any award for the outcome; and transmitting signals from the first gaming terminal to the mobile gaming device identifying the final outcome of the first game and the award.

In another aspect, there is provided remote gaming method comprising: establishing a wireless communications link between the mobile gaming device operated by a player and the first gaming terminal to play at least a first game; receiving player control signals by the first gaming terminal from the mobile gaming device to initiate the first game; carrying out the first game by the first gaming terminal, including determining a final outcome of the first game and any award for the outcome; displaying game animation on the mobile gaming device conveying to the player that the first game is presently occurring; transmitting signals from the first gaming terminal to the mobile gaming device identifying the final outcome of the first game and the award; in the event of a communications link failure between the mobile gaming device and the first gaming terminal during the game, prior to receiving the signals by the mobile gaming device identifying the final outcome of the game and the award but after the game animation has begun, continuing the game animation by the mobile gaming device during the communications link failure for a time until the communications link has been re-established; once the communication link has been re-established, transmitting the signals to the mobile gaming device identifying the final outcome of the first game and the award, stopping the game animation; and displaying, by the mobile gaming device, the final outcome of the game and the award, such that the game perceived by the player is not interrupted during the communications link failure.

In some embodiments, the method may further comprise providing a stationary registration terminal within a first regulated gaming venue, the registration terminal having a transceiver for communicating with the mobile gaming device operated by the player within the first regulated gaming venue, the registration terminal being connected in a network with a plurality of gaming machines including a first gaming terminal; and establishing the communication link using the registration terminal.

In some embodiments, the method may further comprise detecting a selection by the player of a second game; carrying out the second game, including determining a final outcome of the second game and any award for the outcome; and transmitting signals to the mobile gaming device identifying the final outcome of the second game and the award.

In some embodiments, the second game is available to be played on a second gaming terminal, wherein the method further comprises: establishing a wireless communications link between the mobile gaming device and the second gaming terminal; transferring credits, via the registration terminal, from the first gaming terminal to the second gaming terminal; carrying out the second game by the second gaming terminal; and transmitting signals by the second gaming terminal to the mobile gaming device identifying the final outcome of the second game and the award.

In some embodiments, the first gaming terminal and the second gaming terminal are located in different gaming venues.

In some embodiments, the first gaming terminal is licensed for use in a first gaming zone operated by a first operator, and the second gaming terminal is licensed for use in a second gaming zone operated by a second operator, wherein the player is located in the first gaming zone.

In some embodiments, at least a portion of revenue generated by the player playing the second type game is provided to the second operator.

In some embodiments, the method may further comprise detecting the player's real time game play; based on detecting the player's real time game play, determining a set of recommended games available to be played on the mobile gaming device, wherein the set of recommended games comprises the second game; transmitting signals to the mobile gaming device identifying at least the second game of the set of recommended games.

In some embodiments, the method may further comprise applying data from the player's real time game play to an algorithm to determine that the player is a certain type of player, then selecting the set of recommended games based on the certain type of player.

In some embodiments, the set of recommended games is associated with a gaming model of a plurality of gaming models, and wherein the method further comprises: detecting a threshold amount of data for the player's real time game play;

partitioning the data for the player's real time game play into a plurality of game events; and determining that the gaming model corresponds to the one or more events of the plurality of game events.

In some embodiments, the set of recommended games is associated with a gaming model of a plurality of gaming models, and wherein the method further comprises: determining each of the plurality of models from collected game play data using cluster analysis; and associating a set of recommended games with each of the plurality of gaming models.

In some embodiments, the player's real time game play is associated with game factors, and wherein the gaming model comprises a collection of game factors representing a predetermined gaming and play behavior model of game player.

In some embodiments, the game factors comprise one or more members selected from the grouping consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

In some embodiments, the set of recommended games is associated with a game player type, wherein the game player type is associated with a gaming model of a plurality of gaming models, and wherein the method further comprises: detecting a threshold amount of data for the player's real time game play; determining the game player type based on analysis of the data for the player's real time game play; determining that the gaming model corresponds to the game player type.

In some embodiments, the mobile gaming device is automatically identified using a Near Field Communications (NFC) protocol.

In some embodiments, the first gaming terminal is located in a second regulated gaming venue, wherein the first gaming terminal communicates with the mobile gaming device via a network in the second regulated gaming venue.

In some embodiments, the player is playing anonymously, without the use of a player tracking card.

In some embodiments, the method may further comprise periodically controlling the mobile gaming device to communicate between a plurality of transceivers in a venue; using Received Signal Strength Indicator (RSSI) level signals derived by communications with the transceivers to determine whether the mobile gaming device is within a designated area within the venue; and if it is determined that the mobile gaming device is outside of the designated area, blocking the mobile gaming device from carrying out the first game.

In some embodiments, the method may further comprise transferring game assets to the mobile gaming device, wherein the game assets comprise game content for the first game; if it is determined that the mobile gaming device is outside of the designated area, deleting the game assets on the mobile gaming device.

In some embodiments, the first game comprises a wagering mode and a free mode, wherein the method further comprises: transferring game assets to the mobile gaming device, wherein the game assets comprise game content for the first game; carrying out, using the game assets, the first game in the wagering mode; if it is determined that the mobile gaming device is outside of the designated area, continuing to carry out, using the game assets, the first game in the free mode.

In some embodiments, the gaming program comprises game inactivity rules requiring game play within a maximum allowable time to prevent a remote gaming session from being terminated, and wherein the method further comprises: allowing the player to pause the remote gaming session by entering a command via the mobile gaming device to pause the remote gaming session for a certain time; suspending the game inactivity rules, by the first gaming terminal, for the certain time so the remote gaming session does not terminate due to game inactivity; receiving a first signal by the first gaming terminal indicating that the player is again using the mobile gaming device to play the first game; re-applying the game activity rules after the first signal is received; and terminating the gaming session if the player does not use the mobile gaming device to play the first game within the certain time.

In some embodiments, the first gaming machine generates video animation in an original format when displaying a the first game on the display screen, wherein the method further comprises: detecting a required video animation second format for the mobile gaming device which is different from the original format; converting the video animation from the original format to the second format for the mobile gaming device; and displaying the game to the player on the mobile gaming device using the second format.

In some embodiments, the method may further comprise collecting game play data corresponding to the player's real time game play; determining one or more processing, storing or transmitting actions permitted on the collected game play data based on user preferences and regulatory restrictions; and upon determining that the one or more processing, storing or transmitting actions are permitted on the collected game play data, performing the one or more processing, storing or transmitting actions that are permitted on the collected game play data.

In some embodiments, the method may further comprise providing, on a display of the mobile gaming device as part of the animation, a designated area assigned to the player as part of the first game, wherein there are additional designated areas assigned to different players; receiving a signal initiated by the player that identifies the player as an active player in the first game; initiating the display of an individual game in the designated area assigned to the player as part of the first game, while the remaining players have an option to concurrently play a community game displayed on the additional designated areas; concurrently displaying, on the mobile gaming device as part of the animation, a plurality of icons in the designated area assigned to the player, each icon being associated with a particular wager amount, wherein the icons concurrently displayed are associated with a plurality of different wager amounts, and wherein at least some of the icons are associated with a hidden prize; receiving a signal identifying a particular icon being touched; deducting the wager amount associated with the icon touched by the player from a bank of credits associated with the first player; and granting any award to the player associated with the icon touched by the player.

In another aspect, there is provided a remote gaming system comprising one or more processors and one or more data storage devices storing one or more sequences of instructions which, when executed by the one or more processors, causes the one or more processors to: establish a wireless communications link between the mobile gaming device operated by a player and the first gaming terminal to play at least a first game; receive player control signals by the first gaming terminal from the mobile gaming device to initiate the first game; carry out the first game by the first gaming terminal, including determining a final outcome of the first game and any award for the outcome; display game animation on the mobile gaming device conveying to the player that the first game is presently occurring; transmit signals from the first gaming terminal to the mobile gaming device identifying the final outcome of the first game and the award; in the event of a communications link failure between the mobile gaming device and the first gaming terminal during the game, prior to receiving the signals by the mobile gaming device identifying the final outcome of the game and the award but after the game animation has begun, continue the game animation by the mobile gaming device during the communications link failure for a time until the communications link has been re-established; once the communication link has been re-established, transmitting the signals to the mobile gaming device identifying the final outcome of the first game and the award, stop the game animation; and display, by the mobile gaming device, the final outcome of the game and the award, such that the game perceived by the player is not interrupted during the communications link failure.

In a further aspect, there is provided, a computer-readable storage medium storing one or more sequences of instructions which, when executed by one or more processors, causes the one or more processors to perform a method of remote gaming, the method comprising: establishing a wireless communications link between the mobile gaming device operated by a player and the first gaming terminal to play at least a first game; receiving player control signals by the first gaming terminal from the mobile gaming device to initiate the first game; carrying out the first game by the first gaming terminal, including determining a final outcome of the first game and any award for the outcome; displaying game animation on the mobile gaming device conveying to the player that the first game is presently occurring; transmitting signals from the first gaming terminal to the mobile gaming device identifying the final outcome of the first game and the award; in the event of a communications link failure between the mobile gaming device and the first gaming terminal during the game, prior to receiving the signals by the mobile gaming device identifying the final outcome of the game and the award but after the game animation has begun, continuing the game animation by the mobile gaming device during the communications link failure for a time until the communications link has been re-established; once the communication link has been re-established, transmitting the signals to the mobile gaming device identifying the final outcome of the first game and the award, stopping the game animation; and displaying, by the mobile gaming device, the final outcome of the game and the award, such that the game perceived by the player is not interrupted during the communications link failure.

In another aspect, there is provided a remote gaming method comprising: establishing a wireless communications link between the mobile gaming device operated by a player and the first gaming terminal that carries out a gaming program to play at least a first game, wherein the gaming program comprises game inactivity rules requiring game play within a maximum allowable time to prevent a remote gaming session from being terminated; receiving player control signals by the first gaming terminal from the mobile gaming device to initiate the first game; carrying out the first game by the first gaming terminal, including determining a final outcome of the first game and any award for the outcome; transmitting signals from the first gaming terminal to the mobile gaming device identifying the final outcome of the first game and the award; allowing the player to pause the remote gaming session by entering a command via the mobile gaming device to pause the remote gaming session for a certain time; suspending the game inactivity rules, by the first gaming terminal, for the certain time so the remote gaming session does not terminate due to game inactivity; receiving a first signal by the first gaming terminal indicating that the player is again using the mobile gaming device to play the first game; re-applying the game activity rules after the first signal is received; and terminating the gaming session if the player does not use the mobile gaming device to play the first game within the certain time.

In some embodiments, the method may further comprise providing a stationary registration terminal within a first regulated gaming venue, the registration terminal having a transceiver for communicating with the mobile gaming device operated by the player within the first regulated gaming venue, the registration terminal being connected in a network with a plurality of gaming machines including a first gaming terminal; and
establishing the communication link using the registration terminal.

In some embodiments, the method may further comprise detecting a selection by the player of a second game; carrying out the second game, including determining a final outcome of the second game and any award for the outcome; and transmitting signals to the mobile gaming device identifying the final outcome of the second game and the award.

In some embodiments, the second game is available to be played on a second gaming terminal carried out by a gaming program comprising game inactivity rules requiring game play within a maximum allowable time to prevent a remote gaming session from being terminated, wherein the method further comprises: establishing a wireless communications link between the mobile gaming device and the second gaming terminal; transferring credits from the first gaming terminal to the second gaming terminal; carrying out the second game by the second gaming terminal; and transmitting signals by the second gaming terminal to the mobile gaming device identifying the final outcome of the second game and the award.

In some embodiments, the first gaming terminal and the second gaming terminal are located in different gaming venues.

In some embodiments, the method may further comprise detecting the player's real time game play; based on detecting the player's real time game play, determining a set of recommended games available to be played on the mobile gaming device, wherein the set of recommended games comprises the second game; transmitting signals to the mobile gaming device identifying at least the second game of the set of recommended games.

In some embodiments, the method may further comprise applying data from the player's real time game play to an algorithm to determine that the player is a certain type of player, then selecting the set of recommended games based on the certain type of player.

In some embodiments, the set of recommended games is associated with a gaming model of a plurality of gaming models, and wherein the method further comprises: detecting a threshold amount of data for the player's real time game play; partitioning the data for the player's real time game play into a plurality of game events; and determining that the gaming model corresponds to the one or more events of the plurality of game events.

In some embodiments, the set of recommended games is associated with a gaming model of a plurality of gaming models, and wherein the method further comprises: determining each of the plurality of models from collected game play data using cluster analysis; and associating a set of recommended games with each of the plurality of gaming models.

In some embodiments, the player's real time game play is associated with game factors, and wherein the gaming model comprises a collection of game factors representing a predetermined gaming and play behavior model of game player.

In some embodiments, the game factors comprise one or more members selected from the grouping consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

In some embodiments, the set of recommended games is associated with a game player type, wherein the game player type is associated with a gaming model of a plurality of gaming models, and wherein the method further comprises: detecting a threshold amount of data for the player's real time game play; determining the game player type based on analysis of the data for the player's real time game play; determining that the gaming model corresponds to the game player type.

In some embodiments, the mobile gaming device is automatically identified using a Near Field Communications (NFC) protocol.

In some embodiments, the player is playing anonymously, without the use of a player tracking card.

In some embodiments, the method may further comprise periodically controlling the mobile gaming device to communicate between a plurality of transceivers in a venue;

using Received Signal Strength Indicator (RSSI) level signals derived by communications with the transceivers to determine whether the mobile gaming device is within a designated area within the venue; and if it is determined that the mobile gaming device is outside of the designated area, blocking the mobile gaming device from carrying out the first game.

In some embodiments, the method may further comprise transferring game assets to the mobile gaming device, wherein the game assets comprise game content for the first game; if it is determined that the mobile gaming device is outside of the designated area, deleting the game assets on the mobile gaming device.

In some embodiments, the first game comprises a wagering mode and a free mode, wherein the method further comprises: transferring game assets to the mobile gaming device, wherein the game assets comprise game content for the first game; carrying out, using the game assets, the first game in the wagering mode; if it is determined that the mobile gaming device is outside of the designated area, continuing to carry out, using the game assets, the first game in the free mode.

In some embodiments, the carrying out the first game by the first gaming terminal comprises displaying game animation on the mobile gaming device conveying to the player that the first game is presently occurring, and wherein the method further comprises; in the event of a communications link failure between the mobile gaming device and the first gaming terminal during the game, prior to receiving the signals by the mobile gaming device identifying the final outcome of the game and the award but after the game animation has begun, continuing the game animation by the mobile gaming device during the communications link failure for a time until the communications link has been re-established; once the communication link has been re-established, transmitting the signals to the mobile gaming device identifying the final outcome of the first game and the award, stopping the game animation; and displaying, by the mobile gaming device, the final outcome of the game and the award, such that the game perceived by the player is not interrupted during the communications link failure.

In some embodiments, the first gaming machine generates video animation in an original format when displaying a the first game on the display screen, wherein the method further comprises: detecting a required video animation second format for the mobile gaming device which is different from the original format; converting the video animation from the original format to the second format for the mobile gaming device; and displaying the game to the player on the mobile gaming device using the second format.

In some embodiments, the method may further comprise collecting game play data corresponding to the player's real time game play; determining one or more processing, storing or transmitting actions permitted on the collected game play data based on user preferences and regulatory restrictions; and upon determining that the one or more processing, storing or transmitting actions are permitted on the collected game play data, performing the one or more processing, storing or transmitting actions that are permitted on the collected game play data.

In some embodiments, the method may further comprise providing, on a display of the mobile gaming device, a designated area assigned to the player as part of the first game, wherein there are additional designated areas assigned to different players; receiving a signal initiated by the player that identifies the player as an active player in the first game; initiating the display of an individual game in the designated area assigned to the player as part of the first game, while the remaining players have an option to concurrently play a community game displayed on the additional designated areas; concurrently displaying, on the mobile gaming device, a plurality of icons in the designated area assigned to the player, each icon being associated with a particular wager amount, wherein the icons concurrently displayed are associated with a plurality of different wager amounts, and wherein at least some of the icons are associated with a hidden prize; receiving a signal identifying a particular icon being touched; deducting the wager amount associated with the icon touched by the player from a bank of credits associated with the first player; and granting any award to the player associated with the icon touched by the player.

In another aspect, there is provided a remote gaming system comprising one or more processors and one or more data storage devices storing one or more sequences of instructions which, when executed by the one or more processors, causes the one or more processors to: establish a wireless communications link between the mobile gaming device operated by a player and the first gaming terminal that carries out a gaming program to play at least a first game, wherein the gaming program comprises game inactivity rules requiring game play within a maximum allowable time to prevent a remote gaming session from being terminated; receive player control signals by the first gaming terminal from the mobile gaming device to initiate the first game; carry out the first game by the first gaming terminal, including determining a final outcome of the first game and any award for the outcome; transmit signals from the first gaming terminal to the mobile gaming device identifying the final outcome of the first game and the award; allow the player to pause the remote gaming session by entering a command via the mobile gaming device to pause the remote gaming session for a certain time; suspend the game inactivity rules, by the first gaming terminal, for the certain time so the remote gaming session does not terminate due to game inactivity; receive a first signal by the first gaming terminal indicating that the player is again using the mobile gaming device to play the first game; re-apply the game activity rules after the first signal is received; and terminate the gaming session if the player does not use the mobile gaming device to play the first game within the certain time.

In a further aspect, there is provided a computer-readable storage medium storing one or more sequences of instructions which, when executed by one or more processors, causes the one or more processors to perform a method of remote gaming, the method comprising: establishing a wireless communications link between the mobile gaming device operated by a player and the first gaming terminal that carries out a gaming program to play at least a first game, wherein the gaming program comprises game inactivity rules requiring game play within a maximum allowable time to prevent a remote gaming session from being terminated; receiving player control signals by the first gaming terminal from the mobile gaming device to initiate the first game; carrying out the first game by the first gaming terminal, including determining a final outcome of the first game and any award for the outcome; transmitting signals from the first gaming terminal to the mobile gaming device identifying the final outcome of the first game and the award; allowing the player to pause the remote gaming session by entering a command via the mobile gaming device to pause the remote gaming session for a certain time; suspending the game inactivity rules, by the first gaming terminal, for the certain time so the remote gaming session does not terminate due to game inactivity; receiving a first signal by the first gaming terminal indicating that the player is again using the mobile gaming device to play the first game; re-applying the game activity rules after the first signal is received; and terminating the gaming session if the player does not use the mobile gaming device to play the first game within the certain time.

In a further aspect, there is provided, a remote gaming method comprising: establishing a wireless communications link between a mobile gaming device operated by a player and a first gaming terminal to concurrently play one or more games, wherein the one or more games involve a plurality of players; providing, on a display of the mobile gaming device, a designated area assigned to the player, wherein there are additional designated areas assigned to different players; generating credits for the plurality of players for concurrently playing the one or more games; receiving a signal initiated by the player, via the mobile gaming device, that identifies the player as an active player in a first game of the one or more games; and initiating the display of an individual game in the designated area assigned to the player as part of the first game, while the remaining players have an option to concurrently play a community game displayed on the additional designated areas.

In some embodiments, the method further comprises concurrently displaying, on the mobile gaming device, a plurality of icons in the designated area assigned to the player as part of the first game, each icon being associated with a particular wager amount, wherein the icons concurrently displayed are associated with a plurality of different wager amounts, and wherein at least some of the icons are associated with a hidden prize; receiving a signal identifying a particular icon being touched via the mobile gaming device; deducting the wager amount associated with the icon touched by the player from a bank of credits associated with the first player; and granting any award to the player associated with the icon touched by the player.

In some embodiments, the particular wager amount associated with each icon is displayed on each icon.

In some embodiments, the particular wager amount associated with each icon is identified by one of a color or shape of each icon.

In some embodiments, the players may play in any sequence by any player initiating a signal that identifies the player as an active player in one of the one or more games.

In some embodiments, the individual game comprises another community game.

In some embodiments, the players may participate in multiple games displayed on different portions of a display simultaneously with different players.

In some embodiments, the method further comprises establishing a wireless communications link between a mobile gaming device operated by another player and the first gaming terminal to play at least one of the one or more games.

In some embodiments, the method further comprises providing a stationary registration terminal within a first regulated gaming venue, the registration terminal having a transceiver for communicating with the mobile gaming device, the registration terminal being connected in a network with a plurality of gaming machines including the first gaming terminal; establishing the wireless communication link via the registration terminal.

In some embodiments, the method further comprises carrying out the first game by the first gaming terminal, including determining a final outcome of the first game and any award for the outcome; transmitting signals from the first gaming terminal to the mobile gaming device identifying the final outcome of the first game and the award.

In some embodiments, the method further comprises detecting a selection by the player of a second game involving a plurality of players; carrying out the second game, including determining a final outcome of the second game and any award for the outcome; and transmitting signals to the mobile gaming device identifying the final outcome of the second game and the award.

In some embodiments, the second game is available to be played on a second gaming terminal, wherein the method further comprises: establishing a wireless communications link between the mobile gaming device and the second gaming terminal; transferring credits from the first gaming terminal to the second gaming terminal; carrying out the second game by the second gaming terminal; and transmitting signals by the second gaming terminal to the mobile gaming device identifying the final outcome of the second game and the award.

In some embodiments, the first gaming terminal and the second gaming terminal are located in different gaming venues.

In some embodiments, the first gaming terminal is licensed for use in a first gaming zone operated by a first operator, and the second gaming terminal is licensed for use in a second gaming zone operated by a second operator, wherein the player is located in the first gaming zone.

In some embodiments, at least a portion of revenue generated by the player playing the second type game is provided to the second operator.

In some embodiments, the method further comprises detecting the player's real time game play; based on detecting the player's real time game play, determining a set of recommended games available to be played on the mobile gaming device, wherein the set of recommended games comprises the second game; transmitting signals to the mobile gaming device identifying at least the second game of the set of recommended games.

In some embodiments, the method further comprises applying data from the player's real time game play to an algorithm to determine that the player is a certain type of player, then selecting the set of recommended games based on the certain type of player.

In some embodiments, the set of recommended games is associated with a gaming model of a plurality of gaming models, and wherein the method further comprises: detecting a threshold amount of data for the player's real time game play; partitioning the data for the player's real time game play into a plurality of game events; and determining that the gaming model corresponds to the one or more events of the plurality of game events.

In some embodiments, the set of recommended games is associated with a gaming model of a plurality of gaming models, and wherein the method further comprises: determining each of the plurality of models from collected game play data using cluster analysis; and associating a set of recommended games with each of the plurality of gaming models.

In some embodiments, the player's real time game play is associated with game factors, and wherein the gaming model comprises a collection of game factors representing a predetermined gaming and play behavior model of game player.

In some embodiments, the game factors comprise one or more members selected from the grouping consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

In some embodiments, the set of recommended games is associated with a game player type, wherein the game player type is associated with a gaming model of a plurality of gaming models, and wherein the method further comprises: detecting a threshold amount of data for the player's real time game play; determining the game player type based on analysis of the data for the player's real time game play determining that the gaming model corresponds to the game player type.

In some embodiments, the mobile gaming device is automatically identified using a Near Field Communications (NFC) protocol.

In some embodiments, the player is playing anonymously, without the use of a player tracking card.

In some embodiments, the method further comprises periodically controlling the mobile gaming device to communicate between a plurality of transceivers in a venue; using Received Signal Strength Indicator (RSSI) level signals derived by communications with the transceivers to determine whether the mobile gaming device is within a designated area within the venue; and if it is determined that the mobile gaming device is outside of the designated area, blocking the mobile gaming device from carrying out the first game.

In some embodiments, the method further comprises transferring game assets to the mobile gaming device, wherein the game assets comprise game content for the first game; if it is determined that the mobile gaming device is outside of the designated area, deleting the game assets on the mobile gaming device.

In some embodiments, the first game comprises a wagering mode and a free mode, wherein the method further comprises: transferring game assets to the mobile gaming device, wherein the game assets comprise game content for the first game; carrying out, using the game assets, the first game in the wagering mode; if it is determined that the mobile gaming device is outside of the designated area, continuing to carry out, using the game assets, the first game in the free mode.

In some embodiments, the carrying out the first game by the first gaming terminal comprises displaying game animation on the mobile gaming device conveying to the player that the first game is presently occurring, and wherein the method further comprises: in the event of a communications link failure between the mobile gaming device and the first gaming terminal during the game, prior to receiving the signals by the mobile gaming device identifying the final outcome of the game and the award but after the game animation has begun, continuing the game animation by the mobile gaming device during the communications link failure for a time until the communications link has been re-established; once the communication link has been re-established, transmitting the signals to the mobile gaming device identifying the final outcome of the first game and the award, stopping the game animation; and displaying, by the mobile gaming device, the final outcome of the game and the award, such that the game perceived by the player is not interrupted during the communications link failure.

In some embodiments, the first gaming terminal comprises a gaming program to carry out the one or more games, the gaming program comprising game inactivity rules requiring game play within a maximum allowable time to prevent a remote gaming session from being terminated, and wherein the method further comprises: allowing the player to pause the remote gaming session by entering a command via the mobile gaming device to pause the remote gaming session for a certain time; suspending the game inactivity rules, by the first gaming terminal, for the certain time so the remote gaming session does not terminate due to game inactivity; receiving a first signal by the first gaming terminal indicating that the player is again using the mobile gaming device to play the first game; re-applying the game activity rules after the first signal is received; and terminating the gaming session if the player does not use the mobile gaming device to play the first game within the certain time.

In some embodiments, the first gaming machine generates video animation in an original format when displaying a the first game on the display screen, wherein the method further comprises: detecting a required video animation second format for the mobile gaming device which is different from the original format; converting the video animation from the original format to the second format for the mobile gaming device; and displaying the game to the player on the mobile gaming device using the second format.

In some embodiments, the method further comprises collecting game play data corresponding to the player's real time game play; determining one or more processing, storing or transmitting actions permitted on the collected game play data based on user preferences and regulatory restrictions; and upon determining that the one or more processing, storing or transmitting actions are permitted on the collected game play data, performing the one or more processing, storing or transmitting actions that are permitted on the collected game play data.

In another aspect, there is provided a remote gaming system comprising one or more processors and one or more data storage devices storing one or more sequences of instructions which, when executed by the one or more processors, causes the one or more processors to: establish a wireless communications link between a mobile gaming device operated by a player and a first gaming terminal to concurrently play one or more games, wherein the one or more games involve a plurality of players; provide, on a display of the mobile gaming device, a designated area assigned to the player, wherein there are additional designated areas assigned to different players; generate credits for the plurality of players for concurrently playing the one or more games; receive a signal initiated by the player, via the mobile gaming device, that identifies the player as an active player in a first game of the one or more games; and initiate the display of an individual game in the designated area assigned to the player as part of the first game, while the remaining players have an option to concurrently play a community game displayed on the additional designated areas.

In a further aspect, there is provided a computer-readable storage medium storing one or more sequences of instructions which, when executed by one or more processors, causes the one or more processors to perform a method of remote gaming, the method comprising: establishing a wireless communications link between a mobile gaming device operated by a player and a first gaming terminal to concurrently play one or more games, wherein the one or more games involve a plurality of players; providing, on a display of the mobile gaming device, a designated area assigned to the player, wherein there are additional designated areas assigned to different players; generating credits for the plurality of players for concurrently playing the one or more games; receiving a signal initiated by the player, via the mobile gaming device, that identifies the player as an active player in a first game of the one or more games; and initiating the display of an individual game in the designated area assigned to the player as part of the first game, while the remaining players have an option to concurrently play a community game displayed on the additional designated areas.

In one aspect, remote gaming using hand-held gaming devices and operating techniques are described herein. In one embodiment, the player's own tablet (e.g., an Apple iPad™) may be used as the hand-held gaming device. In other embodiments, any suitable mobile device may be used, including the players' own smartphones, personal digital assistants, etc. A conventional tablet may be used for example.

The tablet may communicate wirelessly with a stationary gaming machine using encrypted signals. The tablet may act as a remote user interface for the gaming machine, while the gaming machine conducts the game itself and controls the player's account.

The player registers the tablet for play with a particular gaming machine and establishes a session time, such as two hours. This may be done by the player inserting her player tracking card into the gaming machine and entering certain information via the gaming machine's touch screen. A communications link between the tablet and the gaming machine may then be established. Near Field Communication (NFC) may be used to set up the link, where a link is automatically established (according to established protocols) when the tablet is brought near the gaming machine. The gaming machine may use the tablet's MAC address, serial number, or other hardware/software signature to uniquely identify the tablet. The player may create a bank of credits using the player's player tracking card, or by inserting money or a printed ticket (for cashless gaming) into the gaming machine, or by other means either at the gaming machine or via the tablet.

In one embodiment, the gaming machine displays that the machine is in use by a remote player and also displays the remaining session time. Prospective players may register to reserve the machine by inserting their player tracking card into the gaming machine and registering via the gaming machine's touch screen. The queued player then gets a message on her own tablet stating when the gaming machine is available. The queued player only needs to respond via the tablet to begin the next session if the player has stored credits available. In another embodiment, the queued player must return to the gaming machine to register and begin the session.

The tablets may operate with any of a number of authorized gaming machines. In one embodiment, an application may need to be downloaded to the tablet (such as via the internet) to allow the tablet to operate in accordance with embodiments described herein. The application may be specific for the gaming venue or generic for multiple gaming venues.

The tablet presents a user interface touch screen display to the player. The particular display presented by the tablet to the player may be identified by commands transmitted by the gaming machine.

In an example of the game being a video reels game, the player places bets and starts the video reels spinning via touch screen buttons on the tablet. The tablet may include a stored spin-reels program that causes the tablet to display the reels spinning. The spin-reels program may be downloaded from the gaming machine or a server prior to the first game played on the gaming machine being initiated. Since different gaming machines may play different games and have different graphics, the spin-reel program may be different for each type of game and must therefore be customized for the particular gaming machine being played. In one embodiment, only the different graphics are downloaded before a game is initiated and other functions are generic to all the gaming machines.

The gaming machine receives the player inputs and controls all aspects of the game. The gaming machine instantly determines the outcome of the game (the stop positions of the reels) using a random number generator and determines the resulting award using a pay table. The gaming machine then transmits the outcome and award information to the tablet, and the tablet displays the reels eventually stopping at the predetermined positions and displays the award to the player. The length of time the reels appear to spin is irrelevant to the game. The gaming machine deducts or adds credits from/to the player's account, and such credits are displayed to the player. The player is typically unaware that the game outcome is determined by a random number generator prior to the reels stopping and believes that the ultimate displayed stopped positions of the reels determine the award paid. Therefore, the un-interrupted display of the reels spinning and stopping is very important to the player.

Since the player may roam with the tablet, the tablet may occasionally be out of the communication range of the gaming machine (or out of some other allowable range). Most of the time, the player will be actively engaged in a game. If the communications link is broken during a game, terminating the game may be terminated and stopped. Embodiments described herein may enable the tablet to display the continuing spinning of the reels using the tablet's internal spin-reels application program and display a stored message to the player that the player must re-enter the transmission reception area within a certain time limit (e.g., 15 seconds) to complete the game. When the player re-enters the transmission reception area, the tablet automatically re-establishes contact with the gaming machine (pursuant to stored protocols), and the tablet receives the game outcome from the gaming machine. The tablet then stops the reels to display the predetermined outcome. The player is unaware that the game outcome had previously been determined and believes that the game was just extended. This may be much more satisfying to the player than the game being terminated due to the broken communications link.

The link may also be broken due to interference or other issues, but the display of the spinning reels continues until the link is re-established or the "reconnect timeout" period has lapsed.

Since the player is actively playing the game a majority of the time, there is a substantial likelihood that a disruption in the communications link will occur during the game rather than between games.

If the player does not re-enter the transmission reception area within the allowable "reconnect timeout" period, the playing session is terminated, and a stored message appears that the player may review the results of the game by re-registering with the gaming machine Another aspect of embodiments described herein relates to the gaming machine automatically terminating the tablet's playing session after a period of inactivity (typically only a few minutes). Automatically terminating the gaming session due to inactivity is described in the Wells patent in column 25, lines 25-27. However, since the registered playing session may be a few hours, the player should be able to be inactive for a period of time without the gaming machine terminating the session, such as if the player needs to exit the play area for a washroom break, a smoking break, eating dinner, or go to her hotel room. Embodiments described herein may provide the player with a pause button on the tablet that allows the player to enter an allowable inactive period without penalty. The session still expires after the registered session time, but the gaming machine will not terminate the session within the period of inactivity selected by the player. The selectable inactive period will typically be limited to, for example, 30 minutes to limit the loss of revenue by the casino. However, the selectable times may vary by day, time of day, or based on the number of people in the casino or waiting to play the gaming machine.

If the player does not begin playing a game on the tablet within the allowable inactivity period, and after a warning is given, the session will terminate.

The player may renew the session time, if there are no other players queued up for the machine, allowing for unlimited play on the tablet.

The session may automatically terminate if the communications link is broken for more than, for example, 60 seconds and the player has not responded within 15 seconds after the communications link has been restored. Stored warning messages are displayed to the player.

The gaming machine may display the queue of other players who have registered to play the machine, either locally or via a tablet, once the session time has run out.

When the player wishes to cash out, the player may cash out at the gaming machine and receive a printed ticket to redeem at a cashier's window, or the player's account may store the remaining credits, or the ticket (with a bar code) may be displayed on the player's tablet. In another embodiment, the player may obtain the printed ticket or redeem her remaining credits at any suitable terminal. A separate printer terminal (not a gaming machine) may print out the player's coded ticket when the player wishes to cash out. The printer terminal may sense the proximity of the tablet using NFC and automatically determine the gaming session code so that the player does not need to manually enter data into the printer to cash out. The player may redeem the ticket for cash at a redemption area. The printer terminal may also be a registration terminal for the tablet, so the player never has to physically be at the gaming machine to register for play. The communications between the tablet and the gaming machine may be via a wireless connection between the registration terminal and the tablet, then the registration terminal communicates to the gaming machine through the casino's existing network.

In another embodiment, the venue's system automatically recommends other games and gaming machines to the player. The player may receive a recommendation on a gaming machine or remotely via the player's tablet. The player may select any recommended game via the gaming machine or the tablet. If the player selects a recommended game on another gaming machine then the player's credits may be transferred to the new gaming machine via the venue's network. If the player is playing remotely via a remote gaming device then a communications link to the new gaming machine may be automatically established. In one embodiment, the same tablet may communicate with gaming machines or servers in different venues and the revenue is appropriately shared. Credits may even be transferred between venues.

In one embodiment, when a player uses a player tracking card, the player's past history of gaming may be used by the recommender algorithm to recommend games to the player. If the player does not use a player tracking card and thus plays anonymously, the recommender system detects the player's real time game play (e.g., game selected, bet amount, etc.) and recommends other games to the player consistent with the real time game play. In other embodiments, recommendations may be provided to anonymous players after collecting real-time or near real-time gaming data.

If the gaming machines displays the game in 3D (requiring stereoscopic images to be generated), the system is capable of modifying the format of the images to be compatible with the tablet. For example, if the tablet can only display 2D images, the original images are converted to the format needed to be displayed by the tablet in 2D. Further, if the tablet has 3D capability, the original image format is suitably changed, if necessary, to be compatible with the tablet 3D format. Resolutions and 3D image depth may also be modified to be optimal for the tablet.

The remaining battery power is sensed by the tablet and, if the power is below a threshold, the tablet software prevents the player from initiating a new game. The remaining power may be used to cash out. A message is displayed to the player allowing the player to switch to another tablet or to recharge the tablet.

In one embodiment, the tablet communicates with any type of secure terminal that carries out the game, where the terminal is not necessarily a gaming machine in a casino or other gaming establishment but any terminal that can perform the required processing.

In another embodiment, the mobile gaming device may be connected to the gaming machine with a cable, either directly connected to a port of the gaming machine or via a network communicating with the gaming machine.

Any game may be presented on the tablet, including video reels, video poker, keno, roulette, blackjack, or other games.

The tablet itself may be a commercially available, such as an iPad, Android tablet, Windows tablet, or other commercially available tablet, that is specifically configured in the claimed manner using appropriate computing applications, and the like. The mobile gaming device may instead be any other portable computing device, including smartphones, personal digital assistants, laptop computers, etc. By the players using their own devices, they are familiar with their operation. Further, the casino does not need to supply the mobile gaming devices. Therefore, the remote gaming system may be readily implemented at virtually no cost, and increased play activity will bring in added revenue to the casino.

The gaming machines with which the mobile gaming devices are communicating may be licensed for the venue (e.g., a casino) in the particular jurisdiction (e.g., Nevada) in which they are operating. Since the mobile gaming device is located in the same jurisdiction, the gaming rules in that jurisdiction also apply to the remote play. Since the mobile gaming device performs no gaming function other than as a user interface, the mobile gaming device will typically not need a special license by the jurisdiction and thus the player may legally operate the mobile gaming device.

Since the tablet may not be licensed by the jurisdiction for gaming outside the casino (or other venue) or other designated area, it may be required to have an enforced boundary for the tablet. In one embodiment, a Geo-fence system is set up in the venue, which automatically detects that an active gaming tablet is within a designated boundary. Since the tablet may be owned by the player, the system uses the existing WiFi, Bluetooth, and Received Signal Strength Indicator (RSSI) capability of the tablet to determine whether the tablet is within a designated area. This test may be performed before a transmission by the tablet is authorized for use during a gaming session. If the tablet is determined to be within the designated area and the tablet is authenticated, communications between the tablet and the gaming terminal may then proceed.

Various other embodiments are described herein.

BRIEF DESCRIPTION OF THE DRAWINGS

Various embodiments will now be described, by way of example only, with reference to the following drawings, in which.

Figure 1:
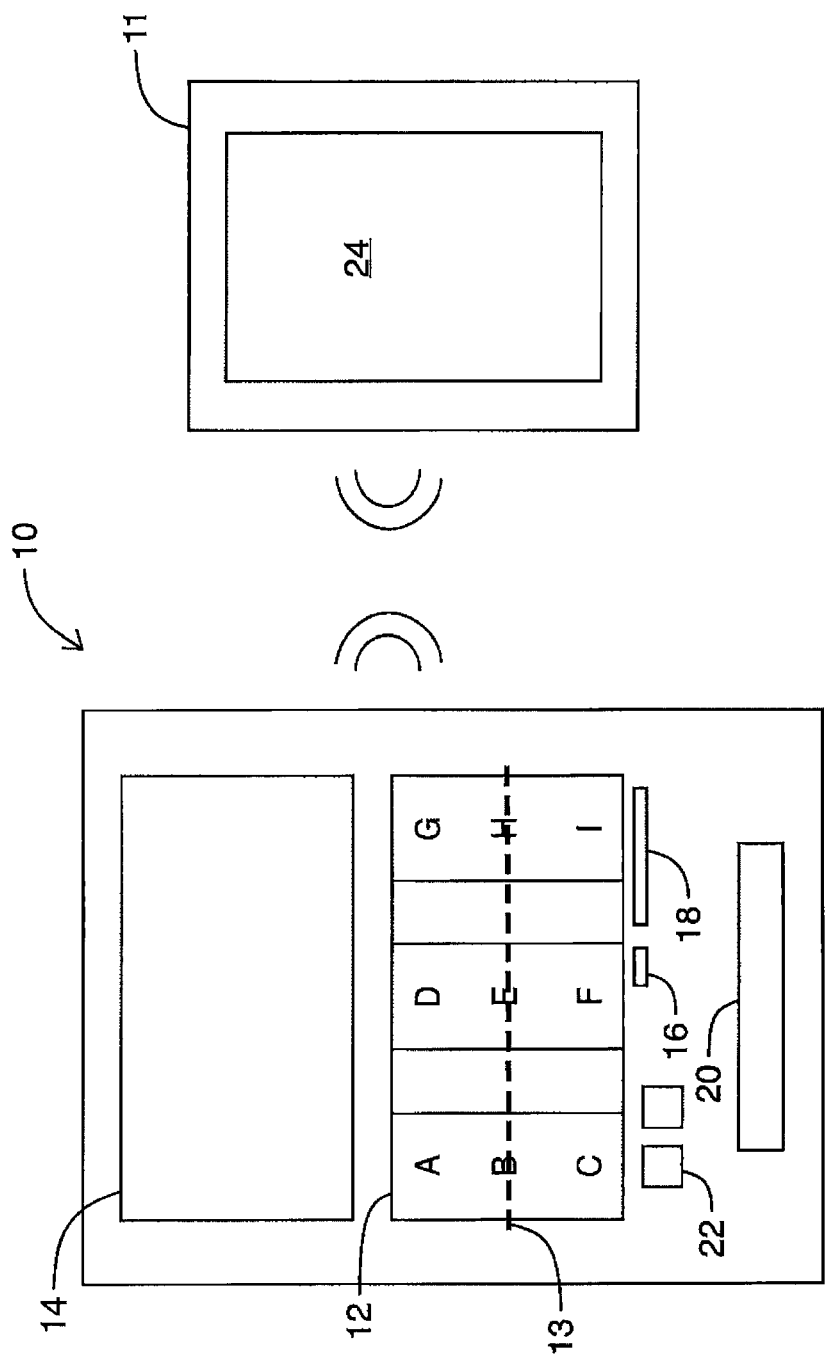
FIG. 1 illustrates a gaming machine console wirelessly communicating with a hand-held tablet (as one example of a mobile gaming device) in accordance with embodiments.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the embodiments described herein may provide various technical effects such as by modifying hardware and interfaces, connecting a computing devices in improved and efficient ways, implementing security and privacy mechanisms for transmissions, controlling devices, improving processing and data management, improving resource usage, and other example technical effects as described herein.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

FIG. 1 illustrates a simplified stationary gaming machine 10 wirelessly communicating with a mobile gaming device 11. The gaming machine 10 may be licensed for use in the particular jurisdiction (e.g., Nevada) in which it is operated. The gaming machine 10 may instead be a server. In the example of FIG. 1, the mobile gaming device is a tablet 11, such as an iPad tablet. The gaming machine 10 may be played in a conventional manner as well as played remotely using the tablet 11.

Mobile gaming device 11 is operable by a user and may be any portable, networked (wired or wireless) computing device including a processor and memory and suitable for facilitating communication between one or more computing applications of mobile gaming device 11 (e.g. a computing application installed on or running on the mobile gaming device 11), the gaming machine 10. A mobile gaming device 10 may be a two-way communication device with advanced data communication capabilities having the capability to communicate with other computer systems and devices. The mobile device may include the capability for data communications and may also include the capability for voice communications, in some example embodiments. Depending on the functionality provided by the mobile gaming device 11, mobile device may be referred to as a portable electronic device, smartphone, a data messaging device, a two-way pager, a cellular telephone with data messaging capabilities, personal digital assistant, a wireless Internet appliance, a portable laptop computer, a tablet computer, a media player, an electronic reading device, a data communication device (with or without telephony capabilities) or a combination of these.

The gaming machine 10 in the example includes a bottom display 12 that may be a thin film transistor (TFT) display, a liquid crystal display (LCD), a cathode ray tube (CRT), or any other type of display. The display 12 may also be a transparent area revealing physical motor-driven reels. In the example shown, the main game in display 12 is the conventional random selection of a 3×3 array of symbols, where an award is granted based on the combination of symbols across a pay line 13. The main or primary game can be any game, such as a 5 column×3 row array of symbols, a 5×4 array of symbols or any other size or shape array, a video card game, or other game.

A top display 14 is a video screen, which may be similar to the display 12, that displays a secondary game or a static display.

A coin slot 16 accepts coins or tokens in one or more denominations to generate credits within the machine 10 for playing games. An input slot 18 accepts various denominations of banknotes, or machine-readable tickets, or player tracking cards and may output printed tickets for use in cashless gaming. A coin tray 20 receives coins or tokens from a hopper upon a win or upon the player cashing out. Player control buttons 22 include any buttons needed for the play of the particular game or games offered by the machine 10 including, for example, a bet button, a spin reels button, a cash-out button, and any other suitable button. Buttons 22 may be replaced by a touch screen with virtual buttons.

The tablet 11 may include a touch screen 24 that displays a user interface and generally replicates what would normally be seen on the gaming machine's display 12. When playing in the remote mode, the gaming machine display 12 may not display the game, and the game may only be displayed on the tablet 11.

Figure 2:
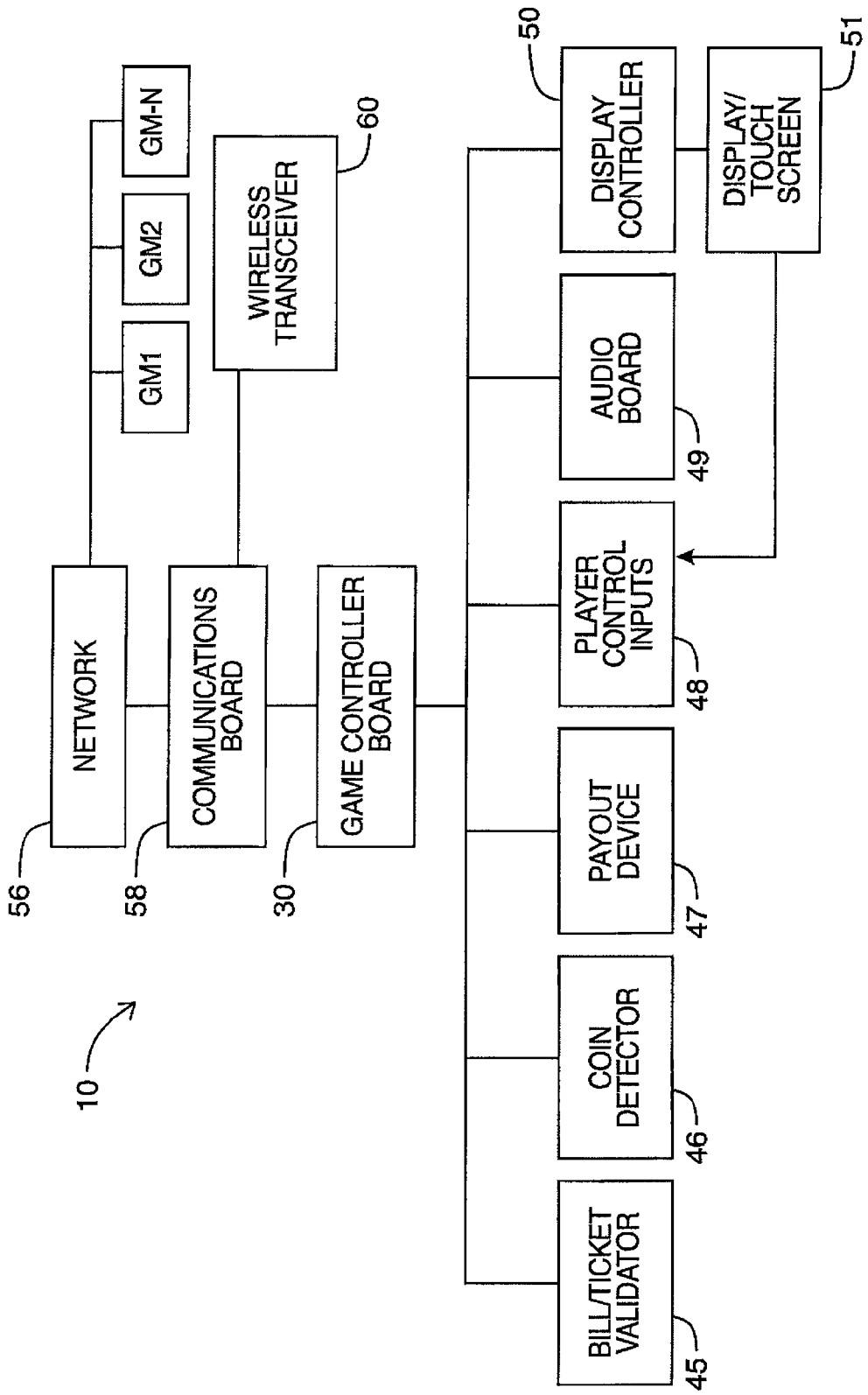
FIG. 2 is a block diagram showing the basic functional units in the gaming machine of FIG. 1.

FIG. 2 illustrates basic circuit blocks in the gaming machine 10 of FIG. 1. A game controller board 30 includes a processor (CPU) that runs the gaming program (including the remote-gaming application) stored in a program ROM, such as a CD. The program ROM may include a pseudo-random number generator program for selecting symbols and for making other random selections. At least the active portion of the program is stored in a RAM on the board 30 for access by the processor. A pay table ROM on the board 30 detects the outcome of the game and identifies awards to be paid to the player. A bill/ticket validator 45 and coin detector 46 add credits for playing games. A payout device 47 pays out an award to the player in the form of coins, a printed ticket, or a credit to the player's account at the end of a game or upon the player cashing out. Player control inputs 48 receive push-button inputs for playing the game and touch screen sensor inputs for playing the game. An audio board 49 sends signals to the speakers. A display controller 50 receives commands from the processor and generates signals for the various displays 51. The touch screen portion of the displays 51 provides player selection signals to the processor.

The game controller board 30 transmits and receives signals to and from a network 56 via a communications board 58. The network 56 includes servers and other devices that monitor the linked gaming machines 10 and GM1-GM-N and provide communications between the machines 10 and GM1-GM-N.

The gaming machine may also include a wireless transceiver 60 that communicates with the tablet 11 via, for example, standard WiFi or Bluetooth, or other protocol based on the wireless communication capabilities of tablet 11. When the gaming machine 10 is operating in its remote play mode, the user interfaces of the gaming machine 10 may be inactive, and the tablet 11 will display the appropriate user interface and game.

Figure 3:
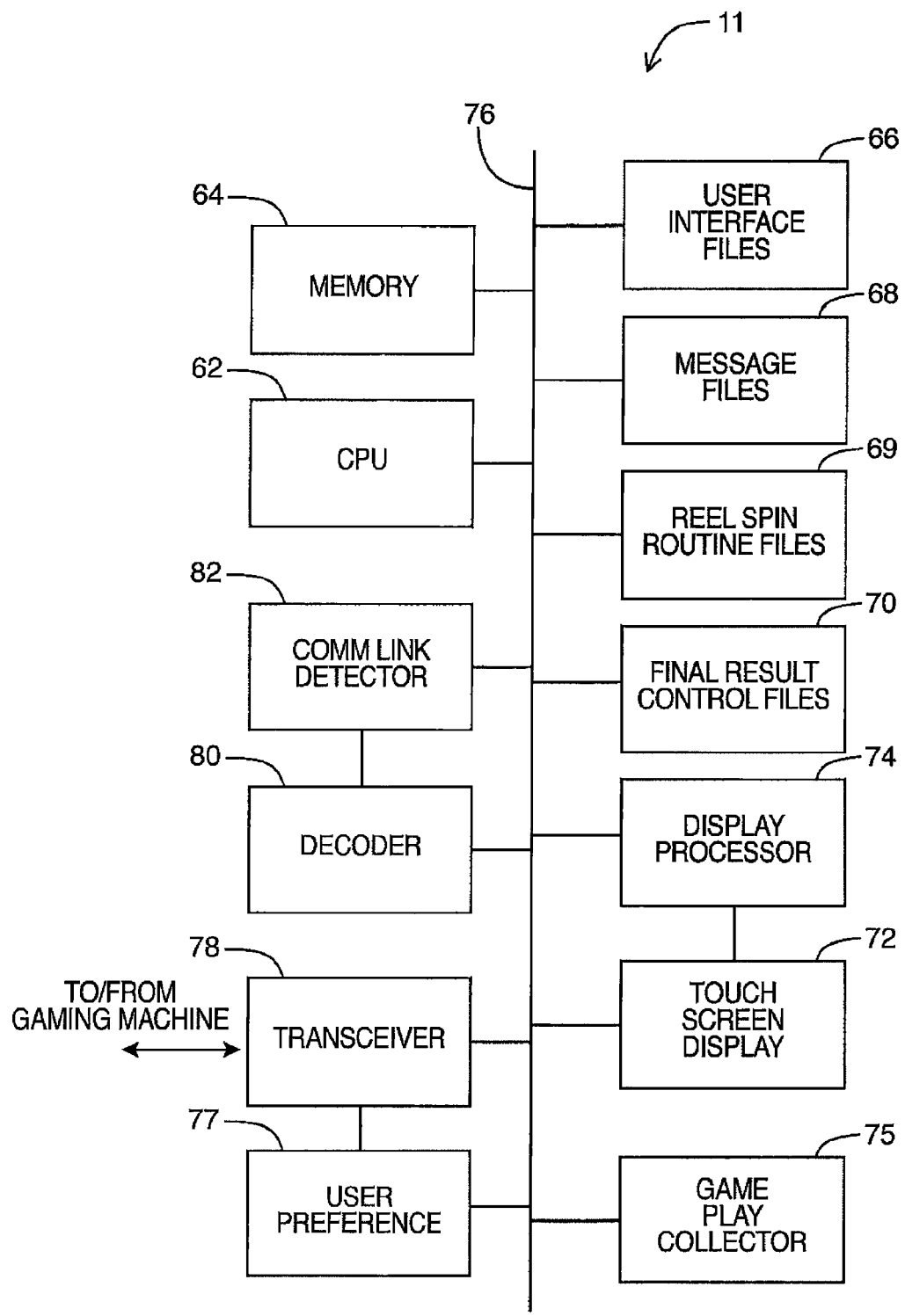
FIG. 3 illustrates various functional units and program files in the tablet that may be used to carry out embodiments described herein.

FIG. 3 illustrates some pertinent functional elements in the tablet 11 used for the remote play.

The tablet 11 includes at least one CPU 62 for carrying out the game and support functions. A memory 64 (RAM and ROM) stores the game program files, game play data, and other files for remote gaming. Such files may be downloaded from a website or server, for example. The user interface files 66 for carrying out the game, the display message files 68, the reel spin routine files 69, user preferences 77 and final result control files 70 are shown separately but are stored in the memory 64. The display messages files 68 contains messages that are displayed automatically if the communications link between the tablet and gaming machine is broken, as well as contains other messages. User preferences 77 may store attributes about the user such as gender, location, registration number, user identifier, address, phone number, occupation, credit score, game preferences, privacy preferences, and so on.

The touch screen display 72 displays the game and user interface. A display processor 74 receives high level instructions from the bus 76 and generates pixel control signals for the touch screen display 70.

A transceiver 78 (e.g. WiFi and/or Bluetooth transceiver, or other protocol) generates and receives wireless signals for communicating with the transceiver 60 in the gaming machine 10. A decoder 80 (e.g., a modulator/demodulator) converts received signals to digital (baseband) signals and converts signals to be transmitted to the appropriate format signals. The decoder 80, in combination with the CPU 62, carries out the required protocols for establishing the communications link, performing encryption/decryption, etc.

A communications link detector 80 detects that the communications link between the tablet 11 and the gaming machine 10 has been broken, such as by the player moving out of the play area, interference, etc.

A game play collector 75 detects game play on tablet 11 and collects raw game play data in real-time or near-real time for provision to recommendation system, as will be described herein. The memory 64 may also contain historical game play data files, or a reference or index to historical game play data files stored on an external server. The historical game play data may also be used by recommendation system. Preference data stored as user preferences may also be used by recommendation system. The recommendation system is operable to recommend available games and gaming machines 10 to tablet 11 based on collected game play data, and other data.

Figure 4:
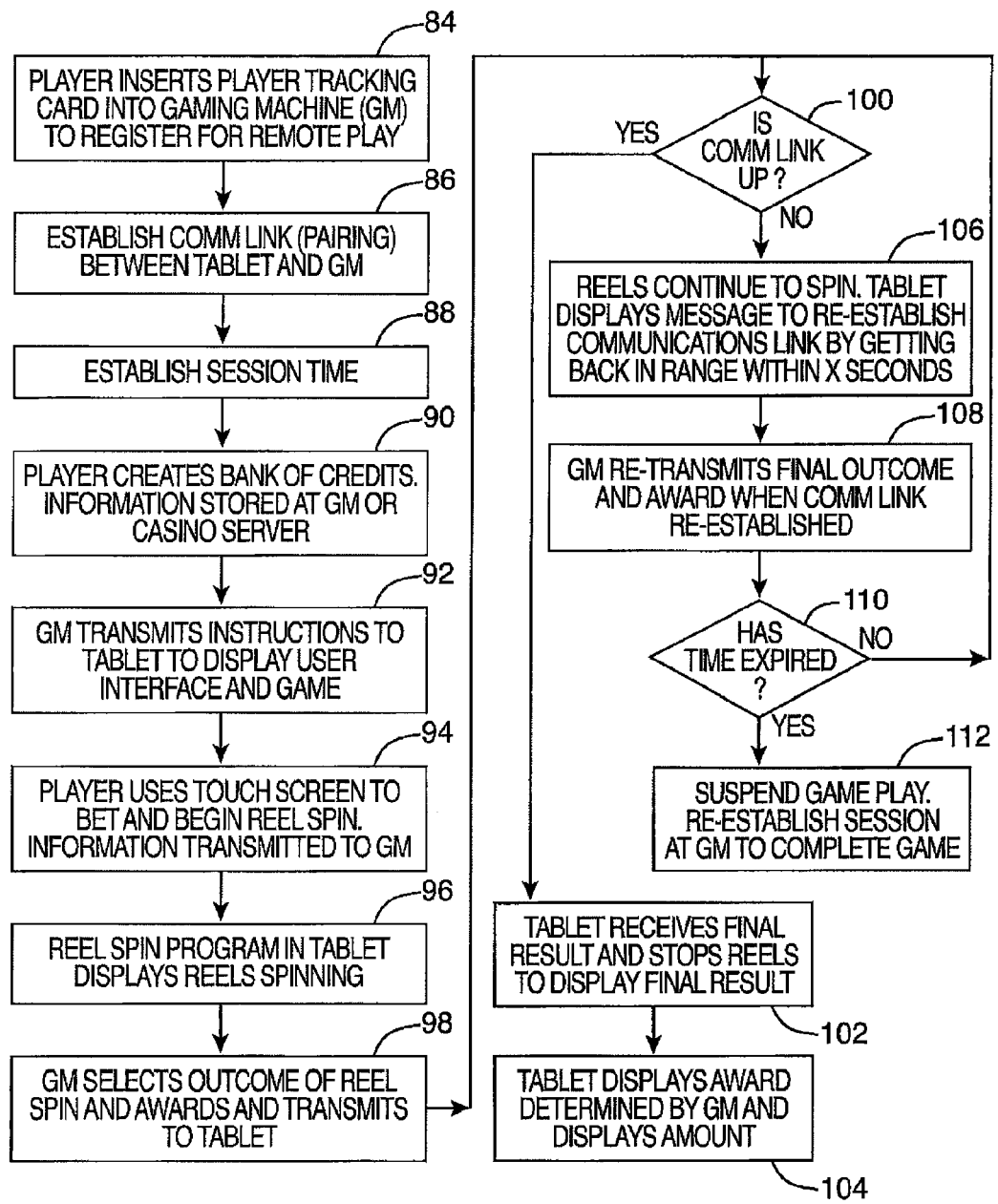
FIG. 4 is a flowchart showing steps performed by the tablet and gaming machine in the event the communications link is broken during a game.

Mobile Gaming Device Carrying Out Uninterrupted Game Despite Communications Link Disruption FIG. 4 is a flowchart showing various steps for carrying out certain processes in accordance with embodiments described herein.

Initially, the player downloads the remote gaming application, such as from a website, and inserts her playing tracking card into the selected gaming machine to identify the player and the player's account (step 84).

In step 86, a communications link is then created between the tablet and the particular gaming machine. No casino operator involvement is needed and no customized tablet is needed. The player may use her own personal tablet. The gaming machine has a button or touch screen icon that the player presses to initiate the registration process. An NFC technique may instead be used to initiate the registration process. The gaming machine then may display the set-up instructions to the player.

In one embodiment, the gaming machine contains a wireless transceiver (e.g., a WiFi transceiver) and uses a protocol that detects the proximity of the tablet's WiFi signal, by detecting signal strength, and automatically establishes a communications link with the tablet. The program downloaded to the tablet contains the communications set-up program. This is a type of NFC technique. Appropriate handshaking is performed to establish the link The tablet's MAC address (or other unique hardware or software code) may be used to identify the tablet and is linked to the player's account.

In another embodiment, the player sets up the communication link by entering the gaming machine's unique ID code displayed by the gaming machine.

In another embodiment, the casino (or other gaming establishment) has a central WiFi system identifier that is displayed on the player's tablet, and the player selects that WiFi system and enters the gaming machine code for setting up a communications link with the gaming machine. The tablet then wirelessly communicates with a central server in the casino, which then communicates with the addressed gaming machine via the casino's network.

Once the communications link is set up between the tablet and the gaming machine, the player establishes a session time (step 88). A menu of allowable session times may be presented to the player, and the player selects one of the times, such as 30 minutes. The sessions may be renewed a certain number of times.

In step 90, the player establishes credits in the gaming machine by using the player's account, depositing cash, inserting a printed ticket, or other means. The player may then roam within the allowable range while playing the game in a manner that is similar to the way the player would play if seated at the gaming machine.

In step 92, the gaming machine, pursuant to the machine's internal gaming program, then transmits instructions to the tablet to display the remaining session time, the user interface for the game, and the game itself. In some scenarios, the player may choose a game from a menu of games. It is presumed that a video reels game will be played.

In step 94, the player uses the touch screen of the tablet to bet and begin the reel spin. The player inputs are transmitted to the gaming machine.

In step 96, a stored program in the tablet (reel spin routine files 69 in FIG. 3) causes the tablet to display the reels spinning, which may be a generic animation of blurred symbols moving down vertically to simulate actual reels spinning. The gaming machine may command the animation to be initiated or the tablet may automatically initiate the animation after the spin-reel button is pressed. The spin-reels program may be downloaded from the gaming machine or a server after the communications link is set up and prior to the first game played on the gaming machine being initiated. The spin-reel program may be different for each type of game and may therefore have to be customized for the particular gaming machine being played. In one embodiment, only the different graphics are downloaded by the gaming machine before a game is initiated and other functions are generic to all the gaming machines. Such generic functions may be part of the generic gaming program initially downloaded to the tablet.

In step 98, the gaming machine then predetermines the outcome of the reel spin using a pseudo-random number generator and a look-up table to identify the required stop positions of the reels. The gaming machine also determines the resulting award using a pay table in the ROM. The reel spin outcome and award are then transmitted to the tablet.

During all steps, the gaming machine continually senses whether the communications link is still up by, for example, receiving periodic signals from the tablet or receiving acknowledgements from the tablet that a command has been received. The communications link may be broken by the player moving out of the allowable range, interference, or other cause. All playing data is stored in the gaming machine and/or central server, so no information is lost in the event of a communications link failure. However, losing the communications link during the game, rather than between games, is particularly problematic since the player has already placed a bet and started the reels spinning. If game is terminated upon a communications link failure and the tablet animation is stopped, the player may then have to determine the outcome of the game by accessing the internal memory files in the gaming machine. This is disconcerting to the player. To overcome this drawback, embodiments described herein may perform the following routine upon the communications link being interrupted during a game.

In step 100, if the communications link is still up, the final game outcome is transmitted by the gaming machine along with the award amount, and the information is received by the tablet (step 102). The tablet then displays the reels stopping at the final stop positions identified by the gaming machine. The tablet's internal program is used to animate the stopping of the reels at the predetermined stopping positions.

In step 104, the tablet displays the award amount determined by the gaming machine If the communications link is broken in step 100 (such as due to the player roaming beyond the allowable range) between the time the player pressed the spin-reels button and the time that the gaming machine transmitted the final game outcome, the internal program in the tablet (part of the reel spin routine files 69 in FIG. 3) causes the animated reels to keep spinning, so the player believes the game is still occurring (step 106). The tablet also displays a stored message telling the player to return to the play area within a certain time, such as 5 seconds.

In step 108, the gaming machine re-transmits the final outcome and award and, assuming the player has re-entered the allowable range within the allowable "reconnect timeout" period (step 110), the tablet receives the final result and stops the reels at their final positions (step 102). Thus, the player perceives the continuous spinning of the reels as just an extended game rather than an interruption in the game.

If the player does not re-enter the playing range within the allowable "reconnect timeout" period (step 110), the gaming machine suspends the game play (step 112). The player must now re-establish the session at the gaming machine to complete the game. The game may then be completed by a re-spinning of the reels and stopping of the reels at the predetermined stopping positions.

Geo-Fence for Determining if Tablet within an Authorize Area

In one embodiment, the allowable range for play on the mobile device (e.g., a tablet or smartphone) is referred to as a Geo-fence, and the Geo-fence application program is downloaded to the mobile device, such as via the internet. In one embodiment of a Geo-fence system, the mobile device sends and receives signals to and from WiFi transceivers distributed around a designated area in the licensed venue. The WiFi transceivers transmit signals, including Received Signal Strength Indication (RSSI) data, which are received by the mobile device and processed by the mobile device. The processed signals encode the device's location relative to the transmitters. The mobile device then transmits the processed signals using the device's WiFi system, and a server determines whether the mobile device is within the designated area. A classification algorithm is used together with the RSSI data to accurately determine whether the mobile device is in or outside the gaming venue boundary with much higher precision than GPS, IP based location, Cell site or WiFi triangulation methods. In one embodiment, the server is networked to all the gaming machines and may control the gaming machines. If the mobile device is transported outside of the Geo-fence and the player does not re-enter the Geo-fence within a given time in response to a displayed warning message, the gaming machine is controlled to terminate the session. A Geo-fence system for a mobile gaming device is disclosed in provisional patent application 61/757,488, filed on Jan. 28, 2013, incorporated herein by reference. Mobile computing devices may be configured with the capability to run the Geo-fence application. The tablet's internal GPS capability may be used instead of, or in conjunction with, the Geo-fence, but GPS may be less accurate than the Geo-fence.

Temporarily moving outside of the Geo-fence does not necessarily cause a communications link failure since there may be adequate signal strength outside the area.

More details of a suitable novel and inventive Geo-fence are presented herein.

Since the tablet may not be licensed by the jurisdiction for gaming outside the casino (or other licensed venue) or other designated area, it may be required to have an enforced boundary for the tablet. The tablet may be blocked from carrying out a game if it is detected that the tablet is outside the designated area.

In one embodiment, a Geo-fence system is set up in the venue, wherein WiFi transceivers are distributed around the designated area. Bluetooth transceivers or other beacons may also be distributed for added accuracy, security and reliability. The venue may initially create models by moving mobile devices, such as different models of tablets, smartphone, etc., around the designated area, including along the border areas, while conducting communications between the mobile device and the various WiFi transceivers. During this "calibration" phase, the mobile devices may transmit Received Signal Strength Indicator (RSSI) signals (or processed RSSI data) to the venue's system that is stored and used to create the models, or the mobile devices create the models themselves using the RSSI information. The models identify sets of data that are consistent with various types of mobile devices being within the designated area. The models are stored in the venue's system. Mobile devices may be equipped with an RSSI system that detects and identifies the received signal's power. In one embodiment, there may be up to 256 levels designated by the mobile device.

During a gaming session with the player's own tablet or smartphone, a test to determine the location of the mobile device is periodically performed, such as prior to a game being commenced, where the mobile device receives signals from the various WiFi transceivers (or other types of transceivers), and the WiFi transceivers are identified with a code. The mobile gaming application, which has been previously downloaded to the mobile device, controls the mobile device to transmit the various RSSI levels, each RSSI level being associated with a WiFi transceiver using the transceiver's code, to the venue's Geo-fence system. By detecting the various RSSI levels associated with each of the WiFi transceivers, then performing a classification algorithm on these levels to identify a position or other data set for the mobile device with respect to the WiFi transceivers, and then comparing the location/data set to the models previously created by the venue for the player's particular mobile device, the Geo-fence system is able to determine whether the mobile device is within or outside of the designated area. In another embodiment, the mobile device itself processes the RSSI data and the processed information is transmitted to the Geo-fence system for comparison to the models.

In another embodiment, the mobile device also stores the models, and determines whether it is within the designated area. Suitable algorithms may be implemented without undue experimentation. A similar test using Bluetooth or other protocols may also be performed for added accuracy (smaller area) security and reliability.

If the mobile device is determined to be within the designated area and the mobile device is authenticated, communications between the mobile device and the gaming terminal may then proceed. Authentication may simply require the mobile device to transmit a unique code identifying the device or the playing session and matching the code to a previously stored code in the venue's system. In one embodiment, the code is a barcode initially scanned or otherwise received by the mobile device at the beginning of a playing session.

In another embodiment, the mobile application may require the mobile device to transmit an identifying signal at a certain power level, and the different RSSI levels detected at the various WiFi transceiver locations are used to identify the position of the mobile device to determine whether the mobile device is within the designated area.

Although the Geo-fence system described above is believed novel and inventive, other location systems may also be used for other inventive embodiments. GPS may not be suitable due to signal attenuation by the venue and the lack of accuracy.

Figure 5:
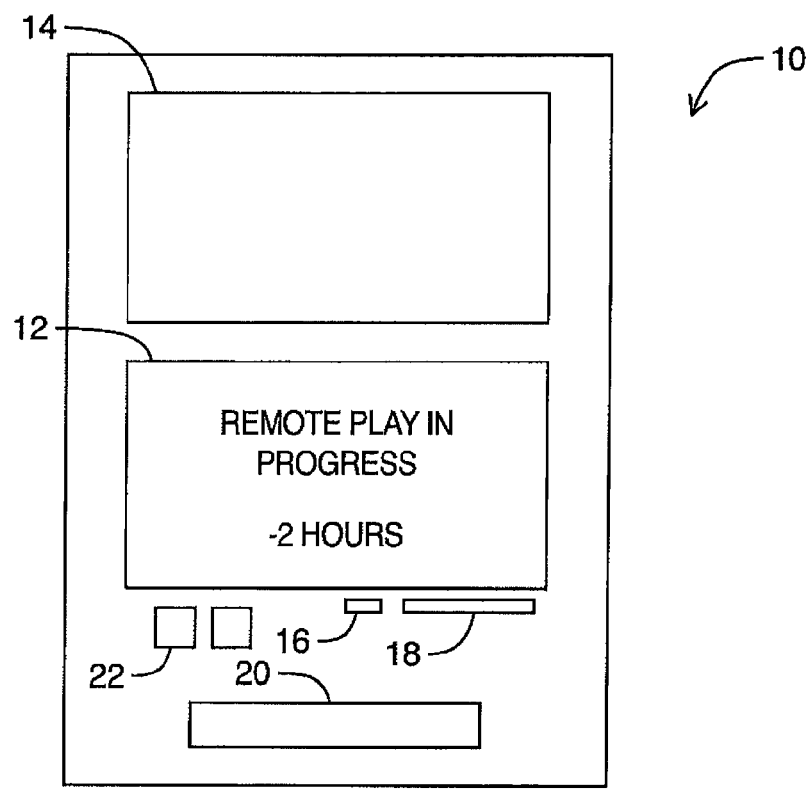
FIG. 5 illustrates the gaming machine displaying the remaining session time.

Remote Gaming Method Allowing Temporary Inactivation without Terminating Playing Session Due to Game Inactivity FIG. 5 illustrates the gaming machine 10 displaying that the machine is being played remotely and shows the time left in the remote session. Players may use the touch screen of the gaming machine to establish a queue to play the machine after the current session. The waiting players may be notified via their tablets when the gaming machine is freed up.

Tablet communications may be continuously monitored to determine if the remote player is actively playing. If there is no activity within a few minutes, the session may be terminated. However, this may not give the player an opportunity to briefly suspend play for reasons such as a washroom break, a smoking break, a dinner break, or briefly going to the player's hotel room.

Figure 6:
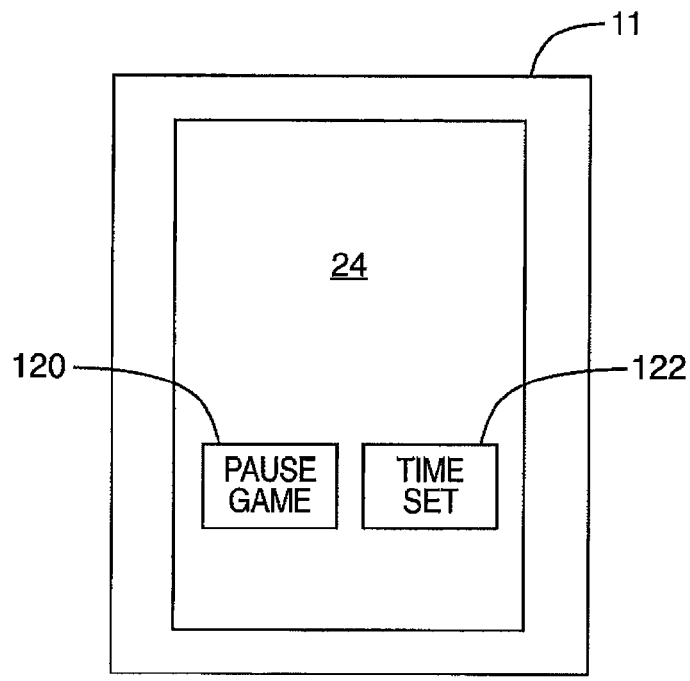
FIG. 6 illustrates the tablet having touch screen buttons allowing the player to pause play without the gaming machine terminating the session due to a period of inactivity.
Figure 7:
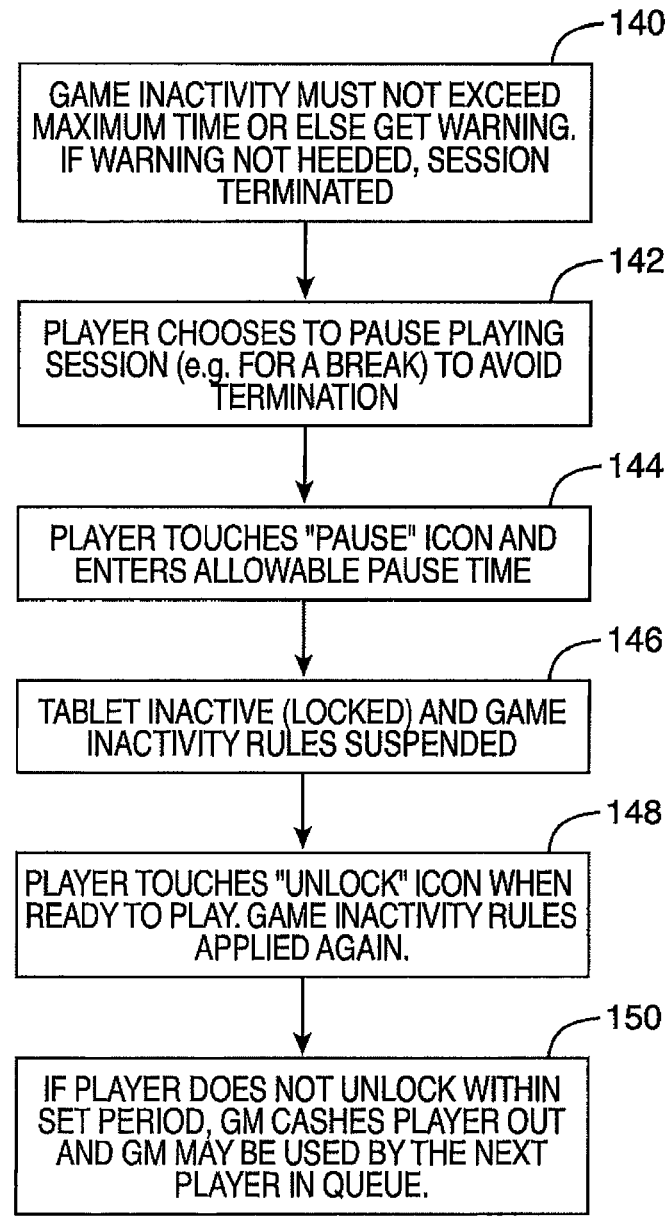
FIG. 7 is a flowchart showing steps performed by the tablet and gaming machine to allow the player to pause play without the gaming machine terminating the session due to a period of inactivity.

FIGS. 6 and 7 are directed to a feature that allows the player to pause the game a certain number of times during the session without the session terminating for inactivity.

FIG. 6 illustrates that the tablet 11 may display a pause game icon 120 and, optionally, a time-set icon 122. Touching the pause game icon 120 may give the player, for example, a 5, 10, or 15 minute period of allowable inactivity without the session being terminated. During this time, the tablet may be taken out of the allowable area without any penalty. When the player re-enters the allowable area and sends a communication to the gaming machine 10, the session will commence. This feature is further explained with reference to the flowchart of FIG. 7.

In step 140, the remote game program rules require that the period between games (i.e., game inactivity) does not exceed a maximum time or else the tablet will be commanded to display a warning message to the player to resume play. If the warning is not heeded, the session will be terminated.

In steps 142 and 144, the player, at any time, may touch a pause game icon on the tablet to suspend the game-inactivity-rules for a certain period of time, such as 5-15 minutes. The pause time may be selected by the player or fixed. The allowable pause time may change depending on the day, time of day, queued players waiting to play the gaming machine, etc.

In step 146, the tablet is now inactive (or locked) and the game inactivity rules enforced by the gaming machine are temporarily suspended. The pause does not extend the allowable session time.

In step 148, the player touches an unlock icon to resume play. The tablet sends a signal to the gaming machine that the tablet is now unlocked. The game inactivity rules are again applied. The player may be allowed a maximum number of pauses per session.

In step 150, if the player does not unlock the tablet within the allowable inactivity period, the session is terminated, the player is cashed out, and the next player in the queue may play the gaming machine.

Cashing out the player may be by crediting the player's account, or by printing a ticket by the gaming machine or other terminal, or by displaying a ticket on the player's tablet. A barcode on the ticket may be scanned at a redemption station to verify it and determine the amount. The verification code must match the player's tracking card code for the ticket to be redeemed.

Although a gaming machine has been used as the secure terminal that performs all the gaming functions, a terminal or server that cannot be directly played by a player may also be used.

Any game may be presented on the tablet, including video reels, video poker, keno, roulette, blackjack, or other games.
Remote Gaming Using Player's Own Mobile Device in Conjunction with a Gaming Terminal The tablet itself may be a commercially available tablet configured with mobile gaming application to couple with gaming terminal. The mobile gaming device may be any other portable computing device, including smartphones, personal digital assistants, laptop computers, etc. The players may use their own mobile device or other unsecure mobile device as the gaming device after the player has downloaded the application for the remote gaming program into their device memory (e.g. data storage device). The application may be available on-site or via the internet, such as from a commercially available application store such as the Apple, BlackBerry, or Google App Store. The communications link between the gaming machine and mobile gaming device may be established by using the device's unique serial number, MAC address, or other hardware signature. It may be common for the player to leave the venue or transmission reception area while carrying their mobile gaming device. The encrypted communications may be by Bluetooth, WiFi, or other supported method.

By the players using their own devices, they are familiar with their operation. Further, the casino does not need to supply the mobile gaming devices. Therefore, the remote gaming system may be readily implemented at virtually no cost, and increased play activity will bring in added revenue to the casino.

Embodiments described herein also apply to tablets and other mobile devices where the screen is a foldable screen having two sections, where one section of the screen is used for the game display and the other section of the screen is used for advertisements or as a user interface or for a bonus game.

The gaming machines with which the mobile gaming devices are communicating are licensed for the venue (e.g., a casino or video lottery terminal (VLT) establishment) in the particular jurisdiction (e.g., Nevada) in which they are operating. Since the mobile gaming device is located in the same jurisdiction, the gaming rules in that jurisdiction also apply to the remote play. For example, the rules for a particular jurisdiction may limit the number of gaming machines, including customized remote gaming devices. Since the mobile gaming device perform a user interface function, the mobile gaming device may not be classified as a gaming device and may need a special license by the jurisdiction. Thus the player may legally operate the mobile gaming device without it being licensed.

In one embodiment, a central server may also wirelessly communicate with the player's mobile gaming device, such as through the existing communications link already set up between the mobile gaming device and the gaming machine, or through a communications link set up between the mobile gaming device and the central server. The player may set up the general communications link with the central server by viewing available WiFi networks and selecting the particular network.

The mobile gaming device may even wirelessly connect from within a licensed gaming zone (e.g., a casino), via the internet and/or the casino's WiFi network, to a gaming machine that is located in another licensed gaming zone (e.g., another casino). This allows a player to play in a gaming zone of choice or convenience without causing either casino to exceed a regulated limit on the total number of authorized gaming machines in the casino. Therefore, the number of active players in a particular casino may exceed the physical number of gaming machines in that casino. Further the player may access games not available in the gaming zone where the player is located. The revenue in such case may be shareable using an agreed upon formula that involves two or more parties such as two casino owners or two VLT establishments/VLT operators. The casinos' respective networks keep track of all the transactions on gaming machines located in the casino and identify the particular tablets as well as the payouts for each tablet. If the player is located in one casino and remotely playing a gaming machine that is located in another casino, the player may still cash out in the local casino, since the payout may be tracked to the proper gaming machine and casino for fee sharing purposes. All the gaming machines are assumed to be linked via a network to one or more central servers in the gaming establishment or VLT operator establishment. The various casino networks may share information via the internet or by other channels.

Figure 8:
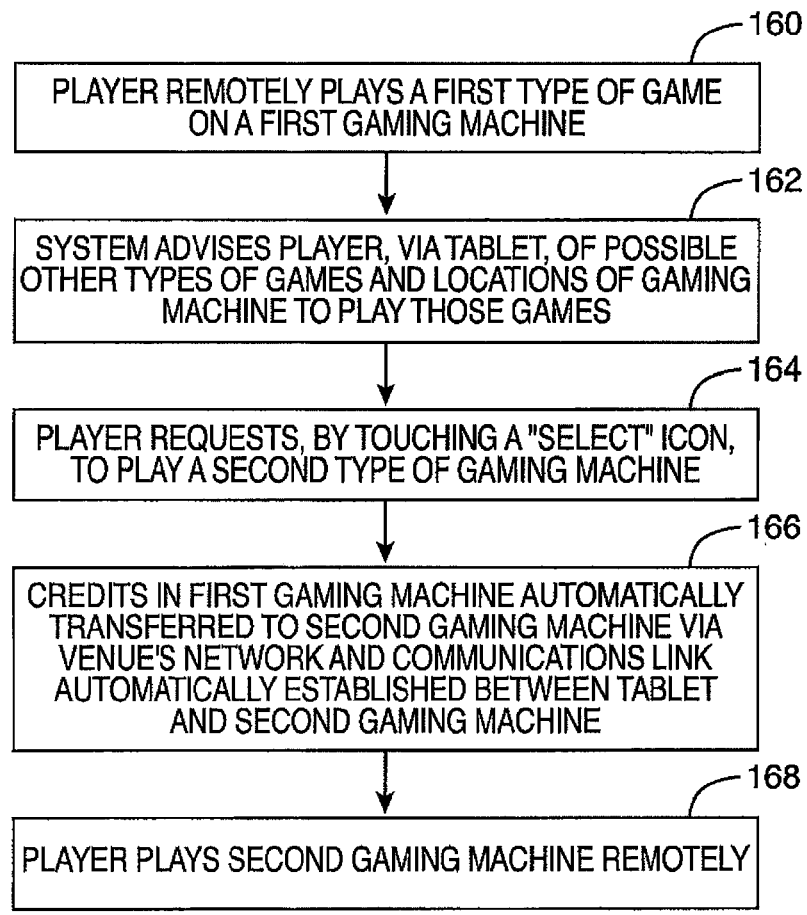
FIG. 8 is a flowchart showing steps performed by the tablet and the venue's system for allowing the player to remotely switch from one gaming machine to another.

An additional advantage of the mobile gaming device is that the player may walk to a casino staffer or kiosk for any help with the game rather than wait at a gaming terminal for a staffer to help.
Remote Gaming Method where Venue's System Recommends Different Games to Remote Player Using a Mobile Gaming Device FIG. 8 is a flowchart illustrating another feature of the remote playing system relating to remotely switching gaming machines.

In step 160, the player remotely plays a first type of game on a first gaming machine, as described above. The first game, which may be a video reels type game, will typically have a certain theme and bonus game.

In step 162, a central server may advise the player on other games offered by available gaming machines that may be played remotely and the locations of such gaming machines. The central server may recommend certain games and machines based on the player current live game data play, or based on other criteria. Further details of the recommendation process will be described herein. For example, central server may collect a pre-recommendation threshold amount of data prior to recommended other games. That is, central server may collect a minimum amount of data in order to make a recommendation. When the minimum amount of data (e.g. pre-recommendation threshold amount) has not been collected then the central server may make recommendations based on default configurations. The defaults configurations may be based on the location of the mobile device 10, selected game, and so on.

If the player has not used a player tracking card to play remotely, the player is anonymous, there may be no stored history of the player's gaming patterns in the casino's network, on central server, or on a third party server. In such a case, the server monitors (in real time or near real time) the anonymous player's current game factors, game features or gaming habits for the current session, such as the type of game being played, the frequency of play, and the betting amounts. These are examples only and other game factors will be described herein. Based on this game play data, the server may identify the player as a certain type of player and accesses a look-up table or an algorithm is performed to identify other gaming machines and games that are consistent with the player's current gaming pattern. Details of the recommendation process will be described herein. Such recommendations are then transmitted to the player. If the player has used her player tracking card, then the player's stored past gaming history (e.g. historical game play data) may also be used by the server to recommend other gaming machines and games to the player. The mobile gaming device's own GPS navigation system may be used to find the gaming machines, or another type of navigation system may be used. In some example, the player may be required to physically go to the new gaming machine to set up a playing session.

In some embodiments, the player may be playing a game on gaming machine 10 and may receive recommendations for additional games based on game play data, as described herein.

In step 164, the player may select one of the suggested or recommended games, offered by a second gaming machine 10, by touching a "select" icon on the tablet (or other mobile gaming device). The player may otherwise select a suggested game offered by a second gaming machine, such as via the first gaming machine 10 the player was originally playing on.

In step 166, after the player selects a suggested or recommended game offered by a second gaming machine 10 at 164, the player's credits are automatically transferred from the first gaming machine to the second gaming machine, so that the player does not have to redeem any credit ticket from the first gaming machine. In some embodiments, a ticket or other transfer mechanism may be used to transfer credits between game machines. Further, for remote gaming, the communications link to the second gaming machine may be automatically set up without the player having to physically register at the second gaming machine, since the communications link information is already known by the central server. The central server keeps track of the player's gaming history via the player's tracking card ID and data transferred from the networked gaming machines.

In another example of transferring credits, the remote player may not use a player tracking card and is, therefore, anonymous. The mobile gaming device may be linked to the first gaming machine at time T1 and the player may wish to switch to an available second gaming machine (based on the recommendation, for example), since the game the player wants to play may not be available on the first gaming machine. When the player selects to play the second gaming machine using the mobile gaming device, her credentials and registration of her mobile gaming device that were used to play the first gaming machine may be automatically migrated to the second gaming machine, such as through the casino's network or via wireless communications between the gaming machines and the mobile gaming device. The first gaming machine may then be unlocked (available) and the second gaming machine will be linked to the mobile gaming device. The migration may take place only if the player had enough stored credits in the first gaming machine to play the second gaming machine.

If the player had used her player tracking card to register with the first gaming machine and has an account with the gaming venue, the migration takes place without the need to check the credit balance on the first gaming machine.

In step 168, the player then remotely plays the second gaming machine.

In another embodiment, the player selects a recommended game, and the selected game may be downloaded via the network to the gaming machine the player is already playing. Therefore, no transfer of credits is required. After the player is finished with the session, the gaming machine automatically reverts back to the original game for the next player.

Additional details regarding analyzing a player's gaming preferences and suggesting games to the player may be found in U.S. application Ser. Nos. 13/387,780 and 13/387,790, both entitled Automated Discovery of Gaming Preferences, by Bharat Gadher et al., incorporated herein by reference and claiming the benefit of U.S. Provisional Patent Application Ser. No. 61/586,547. The present recommendation system may use the systems and methods described in that application for example.

In some venues, different gaming machines are owned by different entities. In the event that the player switches to different machines owned by different entities, a software program run by a server or the gaming machines determines the fees to be paid to each entity.

In one scenario, some games (and gaming machines) recommended by the server may not even be located in the same venue (e.g., casino) as the one in which the player is currently located. In such a case, the player may still select that game and play the game remotely. The local venue's network acts as an intermediary between the remote venue's network and the player's tablet. The various venues' networks may communicate via the internet or other system. A fee sharing agreement between venues may apply to the remote play. Therefore, if a casino is very crowded and the player's favorite gaming machines are being used, the player may remotely play a similar game or the same type gaming machine in another casino without leaving the first casino. Therefore, both casino's benefit from embodiments described herein, creating synergy.

Figure 9:
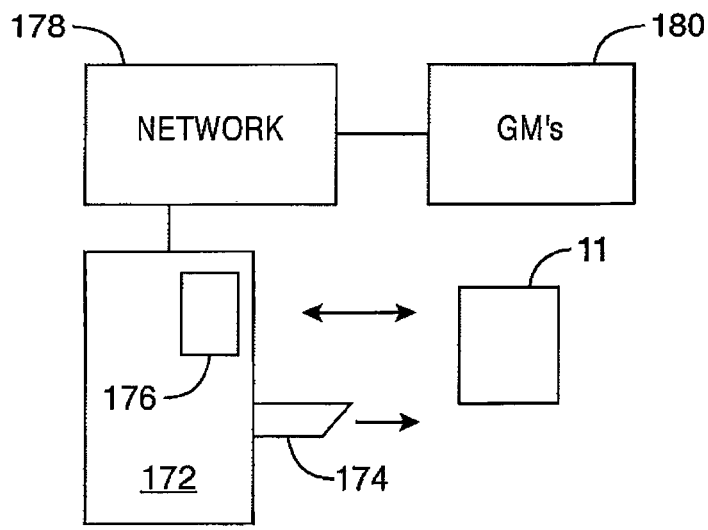
FIG. 9 illustrates the interaction between the tablet and a printer terminal for issuing a ticket.

Remote Gaming System Using Separate Terminal to Set Up Remote Play with a Gaming Terminal In one embodiment, as shown in FIG. 9, the gaming venue (e.g., a casino) provides a dedicated printer terminal 172 for the player to cash out and obtain a printed ticket 174 with a barcode encoding the player and monetary value. The player may enter a session ID into the terminal 172 via a touchscreen 176 or keypad, or the information may be entered via the tablet 11 to identify the player, session, or gaming machine. In another embodiment, a Near Field Communications (NFC) link is automatically established between the terminal 172 and the tablet 11 when the tablet 11 is brought near the terminal 172. The required information may then be automatically transferred between the devices without the player being required to manually enter any data into the printer terminal 172. NFC is a standardized protocol, and both devices may be programmed with the NFC protocol. The tablet's WiFi or Bluetooth transceiver will typically be utilized, and the terminal 172 has a similar capability. The terminal 172 then detects the credits via the venue's network 178 (coupled to the gaming machines 180) and generates the printed ticket 174 for the player. The player may then redeem the ticket 174 for cash at the venue's ticket redemption area.

Additionally, the terminal 172 may also serve as a registration terminal for setting up the link between the tablet 11 and any gaming machine connected to the network 178. Therefore, the player does not have to physically go to the gaming machine to set up the link. In one embodiment, the terminal 172 displays icons for each type of game offered. The player touches the desired icon, and the terminal 172 sets up the communications link between the tablet 11 and the gaming machine providing the game. Credits may be generated using a player tracking card and a casino account, or the player may deposit cash into the terminal 172. In one embodiment, the wireless communication is between the tablet 11 and the selected gaming machine. In another embodiment, the wireless communication is between the tablet 11 and the terminal 172, where the terminal 172 communicates with the selected gaming machine via the casino's existing network 178.

Additionally, the terminal 172 may also allow the player to remotely play games supported by other licensed venues, where the different venues' networks communicate with each other via the Internet or other communications system. All the networks can ultimately communicate with any gaming machine (and the terminal 172) connected to a network. The terminal 172 may display an assortment of games, some of which are not available in the local venue but which are available in other licensed venues. The player may select any of the games. If the player plays a game that is supported by a different venue, a fee sharing agreement between venues may determine how to allocate any revenue. Therefore, if a player wants to play a certain game but all the associated gaming machines in the local venue are being used, the player may remotely play the game on a gaming machine located in a separate casino. This effectively increases the number of gaming machines in the casino. Thus there is synergy since both casinos profit. The terminal 172 may act as a communications hub for the tablet (e.g., using WiFi signals) or another communications method may be used.

The terminal 172 may also allow a player to play games anonymously, such as for example, without requiring registration of personal information. The player may be assigned a unique identifier, or other identification process, that enables terminal 172 to track the anonymous player's game play. This may include tracking the anonymous player's credits, for cash-out and transfer between gaming machines, while still allowing the player to play anonymously. Accordingly, a player can remain anonymous and still can be awarded credits, which will be associated with an indirect identifier, for example.

In a remote multiplayer context (e.g. multiple players playing a game together via mobile gaming devices 11), as described herein, the terminal 172 may associate each mobile game device 11 with one or more regulated locations. The terminal 172 is operable to dynamically construct a multiplayer gaming network between two or more mobile gaming devices 11 over one or more regulated locations. The terminal 172 may generate an audit log and track the location of mobile gaming device 11 to be able to show that during the multi-player session each of the players was in regulated location during all of the time that they were part of the multi-player gaming session. This may provide be an audit trail for regulatory purposes. Geo-fencing, as described herein, may be used to track and monitor the location of players. That is, geo-fencing may be used to determine if a mobile gaming device 11 is inside or outside regulated area. The terminal may also be used to implement maximum number of player limits for a multi-player game.

The terminal 172 may also provide a gaming session manager. The game session manager may continuously monitor and validate the location of participating players (e.g. the location of the associated mobile gaming device 11). If one or more of the players ceases to be in a regulated location, then the session manager terminate the player's ability to continue participating in the session. If there are only two players then the whole multi-player gaming session is terminated, as only one player would remain active in the session. In some embodiments, each location may have a gaming session manager to monitor and validate players for that location. The terminal 172 may coordinate the transfer of credits between gaming machines 10, locations 10, venues, players, and the like. In a multi-player session, the players may join the session using a gaming machine 10, a mobile gaming device 11, or a combination thereof.

The terminal 172 may implement continuity of service and the uninterrupted communication link functionality as described herein.

Terminals 172 may be at one or more networked locations/venues. Each terminal 172 may create and provide communication links to mobile gaming devices 11 and machines 10, to enable remote gaming between mobile gaming devices 11 and gaming machines 10. Players can play at gaming machine 10 or on mobile gaming device 11. Terminal 172 is operable to transfer credits between gaming machines 10 and mobile gaming devices 11.

Figure 10:
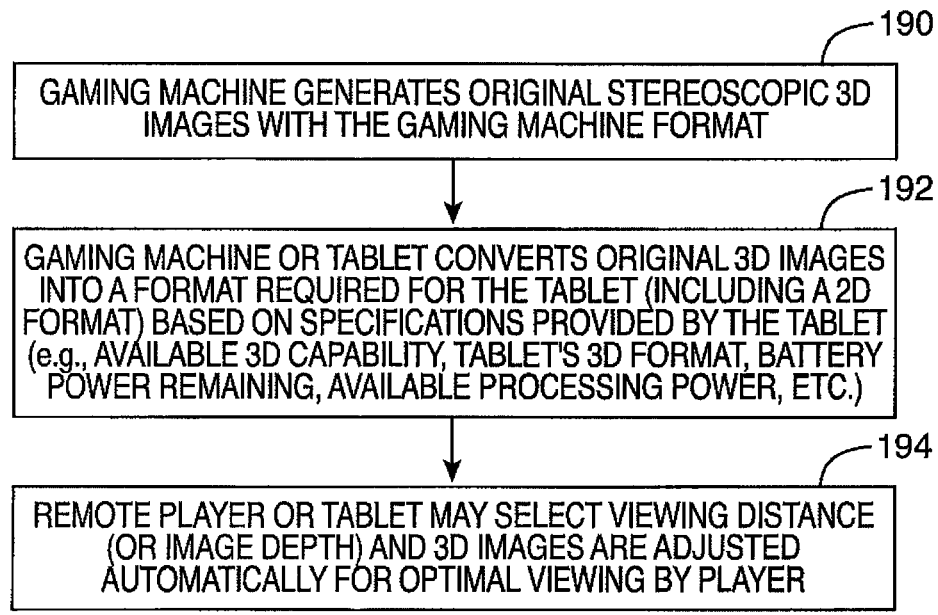
FIG. 10 is a flowchart showing steps performed for converting original stereoscopic images into a format (2D or 3D) compatible with the tablet.

Remote Gaming System Allowing Adjustment of Original 3D Images for a Mobile Gaming Device FIG. 10 identifies certain steps used when the gaming machine generates stereoscopic images for 3D viewing.

Video gaming formats may display the game on the gaming machine screen in 3D (step 190). A standardized video format may be adopted for gaming machines. Such 3D viewing may require a special lenticular lens on the screen so that the player sees a slightly different image with each eye. The screen contains narrow linear lenses extending in the vertical direction, where lenses that direct one image to the right eye are interposed between lenses that direct another image to the left eye. The image generated by the screen is a composite of two different offset images: one to be perceived by the right eye (behind one set of the lenses) and one to be perceived by the left eye (behind the other set of lenses). The two images are stereoscopic and are perceived by the viewer (at the correct distance) as a single 3D image. Such 3D image generation is well known. Other gaming machines may require the player to wear special glasses, whether they be polarized, or colored, or electrically synchronized with the display.

Some tablets 11 do not have the lenticular lens screen and are unable to display the 3D image. Therefore, such tablets must only display a 2D image. Even a tablet that has a lenticular lens may still display a 2D image if the two offset images are identical. Some tablets 11 or other mobile gaming devices 11 may display a 3D image but in a different format than the gaming machine 10. For illustrative purposes 3D tablets are provided by Qualcomm and GADMEI, as non-limiting examples. A tablet that has a lenticular lens may only be able to display 3D images in a particular format for that tablet.

Therefore, when transmitting the 3D video display information by the gaming machine to a standard tablet (or other off-the-shelf mobile device), problems arise since the tablet may not be configured to display an image that can be viewed by the player in 3D. Further, the video formats for the server or the gaming machine may be different from the format used by the tablet to display video.

In step 192 of FIG. 10, to solve such problems related to 3D video if the tablet does not have 3D capability, the server or gaming machine converts the original 3D video format into a standard 2-D format that can be processed by off-the-shelf mobile gaming devices (tablets, smartphones, etc.). Alternatively, the remote gaming program downloaded into the mobile gaming device includes one or more programs for converting the original 3D video format into the appropriate 2D video stream for the mobile gaming device. The mobile gaming device may not have the computing power to convert the formats in real time, however. If such is the case, the server or gaming machine detects the type of mobile gaming device used (based on specifications transmitted by the mobile gaming device) and, based on that information, determines that the server or gaming machine processor is required to convert the 3D video format into the appropriate 2D format and transmit the 2D format to the mobile gaming device.

In other embodiments, the gaming machine 10 or central server stores different 3D versions or formats of the same game. As noted, mobile gaming device 11 may include a 3D display that may display 3D images with or without glasses. The gaming machine 10 or central server may receive configuration data from the mobile gaming device 11 to determine a particular format optimized, compatible, or preferable for the mobile gaming device 11 from the available versions or formats of the game. That is, gaming machine 10 or central server detects configurations for the mobile gaming device 11 and provides the appropriate 3D version. The gaming machine 10 or central server may include a library of device limitations and requirements to determine the appropriate 3D version. Accordingly, gaming machine 10 or central server provides a version optimized for the capabilities and requirements of the mobile gaming device 11 from the available versions of the game.

Some mobile gaming devices may be able to display a 3D video image to the player in a special format. For example, the tablet may have a lenticular lens overlying the screen. The tablet's required 3D video format may be identified to the server or gaming machine, and the conversion into the compatible format may be performed by the server or gaming machine. In some cases, the formats will be the same and no conversion needs to take place.

In one embodiment, when the mobile gaming device connects to the gaming machine, the mobile gaming device's downloaded software controls the device to send a message to the server or gaming machine describing what type of 3D display it supports, if any, and what format it requires. The server or gaming machine then determines whether the mobile device is fast enough to do the work of the conversion on its own or if the server or gaming machine is required to convert the image for transmission.

Once the determination has been made, the server or gaming machine either converts the images and transmits them to the mobile device or sends the original images to the mobile gaming device to be converted to the required format.

In some systems, the mobile gaming device generates the video signals internally based on a locally stored graphic program and does not receive real-time video signals from the server or gaming machine. In that case, the mobile gaming device just receives high level commands from the server or gaming machine to display a stored user interface followed by displaying the running of the stored game routine, the final result, and any award. The server or gaming machine may initially upload the required displays and routines to the mobile device prior to the first game commencing. Therefore, what the remote player sees may be different from what a player would see if playing at the gaming machine in a conventional manner. In this situation, the mobile device might still require some format conversion of the original display information for displaying in 2D or 3D. This work could be done by either the mobile gaming device or the server/gaming machine, depending on the capabilities of the mobile gaming device. Like the situation presented before, the server/gaming machine may ask the mobile gaming device what format it supports and determine if it is required to do any needed conversions.

In some embodiments, the player may need to use special glasses for viewing the 3D image, or a temporary lens overlay may be provided by the venue.

Further details regarding conversion of 3D formats between different devices (not for gaming) include US Publication 2011/0032329, incorporated herein by reference.

Generally, the gaming machine 10 screen is much larger than the tablet 11 screen. The lens and 3D images on the gaming machines are optimized for a particular viewing distance. Typically, the remote player will be closer to the tablet screen than the typical viewing distance of the gaming machine screen. Accordingly, if the original stereoscopic images were displayed on the tablet 11, the resulting image would not be an accurate representation. In one embodiment (step 194 of FIG. 10), the tablet's software includes a provision for the player to select a viewing distance (which directly corresponds to the player selecting an image's depth). The image processing adjusts the image to be optimally displayed to the player at the desired viewing distance. The optimal viewing distance is affected by the lens system used and the distance between the player's left and right eyes. In an example, the tablet 11 displays a "viewing distance" menu and the player selects the desired viewing distance by selecting an appropriate icon, or the tablet software automatically determines the optimal viewing distance. This parameter is then used to adjust the original stereoscopic images to be optimized for the tablet. The adjustment may be performed by the tablet or by the gaming machine/server.

Processing 3D images and videos requires more processing power than for 2D images (which translates to more battery usage). In one embodiment, the mobile device checks its available battery power or battery life and adjusts the 3D processing, such as by switching to a 2D display, or informs the player and gives the player the option to continue in 3D or switch to 2D. If the player selects to switch to 2D, the gaming machine may be commanded by the tablet to start sending only 2D images. Another option is to communicate the available power in the tablet to the gaming machine, and the gaming machine will send a message to the player identifying the optimal display format and automatically make the adjustment.

These embodiments apply to multiview 3D as well as to other formats of 3D. Multiview Video Coding (MVC) is a video compression standard that enables efficient encoding of sequences captured simultaneously from multiple cameras using a single video stream. MVC is intended for encoding stereoscopic (two-view) video.

Figure 11:
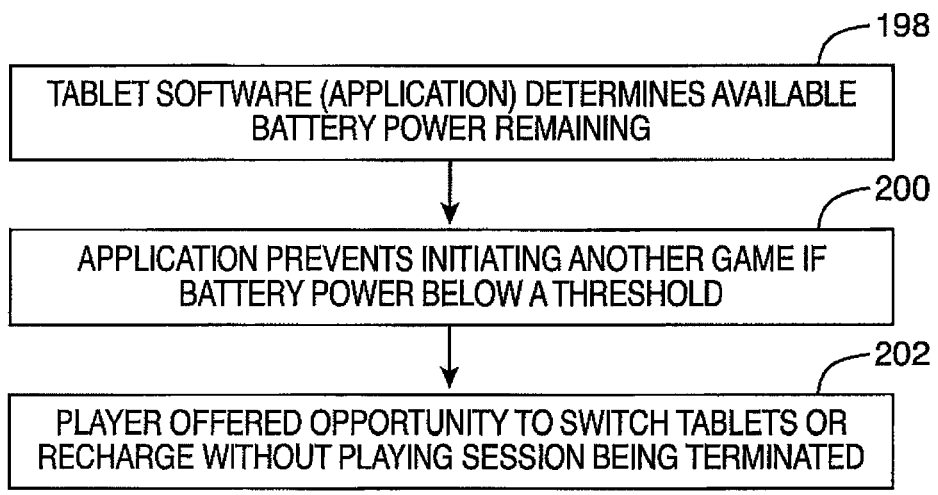
FIG. 11 is a flowchart showing steps performed when the tablet battery power has fallen below a threshold so that a game is not interrupted.

FIG. 11 is a flowchart identifying various steps used when the tablet's battery power is low. It is important that the player is warned well ahead of time if the tablet's battery power is running out. The application (on the mobile gaming device) will detect the tablet's available power (step 198) and alert the player of the playing time remaining so that the player may exit the application in the proper way. Tablets may already include a battery level monitor. If the player continues to play after the warning, it is important that the application forces the termination of play between games rather than during a game. The term "during a game" refers to the time between the player initiating a game and the time that the player is informed of the outcome. Accordingly, the application determines when the battery life is below a threshold (e.g., 5 minutes) and prevents the player initiating a new game (step 200). The remaining battery life should be sufficient for the player to cash out at a terminal or at the gaming machine. When the battery power is low, to allow the player to keep playing the same gaming machine without having to again reserve the gaming machine, the application displays a message offering the player the option of switching to another mobile gaming device (step 202). If the player accepts, a sequence of steps involving the player, the gaming machine, and the network is carried out, similar to steps already described, to switch the player to another mobile gaming device within the same playing session.

Multi-Player Gaming Using Mobile Gaming Devices

A group of players entering a gaming establishment together may like to play a social, tournament, community, or progressive game. Such multi-player games conventionally require the players to sit in front of different linked gaming machines. The group of players would therefore be separated. By using the tablets, the players may sit together around a gaming table, at the bar, or in a specific area. The game could be played within an area designated by the tablet. The area may have a large overhead screen that displays social, tournament, community, or progressive elements of linked gaming such as a leader board, progressive meters, social/community/bonusing, etc. The various tablets would wirelessly communicate via the associated linked gaming machine, the local host, or through cellular communications to the central system hosted in the data center. The central server, or one of the gaming machines acting as a server, may accumulate the data for the common display. If the primary communication is lost, then the game can continue temporarily with local buffering in the tablets or a backup communications method can be used, such as cellular, WiFi, Bluetooth, etc. The central bank (a memory) for the players' credits could be on the site server and the ability to continue playing when there is a communication break would be very useful.

A group of players in a casino could use their mobile devices to construct a network to play a multiplayer game. A central server (e.g. terminal 172) may manage network creation, discovery of players and games, joining a multi-player game, and players leaving network. This may apply to real-time multiplayer games.

This multi-player gaming can employ various combinations of tethering aspects and recommendation aspects in regulated gaming venues detailed herein.

Example Systems and Methods for Recommending Different Games

Further embodiments for recommending different games to players, such as at step 162 of FIG. 8 will be described herein. The recommendations may be provided to a remote player using a mobile gaming device. The recommendations may also be provided via a gaming machine or other mechanism in some example embodiments.

Figure 12:
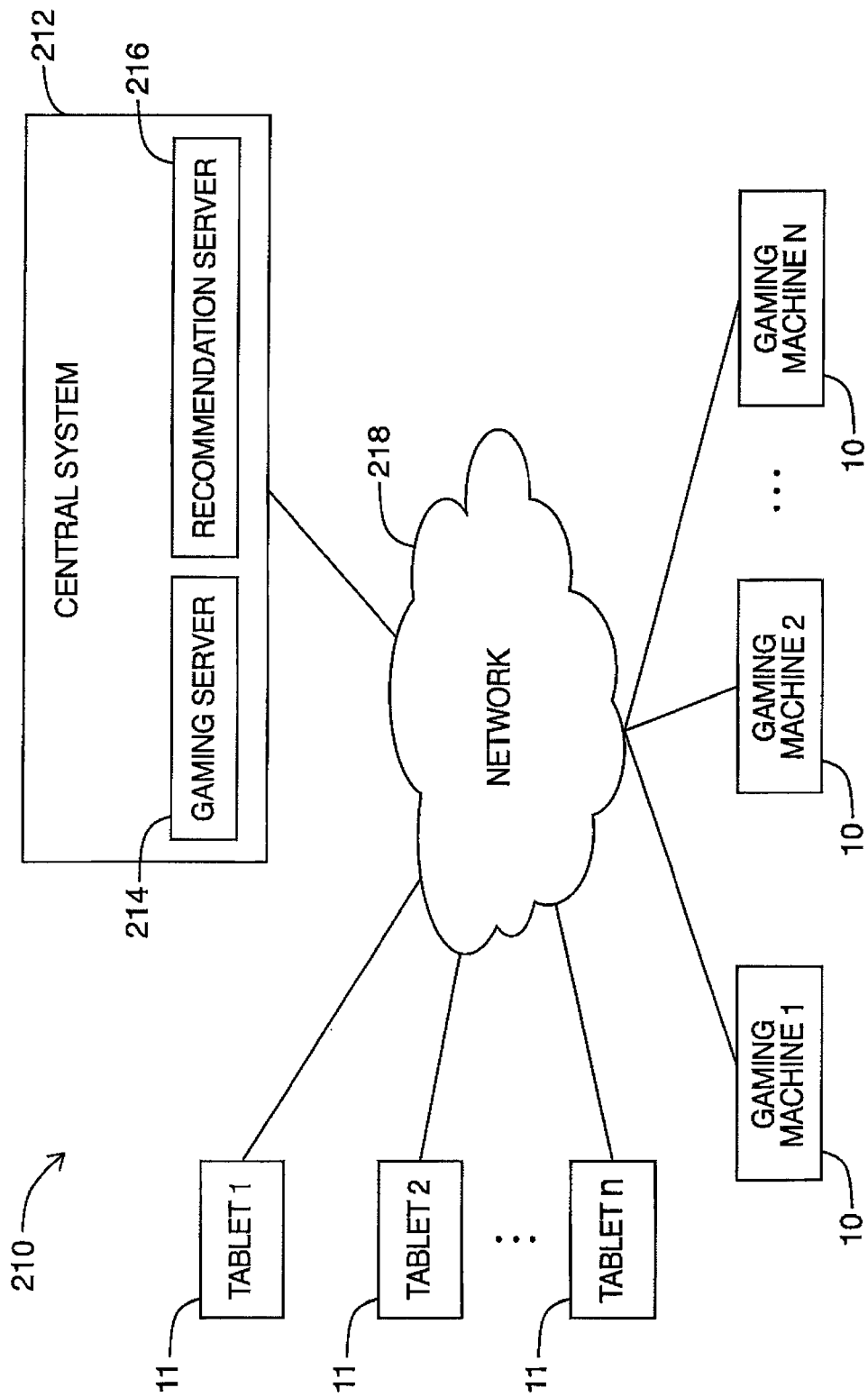
FIG. 12 illustrates a remote gaming system according to some embodiments.

FIG. 12 illustrates a gaming system 210 for providing recommendations of suitable games for a player according to some embodiments. The gaming system 210 may be used for remote gaming where the player access a gaming machine 10 via a mobile gaming device 11 as described herein.

The computer system may operate anonymously, for instance, where the game player is unidentified or unrecognized by the gaming system. Alternatively, the game player may be identified to the gaming system, for instance through a game player account, a responsible gaming account, a social network account, or other suitable indicia of identification.

In one embodiment, player game session data is used by gaming system 210 to build a gaming and play behavior model that represents different aspects such as play, game and wagering behavior. As used herein, gaming and play behavior is represented data related to any one or more of a plurality of different game features. Game features may include, for instance: game session length; wager denominations, play rates (number of games played per time segment), typical bonus values, and other features as described below. For example, the model could include a cluster of games that are suited to players that like to play games for a shorter time with large amounts of money wagered. Another cluster includes games that are more suitable for players that like to play for longer times with smaller amounts of money. In one embodiment, when a player begins to play a game, data related to the player's game playing behavior is detected in real-time from a mobile gaming device 11 or gaming machine 10, and the detected data is analyzed. Based on the analysis of this data, the player can be classified, in real time, into one of the existing clusters. Once classified, the games associated the most relevant cluster are suggested to the player via a mobile gaming device 11, or gaming machine 10, for example.

The data analysis allows the gaming computer system 210 to create at least one game player type. In one embodiment, the game player type is an association or collection of one or more game factors. The game player type may be associated with a cluster or model, where the model may be collection of one or more game factors This association or collection may represent a particular model of playing behavior. For instance, the data analysis may show that certain players prefer games that are quickly resolved (from start to finish) and have small wager amounts. Data suggesting this trend could be used to create a game player type or model based on this trend. In one embodiment, the game player type or model is a collection of data including an identifier that allows the computer system to identify the collection of data, and, optionally, that the data provides a game player type or model. The game player type or model may also include data which indicates the game factors defining the particular features of the games to be affiliated with the game player type. These features may be identified in the affirmative, for instance as features that should or are preferably present in the games to be affiliated with the game player type. Alternatively, or additionally, some features may be identified in the negative, for instance features that should not be or are preferably not present in the games to be affiliated with the game player type.

A central system 212 may establish a wireless connection with mobile gaming device 11, gaming machine 10, or both to collect game play data and provide recommended games. The central system 212 includes a gaming server 214 and a recommendation server 216. The central system 212 may be coupled to a network 218. The mobile gaming device 11 and gaming machine 10 may also be coupled to the network 218. The network 218 may include a social media network or other suitable network such as a WAN or LAN. The network 218 may include wireless capabilities to connect to one or more of mobile gaming device 11, gaming machine 10, and central system 212. Game play data may be collected from the gaming machines 10 or mobile gaming devices 11 and sent through the network 218 infrastructure back to the central system 212. The gaming machines 10 may be wired or wireless mobile gaming devices in any type of gaming setting, for instance dedicated electronic gaming machines as are commonly found in casinos and other venues.

Figure 13:
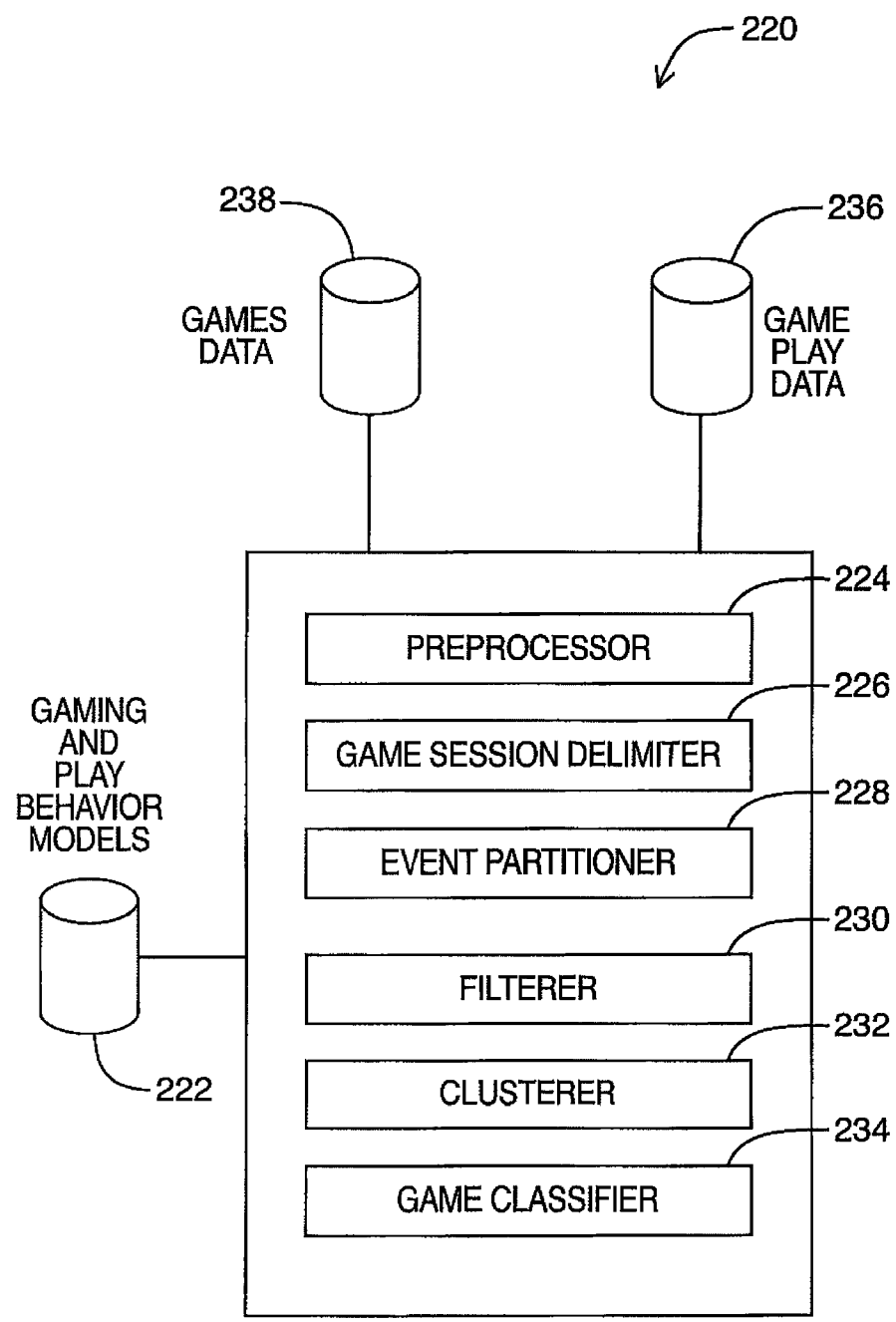
FIG. 13 shows the main components of the computer system that generates the gaming and play behavior models according to some embodiments.

FIG. 13 shows the main components of the computer system 220 that generates the gaming and play behavior models 222, including a preprocessor 224, a game session delimiter 226, an event partitioner 228, a filterer 230, a clusterer 232, and a game classifier 234. The system 220 may be provided with access to two data storage devices, a games database 238 and a game play data database 236. The game play data database 236, may include raw historical transaction records collected from gaming machines 10 and mobile gaming devices 11 during past sessions and real time or near real time data collected from gaming machines 10 and mobile gaming devices 11 during current game sessions. In one embodiment, the data for the historical transaction records may be stored in the form of journal files and includes historical raw play data. In particular, the raw historical transaction records may include data related to player wagering and other real-time game play characteristics including game selection; amounts of incremental wagers; wagering frequency; elapsed time; reaction to bonus rounds; reaction to progressive output as well as others. The games database 40 includes information on game titles available to players along with game data and features such as themes, denominations, characteristics, etc. The game titles may be associated with gaming machines 10, venues, locations, and the like to determine whether the game titles are available to the mobile gaming device 11 based on its location. Game characteristics that may be stored in the games database 40 may include average game speed; average wager amounts; average wager rate; presence and frequency of bonus rounds; presence and frequency of progressive outputs; odds of winning; prize distributions, and others.

The computer system 220 performs a training process to generate the gaming and play behavior model 222 using a game play data database 236. This training may use a temporal representation of the gaming session data within the game play data database 236. A gaming session may be partitioned into session events. The session events may be of equal size or length. The size or length may be based on a number of game actions. For example, each session event may include 12 actions. The size or length may also be based on a period of time. For example, each session event may include data for be a predetermined time period. This may enable comparisons between sessions events for cluster analysis despite the corresponding gaming sessions having differing and varying lengths of time or number of game actions. That is, computer system 220 partitions or chunks gaming session data into session events of equal size or length. The gaming session data for an individual session may be represented as a data structure that appends many consecutive session events to create records of gaming behavior over time. The time of an individual session will vary depending on the number of appended session events.

Figure 17:
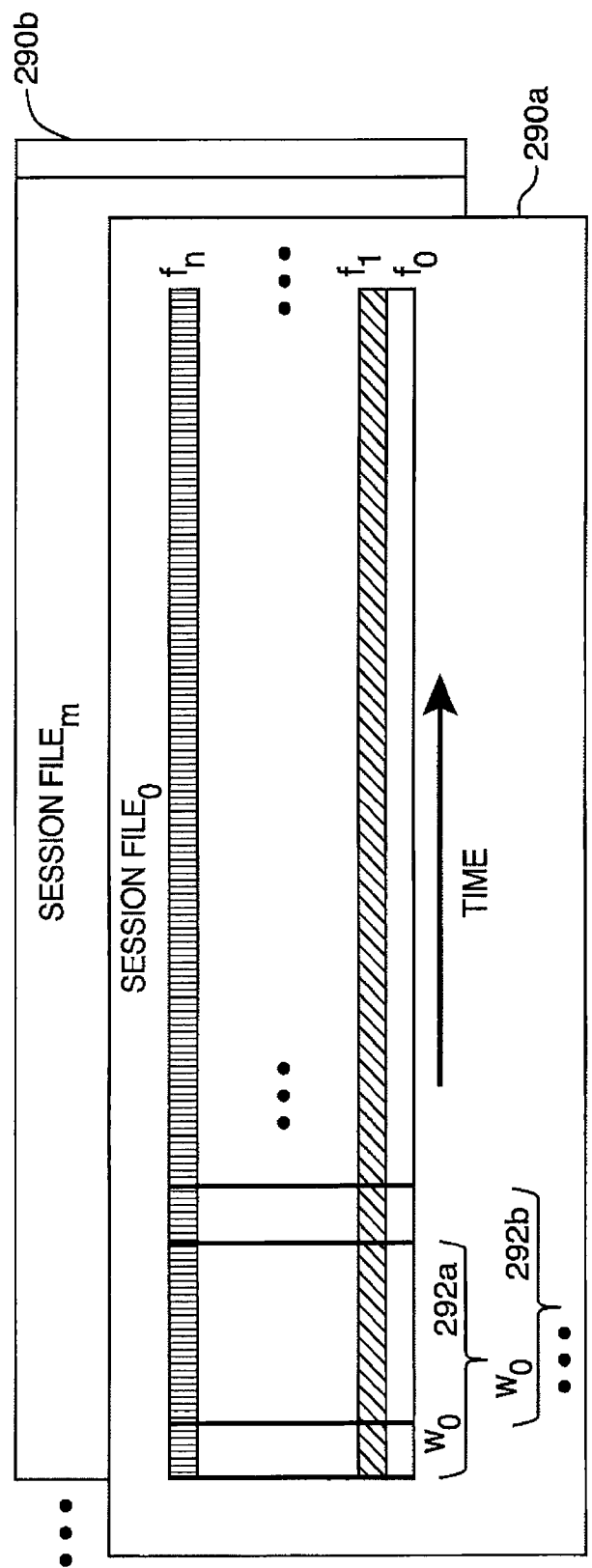
FIG. 17 provides an example temporal representation of the gaming session data according to some embodiments.

FIG. 17 provides an example temporal representation of the gaming session data. In this exemplary process, the game play data is pre-processed (by preprocessor 224) and partitioned into different individual gaming sessions 290a, 290b (by game session delimiter 226). In this embodiment, each gaming session 290 represents a continuous game play, meaning a series of games that were played in a generally uninterrupted fashion. Alternately, each session might represent a particular time period of game play, for instance 15 minutes, 30 minutes, an hour, or another suitable time period. In another alternative, each session may represent a particular number of rounds of a game, for instance 5, 10, 20 or another suitable number of rounds of a game. A gaming session 290 may be represented by data structure that appends many consecutive session events (or windows) to create records of gaming behavior over time The session events 292 may be represented using a window style or other graphical approach which includes a variety of different "game features" (y-axis, f0 . . . fn). In one embodiment, data for 28 different game features is tracked for each gaming session. Exemplary game features include: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

The x-axis represents time in the gaming session. The game features may be organized into session events or time windows w0, w1 showing the occurrence of the game features over time. The occurrence of game features may be referred to as a game actions and may be used to partition individual gaming sessions in game events. Collectively the representation of the data allows for analysis and detection of "play patterns" through the data and through the various sessions. The size of the events is adjustable and defines a minimum number of incidents or actions necessary to categorize behavior. For instance, in one embodiment, the event size may be set to, for instance, 12 play actions, so that whenever there are 12 play actions in an game event the game features may be used as part of the characterization of the game play behavior. This representation has several advantages: 1) Captures behavior as temporal patterns of the play features; 2) Variations in session length are not a factor (so long as sessions meet the minimum length) as the sessions are partitioned into game events. 3) Game titles can be introduced to map player behavior into game preferences.

Figure 14:
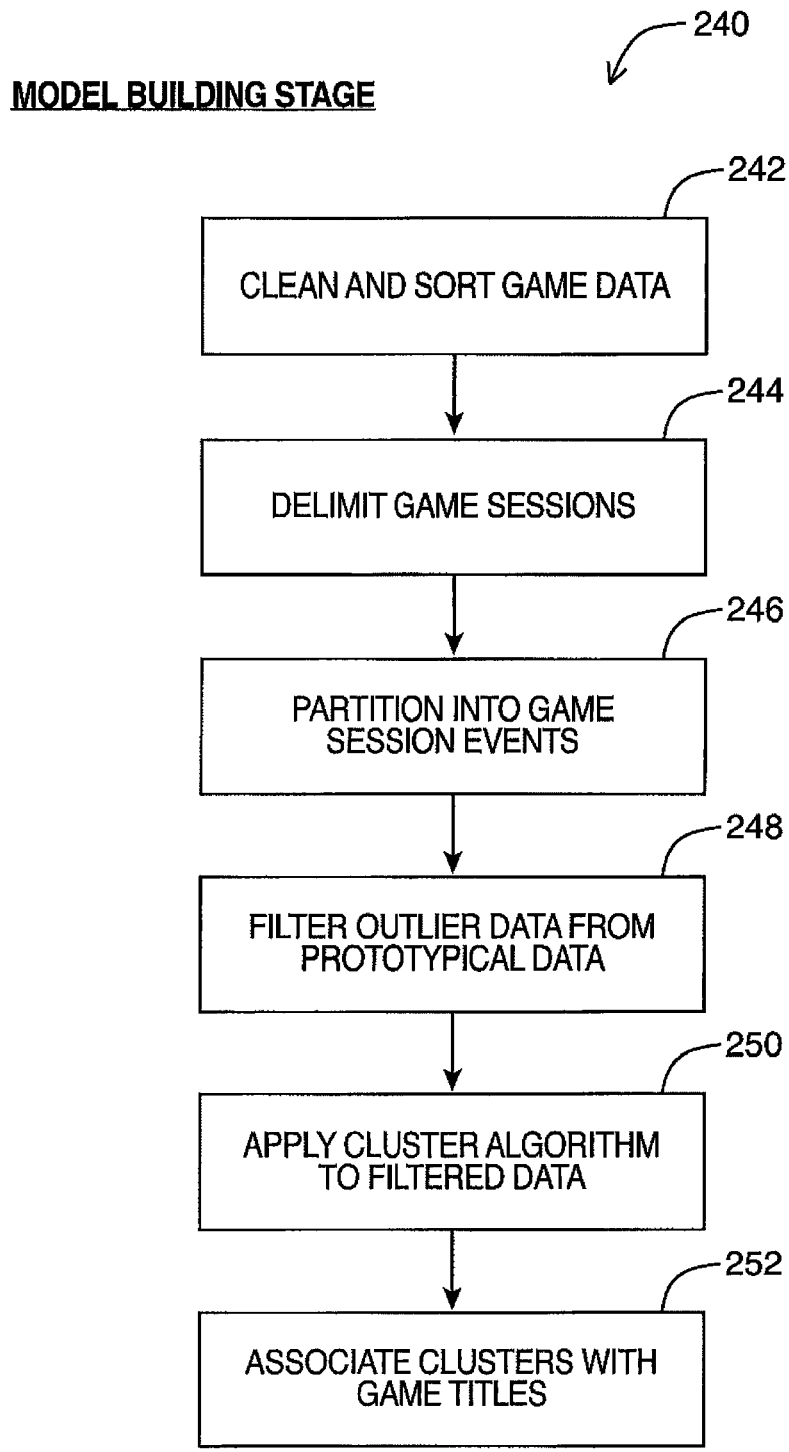
FIG. 14, there is shown a flowchart of a process for generating the gaming and play behavior models according to some embodiments.

Referring now to FIG. 14, there is shown a flowchart of a process 240 for generating the gaming and play behavior models 222 of FIG. 13.

At 242, the preprocessor 224 is operable to clean and sort data. The game play data 236 may be collected in a format that is not intended for cluster analysis. For example, the game play data 236 may be in a format suitable to communication and exchange between gaming machines 10, mobile gaming devices 11, or a combination thereof. The preprocessor 224 may filter out extraneous data points and fill in missing data points. For example, timestamp data points may include milliseconds which may not be required for the cluster analysis. The preprocessor 224 may filter out the milliseconds. As another example, the game title may be another data point but it may be in a format suitable for processing by the gaming machine 10 but not for cluster analysis. The preprocessor 224 may modify game title and break apart sub data points to construct a game title suitable for cluster analysis. The preprocessor 224 is further operable to sort the mass amounts of game play data 236 by gaming machine 10 identifier, timestamp, game title, venue, and the like. Preprocessing the data may involve any one or more of the following subtasks: noise reduction or removal, identification and removal of outlying data entries, and resolving inconsistencies in the data. Preprocessing may also refer to taking data in a raw or uncleaned state or form and converting the data into a form that is better suited for a mining or modeling task. For instance, preprocessing may include processing or removal of extraneous or unnecessary data such as meta data, tags, or empty fields.

At 244, the game session delimiter 226 is operable to delimit multiple gaming sessions from the game play data 236 into individual sessions. The game session delimiter 226 partitions the game play data 236 into individual sessions using heuristics and rules. For example, the partitioning may be based on machine identifier, time stamps, time outs, cash in actions, and so on. A gaming session is a sequence of game actions over time. An individual session may include multiple games, or a single game. An individual session is associated with a player. The player may be anonymous or known to system 220. An anonymous player may be identified based on a machine identifier associated with the mobile device 11. The machine identifier may be used to connect sessions involving the anonymous player. The machine identifier may act as a thread between games and gaming machines 10.

At 246, event partitioner 228 is operable to partition the individual gaming sessions into session events. This may also be referred to as applying a tap delay line to session events. A tap delay line, window or session event may comprise a set of game actions (spins, bets, outcomes, etc.) that take place consecutively over time. Each window or session event forms a record that the clustering algorithm can accept to recommend games. As noted above, each session may include an equal number of actions. The event partitioner 228 generates a data structure by appending consecutive session events to create a record of the session over time. The clustering algorithm is applied to the session events. If an individual gaming session does not partition equally into session events then the extra actions may be excluded or discarded from the cluster analysis. For example, if there are 38 actions in an individual session and each session event includes 12 actions then the remaining 2 actions may be discarded or excluded.

At 248, filterer 230 is operable to filter outlier game play data points of session events from prototypical game play data points of session events. The cluster algorithm may only be interested in typical behavior and not bizarre or atypical behavior.

At 250, clusterer 232 is operable to apply a cluster algorithm to filtered session events to generate clusters or models 22 based on the analyzed game play data. A set of clusters may be a set of centroids that represent the most typical play patterns. The clustering approach is designed to be a flexible tool, that scale and needs no choice of number of centroids a priori. As described herein, a cluster or model is collection of game features. A cluster may also be associated with a game player type, as described herein.

Clusterer 232 is a software application or computer program component used to perform a statistical data analysis. In one embodiment, the clusterer 232 is configured to perform a cluster analysis, for instance to group session events into different clusters. Additionally, the clusterer 232 may be configured to analyze the session events and identify the different clusters based on this analysis, before grouping the data into the different clusters. Any suitable clustering algorithm may be used for performing the statistical data analysis and grouping the data into appropriate clusters to form a cluster model. Preferably, a scalable clustering approach that allows for a selection of the number of clusters and support for automatic game feature (also referred to as game factors herein) selection is used. In one embodiment, a cluster model is developed automatically using clustering techniques operative for handling and working with large datasets. Preferably the data analysis techniques support streaming (i.e., where the cluster model is updated as new data supports development or modification to the clusters, for instance based on drift in the underlying game play data and behavioral concepts). As used herein, the cluster model includes the identification of different clusters as well as the features relied on to distinguish these clusters.

In one embodiment a two stage hierarchical training process is employed. The clusterer 232 generates a gaming and behavior models 222. The models 22 includes a number of clusters where each cluster represents a set of game features. Suitable game features are described throughout this disclosure. Groups of clusters may be assembled and assigned to particular gaming trends or behaviors. For instance, a group of clusters may be assembled to identify game players that prefer short games with relatively low wagers. Another group may be assembled for game players that prefer games with multiple rounds of betting or larger wager amounts.

As an alternative to or in addition to clustering, the statistical analysis may employ other data analytic techniques such as factor or regression analysis.

At 252, game classifier 234 is operable to associate clusters with game titles of games database 238. Each game title may be associated with a set of game features. Game classifier 234 is operable to map the set of game features for a game title to the clusters or models (which are in turn a collection of game features) to associated a set of games with each cluster or model. The game titles may be associated with gaming machines 10, venues and locations. This may enable of further filtering or processing to provide recommended games that are available to specific mobile game devices 11.

An anonymous recommendation may be possible using the session events as only a small amount of collected real time game play data (e.g. a single session event, or a few session events) is required to start the recommendation process. As cluster analysis is built using session events once a session event is collected it can be used to determine the closest cluster or model to start recommending games to the player. As additional session events are collected the recommendations may be refined as different clusters may be closer models of the player's gaming behavior. The data representation append many consecutive session events to create records of what happens over time. A large database of the data representations are used to determine cluster models. By looking at which games are typically played 'near' each centroid the system then knows what to recommend as an unseen player progresses through time.

A detailed example implementation of parts of the method 240 (FIG. 14) for generating the gaming and play behavior models 222 will be described herein. This is a non-limiting example for illustrative purposes.

A Symbiotic Evolutionary Subspace Clustering Algorithm (ESC) may be used as means for multi-objective optimization. ESC is based on a multi-objective algorithm which searches for optimal trade-off solutions within the two or more objectives, rather than converting multi-objectives problem to a single objective problem as done in more traditional methods. In the case of ESC, a two-population model may be used to generate candidate cluster solutions from a pool of subspace cluster centroids. The subspace cluster centroids may be generated in a pre-processing stage, whereby the game play data input is broken down to 1-dimensional attribute files (e.g. game features or game factors), each of which fed into a clustering algorithm and the resultant 1-dimensional attribute-by-attribute centroids are then outputted to a grid that forms the basis for the subspace cluster centroids.

Figure 18:
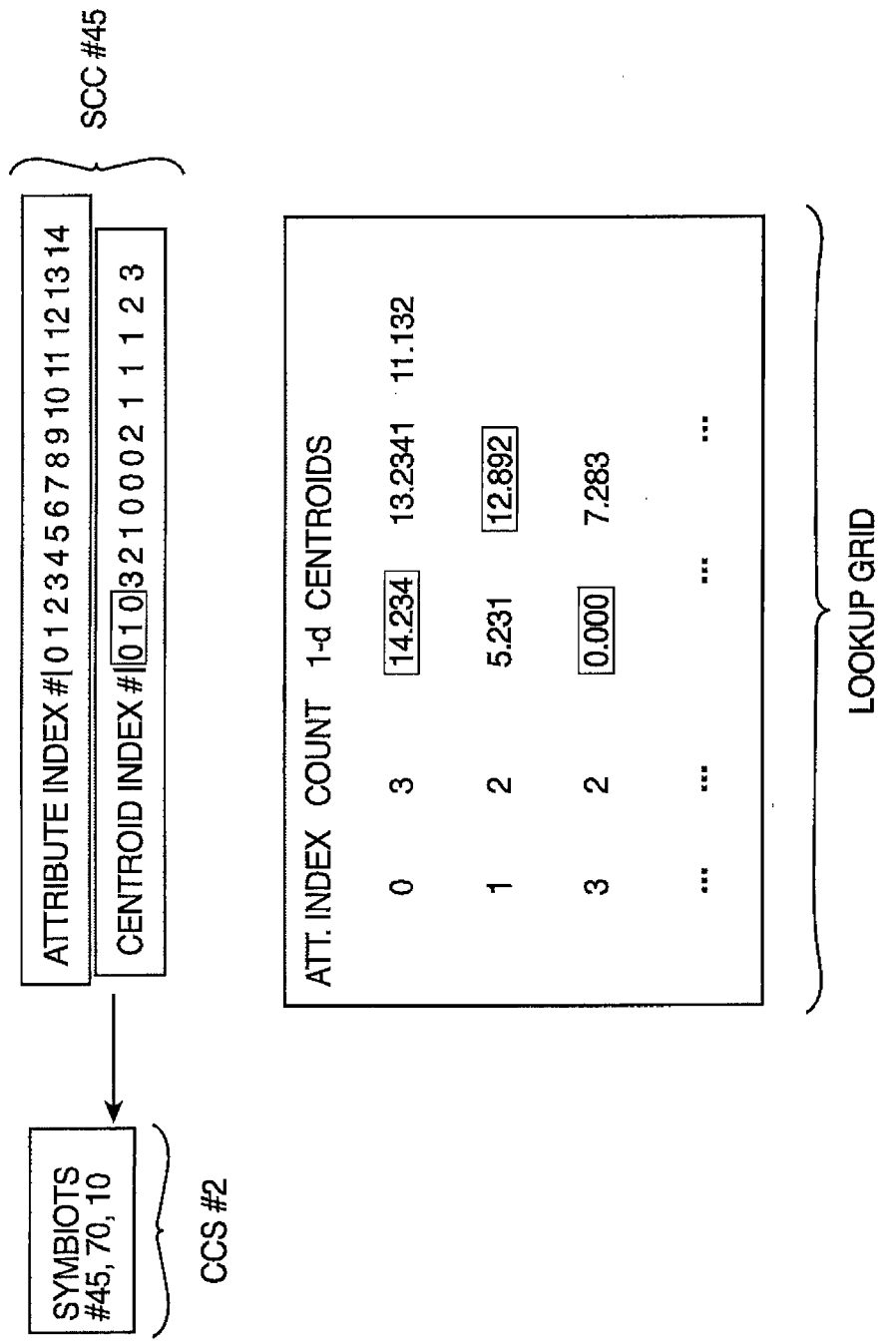
FIG. 18 outlines an example construction process of clusters according to some embodiments.

The second stage involves the construction of subspace cluster centroids (SCC) that may be representative of the attributes (e.g. game features or game factors) and 1-d clusters in the grid. A typical SCC would randomly sample a 1-d centroid from the grid's attributes, thus would be composed of two main entries, a centroid index corresponding to the index of the 1-dimensional centroid in the grid and it's matching attribute index. The combination of the SCC representations are what forms the final Candidate Clustering Solutions (CCS), which in turn are evaluated based on the multi-objective evolutionary algorithm. FIG. 18 outlines an example construction process of single SCC and CCS.

Figure 19:
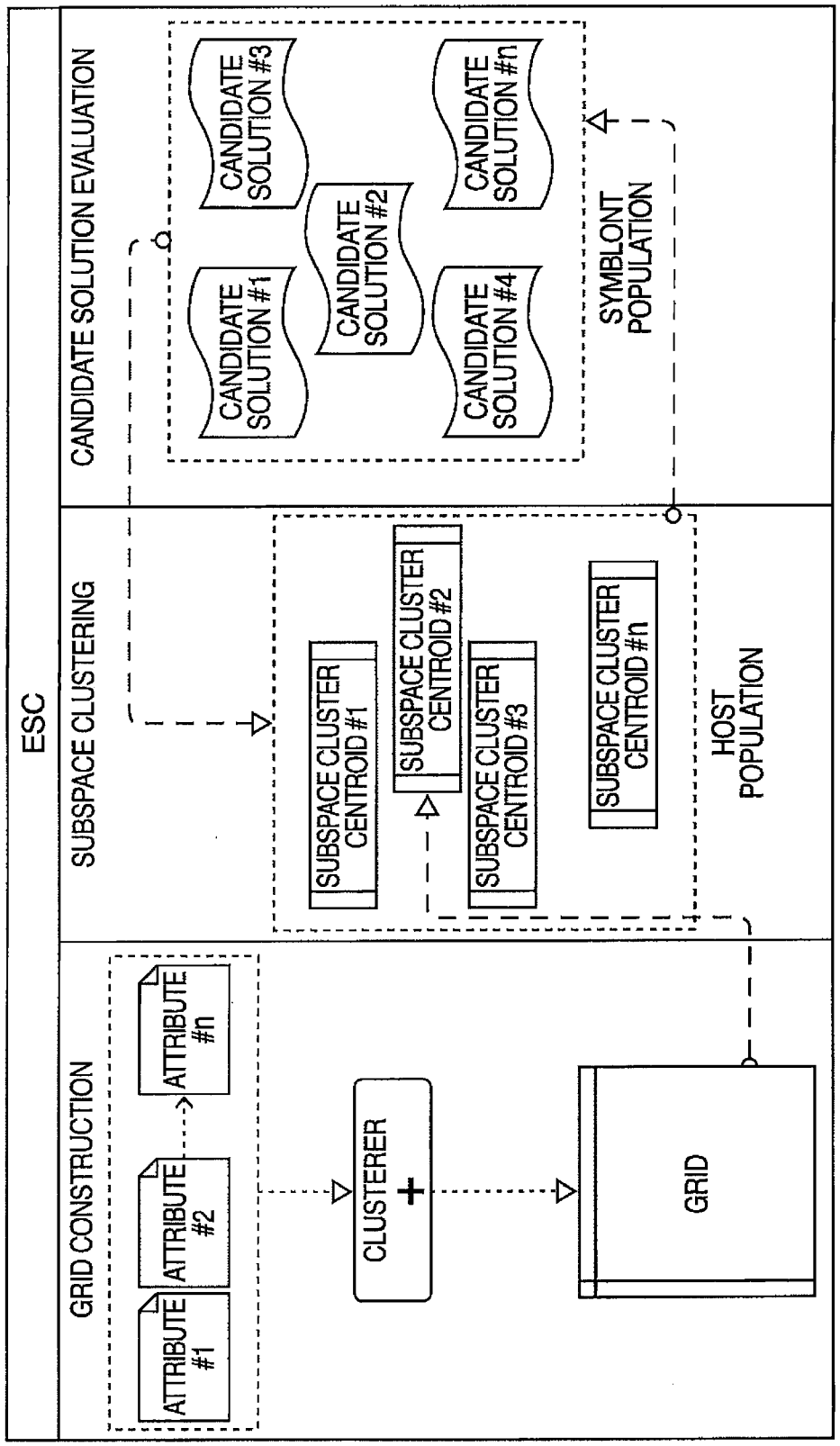
FIG. 19 outlines the general procedure of a clustering algorithm according to some embodiments.

The solutions that "dominate" the dominated solutions will be ranked at the top, and those with the best combinations of subspace cluster centroids will be considered as the final clustering solution(s) for the algorithm. FIG. 19 outlines the general procedure of the ESC algorithm.

The ESC Algorithm, in example implementations, can take up to 4 different objectives for its multi-objective evaluations: Connectivity, Compactness, Cluster Count, and Attribute count. Compactness refers to cluttered, densely packed clusters. The higher the compactness score a cluster has, the more points are packed inside and vice versa.

$$Com(CS) = \sum_{i=1}^{q} \sum_{j=1}^{|SCC_i|} dis(x_j, SCC_i)$$

In Connectivity, the distances between all points are evaluated and weights are given to the subspace clusters that assign more neighboring points within the same subspace cluster.

The remaining two objectives, Attribute & Cluster count, may not be as accurate as the aforementioned compactness and connectivity but provide an efficient way of accounting for the difference between compactness and connectivity. Cluster Count is the measure of how many clusters does a given candidate solution has. The less clusters a given solution has, the better. Similarly, Attribute count accounts for the number of attributes used in a given candidate solution, with a minimizing preference. Attribute count, as we will demonstrate later, has no effective use for our work, as we need to utilize all attributes.

ESC has been designed and tested for datasets with large attributes, however the dimensionality and scalability of the algorithm is unaccounted for. The largest dataset used had a large number of attributes (3814) but relatively low number of entries (100). ESC may be modified to take inputs larger than 2 million entries.

Furthermore, ESC does not take the whole attribute space when constructing SSCs, as its original primary objective was to retain the optimal solution with the lowest number of possible attributes. Thus, the resultant SCCs were variant in sizes and inconclusive of the whole attribute set. This is not-feasible for datasets that have non-reducible attributes; therefore, ESC was modified to have all SCCs set to a constant size and include centroids from each single attribute.

Removing variable-sized SCCs meant that we have to modify the mutation operator of the ESC algorithm. In the original implementation, mutation occurs in both the SCC and CCS levels. In the CCS level, a new SCC link can be added or replace an existing link within a single Candidate Solution, or an existing link can be removed all together. In the SCC-level, an attribute can be added, removed or a centroid of single attribute be replaced of another centroid from within the same attribute's 1-d centroids. Since the SSC have constant sizes and account for all attributes, attribute-manipulation within the mutation process is not practical. Thus we limit the mutation operator to switch attribute centroids during each call.

In terms of objectives used, Connectivity and Cluster Count are the most computationally efficient. Attribute Count is not useful when all attributes are used and the scope of the algorithm no longer becomes optimal attribute number in a given solution. Compactness produces the best results out of all possible objectives, however, due to the computational resources and time consumed, it is not suited for handling extremely large dataset; more so when it's $O(n^2)$.

While modifications to ESC enable processing data of high-dimensionality, there remains a problem of efficiently scaling the algorithm without compromising efficiency or speed. A data filtering procedure may eliminate unnecessary data overhead. Eliminating points that are redundant or insignificant in position (outliers) can greatly reduce the size of the dataset fed to the clustering algorithm without compromising the quality of the results. Nearest-neighbor based calculations can classify points into outliers ("untypical points") and prototypes ("significantly typical points"). The three major measures outlined by the paper are as follows: Kappa: The distances between point x and its nearest k neighbor, defined as:

$$K(x) = \|x - z_k(x)\|$$

Gamma: The sum of all distances between the nearest k points and x divided by k; defined as:

$$\Gamma(x) = \frac{1}{k} \sum_{j=1}^{k} \|x - z_j(x)\|$$

Delta: The length of mean of distances between x and its nearest k neighbors.

$$\Delta(x) = \left\| \frac{1}{k} \sum_{j=1}^{k} (x - z_j(x)) \right\|$$

Taking the weighted average, defined below, of all three measures gives a threshold to identify outliers and prototypes. The weights can be changed to reflect the significant of specific measures, or the weights may be equally distributed.

$$\text{Average}(x) = \frac{K(x) + \Gamma(x) + \Delta(x)}{3}$$

Figure 20:
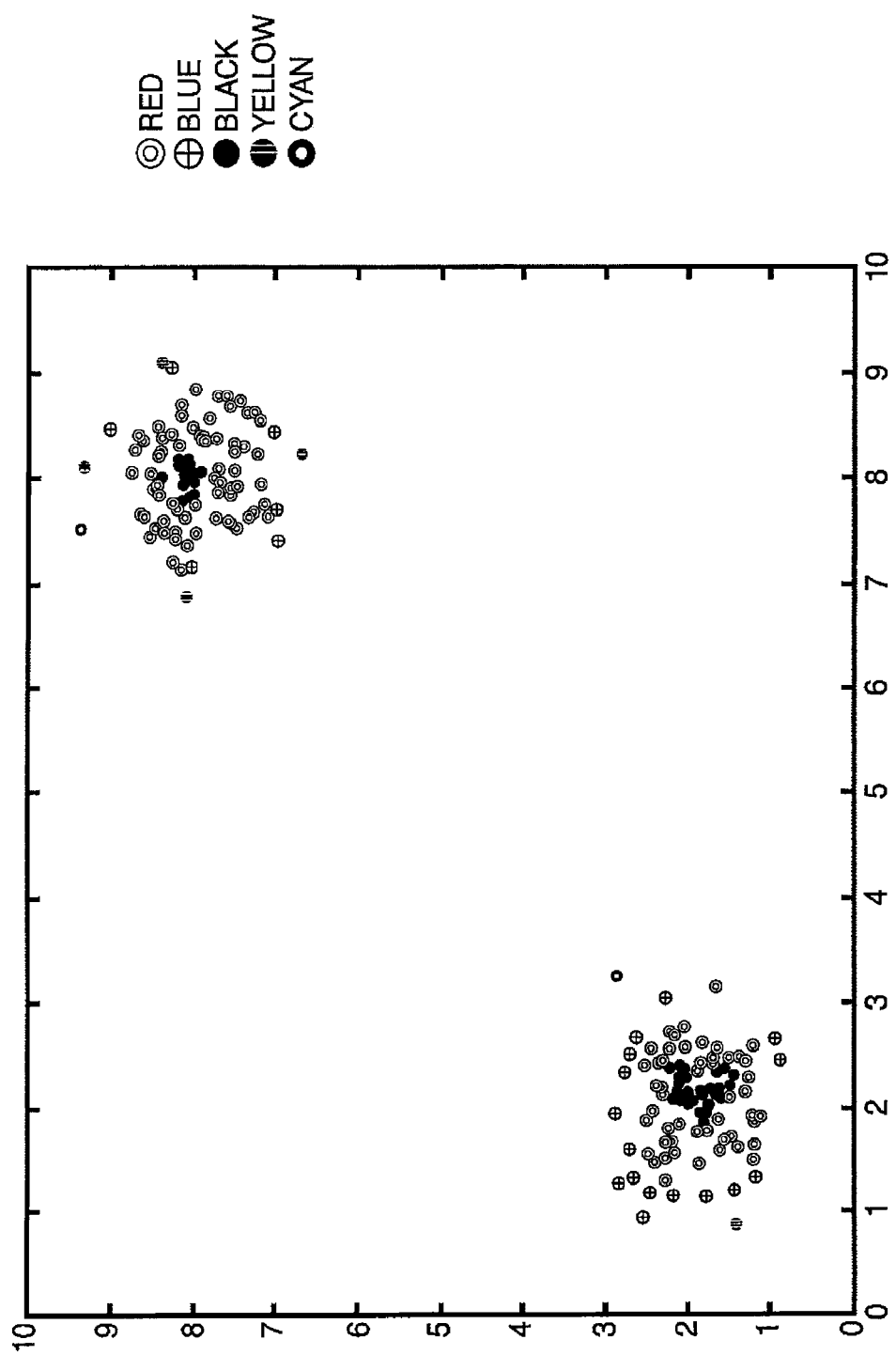
FIG. 20 shows two example clusters according to some embodiments.

FIG. 20 shows two example clusters of Gaussian-distributed points where the average of the 3 measures have been applied. Prototypes with a cut-off threshold of 0.2 are displayed in "black" while outliers with distances ranging from 0.2-0.4 are in "red". Outliers in "blue" are further away as those belong in the 0.4-0.6 range, while those highlighted in "cyan" and "yellow" are furthest away (belong in 0.6-0.8 & 0.8<ranges respectively).

An example key to the filtering method is computing the appropriate value of k (number of points in consideration) and the cut-off threshold that separates outliers from prototypes. Percentile distribution of calculated distances between points of given radius k is used as a measurement to separate both classes. Thus our initial step involves running a random sample of a given dataset with a range of k values, over a range of cut-off thresholds. Once the distances between all points have been calculated, each point is evaluated using the three aforementioned measures on a given value of k. The next step involves separating all entries into outliers and prototypes based on the sum of the three measures. In other words, if the sum of the three measures is less than a given cut-off threshold, the entry would be classified as a prototype or else treated as an outlier. The points are then fed to confusion matrix, which in turn uses cluster memberships generated by a standard clustering algorithm to evaluate True Positives, True Negatives, False Positives and False Positives. If a given set has more than 2 clusters, a single cluster is chosen as a prototypes cluster, then based on that classification, a True Positive is scored when an entry is correctly identified as belonging to that cluster. A False Positive is scored when an entry is falsely identified as a prototype. Likewise, a True Negative is scored when an entry is correctly identified as an outlier and a False Negative is scored when an entry is falsely identified as an outlier. As an example, ROC Area Under the Curve (AUC) may be used for final evaluation, where the True Positive and False Positive Rates may be calculated as such:

$$\text{True Positive rate (TPrate)} = \frac{TP}{TP + FN}$$

$$\text{False Positive rate (FPrate)} = \frac{FP}{FP + TN}$$

Figure 21:
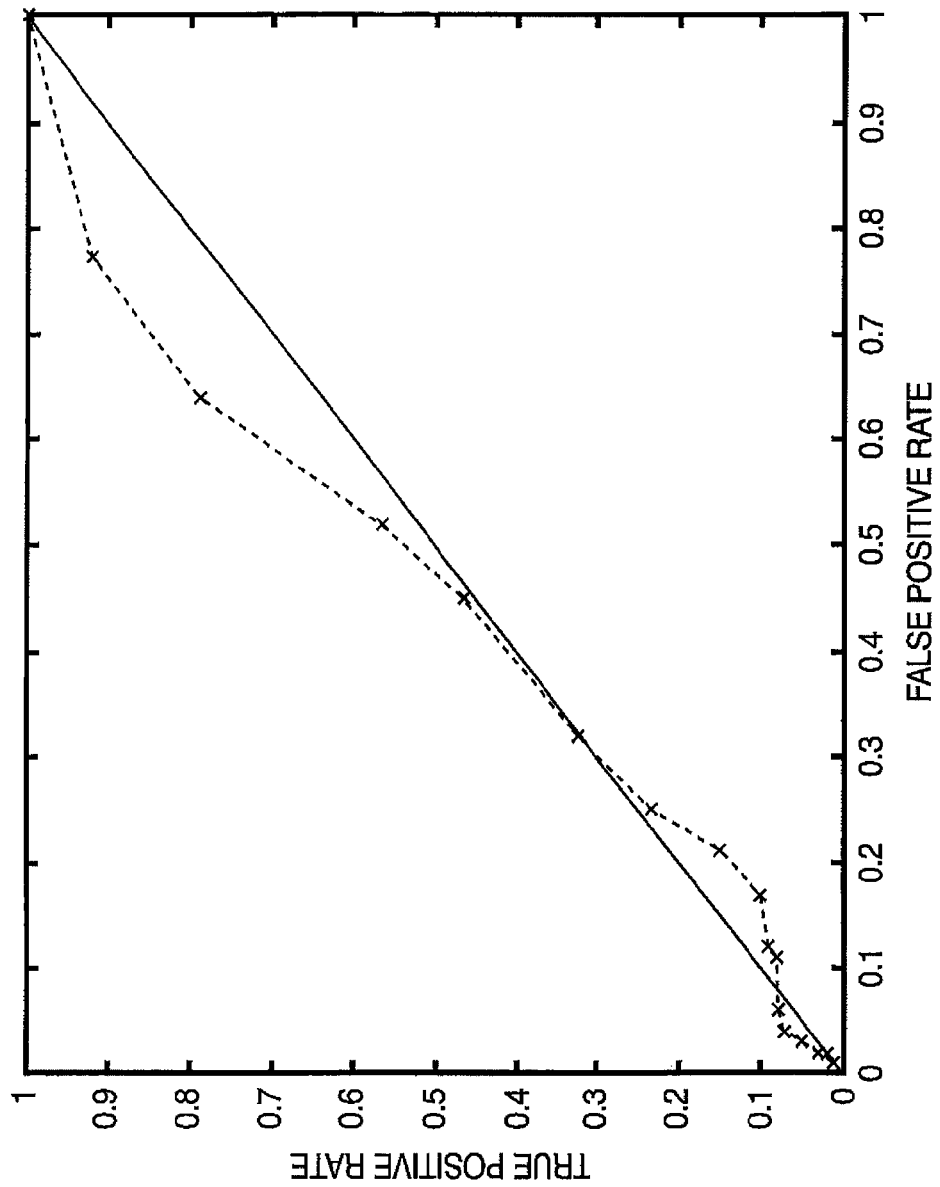
FIG. 21 shows ROC Area under the Curve (AUG) graph.

This process may be repeated for all cut-off threshold values, after then the calculated TPrate & FPrate are then fed to a AUC graph such as the one shown in FIG. 21.

Most datasets have more than 2 clusters in most cases, ROC graphs may be generated for each given cluster through the same process detailed herein. The AUC gives an indication of the classification performance of a given k value. An AUC value of 0.5 or below indicates a failed classification, while graphs with areas above 0.5 are those taken in consideration. An area of 1.0 is considered "perfect", thus the higher the AUC area is, the more favorable is its k-value. With clusters more than 2, the ROC AUC may be generated for each, then take the mean of all cluster areas for final consideration, before repeating the same process for the rest values of k. The best k-value is that with the highest mean ROC AUC value.

The following example pseudo-code may describe the full process of this stage:

```
Read input from file
// Calculate Distances between all points
For  (i = 0; I < number of records ? 1; i++)
    For (z = 0; z < number of records ? 1; z++)
        For (j = 0; j < number of attributes; j++)
            Calculate Euclidean Distance between records[i][j] & [z][j]
For ( k = 1 to k = 50)
    //Calculate Kappa, Delta & Gamma
    For ( i = 0;  i < number of records; i++)
        Sort Distances vector for given i
        Get nearest k points to i
        Calculate Kappa, Gamma, Delta and Average
        Lowerlimit = Lowest Numeric Distance
        Upperlimit = Greatest Numeric Distance
        For ( j = 0; j < 20; j++) // increment in 5%
            Threshold = (lowerlimit + j *(upperlimit-lowerlimit/20))
            If ( given record < threshold)
                Store in Prototypes Array
            Else
                Store in Outliers Array
    // Evaluate Classifications
    ConfusionMatrix(Prototypes, Outliers, Clustermemberships)
    Repeat for the next values of k
```

Once the ideal value of k is retrieved, the whole dataset is passed through the second stage of the filtering algorithm, where the dataset is separated into prototypes & outliers. The initial part of the second stage is similar to that of the first stage's, where the same Euclidean distances and consequent measures calculations are executed, however this time, applied on all dataset entries and using the calculated k value from the previous stage. The Euclidean distances between a given entry i and the rest of the entries are calculated then sorted in ascending order with the nearest k points taken into consideration for the three measures calculations. The final measurement, the weighted average of Kappa, Gamma and Delta is then compared with the cut-off threshold for file output. Any entry that has an average lower than the threshold is outputted into the prototypes file, otherwise to the outliers file. For datasets of large dimension space, processing them in a single run may be unfeasible; this is when breaking such sets into smaller blocks for separate processing can induce a huge speed increase. The following pseudo code describes the second stage:

```
ReadInputFromFile( );
for (int i =0; i < Number_of_records ; i++)
{
        Calculate Euclidean Distance between all records and record[i]
        Sort_All_Distances_of_given_record[i]( );
        for ( int j = 0; j < kradius + 1; j++)
        {
            gammatemp = gammatemp + sorted_distances[j];
            deltatemp = deltatemp + powf(sorted_distances[j],2.0);
            kappatemp = sorted_distances[j];
        }
        float gamma = gammatemp/kradius;
        float delta = sqrt(deltatemp/kradius);
        float average = (gamma + delta + kappatemp)/3;
        if (average < threshold)
            Output record[i] into prototypes file
        else
            Output record[i] into outliers file
}
```

Figure 15:
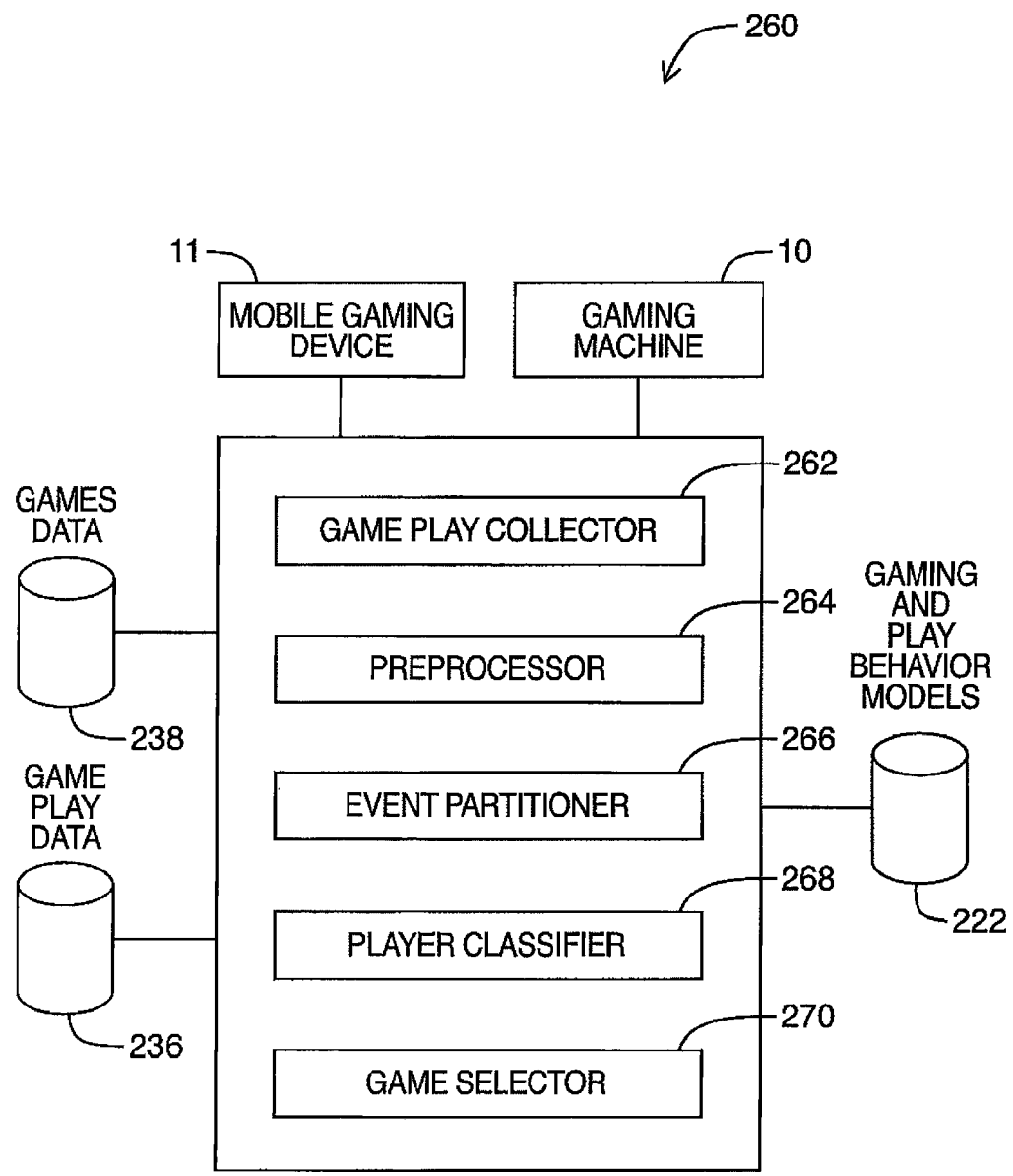
FIG. 15 depicts components of an exemplary computer system for recommending games.
Figure 16:
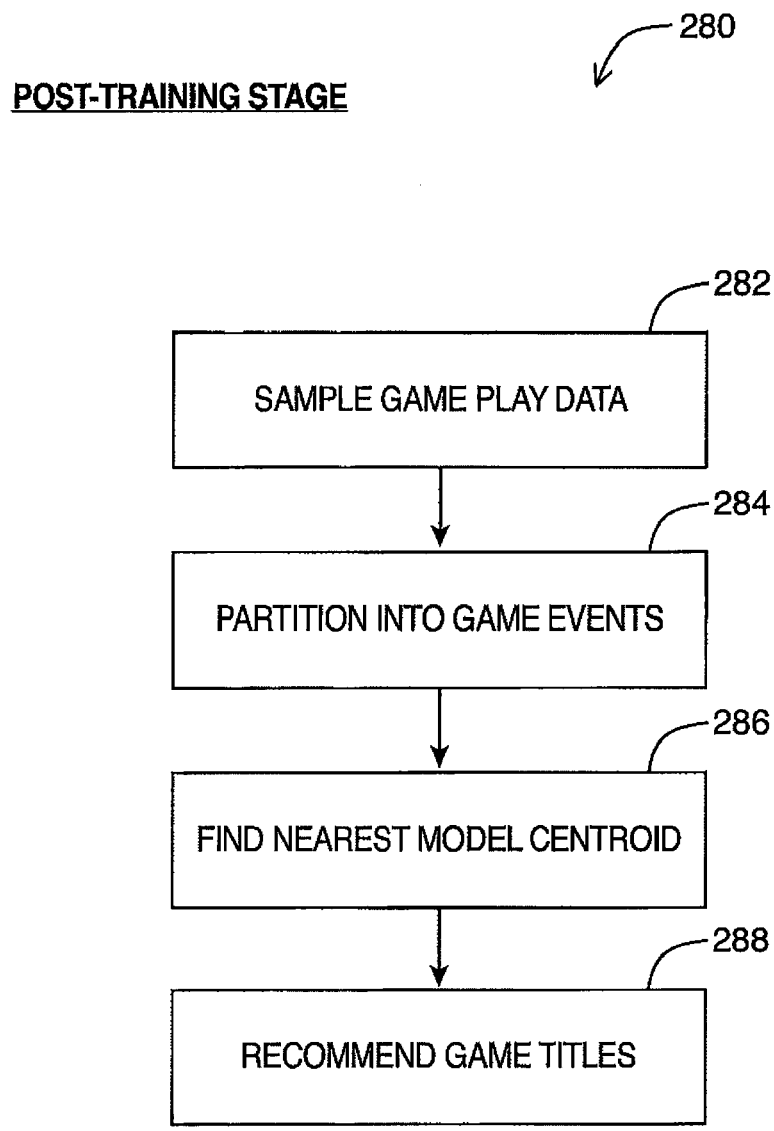
FIG. 16 illustrates a flowchart of a method for recommending games.

FIG. 15 depicts components of an exemplary computer system 260 for recommending games. FIG. 16 illustrates a flowchart of a method 280 for recommending games.

In this embodiment, at 282, a game play collector 262 collects real time or near real time data related to actions taken by a player during game play. Game play collector 262 may real time or near real time data from mobile gaming device 11 or gaming machine 10. This data may include various game features or game factors, where suitable game features are described throughout this disclosure. The data may also relate to the player. The game play collector 262 may collect a pre-recommendation threshold amount of game play data which may be the minimum amount of game play data that may be required by system 260 in order to provide recommendations. For example, game play collector 262 may collect data equivalent to one or more session events. A session event may be a number of game actions, such as 5 game actions for example. A pre-recommendation threshold may specify that the collected game play data must include at least 5 actions before a recommendation may be made. If the pre-recommendation threshold has not been collected then default configurations may be used to make recommendations, such as the location of the mobile gaming device 11, the location of the gaming machine 10, the type of gaming machine 10, the current game being played that the collected game data relates to, and so on. For example, the location may be used to suggest or recommend the most popular games for that location. Game play collector 262 may collect additional attributes about the game play and the player such as the location of the mobile gaming device 11, the location of the gaming machine 10, the type of gaming machine 10, the current game being played that the collected game data relates to, gaming machine 10 identifier, mobile gaming device 11 identifier, available credits, and the like.

In one embodiment, the player may identify themselves using a player action card, or other identification such as a username and password. In other embodiments, the player may be anonymous. Game play collector 262 may collect player data and game play data from the moment a player inserts a player card or begins a wagering game, for instance by inserting a wager, or pressing a start button or otherwise providing an indication of a player's desire to play a wagering game. In certain embodiments, the player data comes directly from the mobile gaming device 11. In other embodiments, the player data comes directly from the gaming machine 10. The computer system 262 may be configured to collect data for a predetermined or preset length of time or amount, which time period may be adjustable by the game operator.

Preprocessor 264 may be programmed to perform a preprocessing step, involving cleaning the data collected by game play collector 262. Cleaning the data may involve any one or more of the following subtasks: noise reduction or removal, identification and removal of outlying data entries, and resolving inconsistencies in the data. Cleaning may also refer to taking data in a raw or uncleaned state or form and converting the data into a form that is better suited for a mining or modeling task. For instance, cleaning may include processing or removal of extraneous or unnecessary data such as meta data, tags, or empty fields. Preprocessor 264 may also be configured to filter the data from the game play collector 262. In this context, filtering refers to a specific approach to feature extraction where redundancies (i.e., attributes carrying less information) are eliminated by a function or ranking process. Other techniques for data manipulation may also be used or they may be used in the alternative, for instance wrapper, embedded and search based models of data management and manipulation. The preprocessing and feature extracting step may be performed separately, in sequence or in parallel, or they may be performed together.

At 284, event partitioner 266 is operable to partition collected game play data into session events. That is, event partitioner 266 partitions the stream of game play data into equal chunks corresponding to session events. Session events may include a set number of player actions or may be for a pre-defined time period. A threshold amount of game play data may be required to be collected prior to event partitioner 266 partitioning into session events. For example, game play data equivalent to at least one session event may be required.

In one embodiment, in a pre-defined time period, for instance a time period beginning from the start of game play, or after the collected game play data corresponds to at least one session event, at 286, the player classifier 268 finds the nearest model centroid, or cluster. The player classifier 268 begins to attempt to match the player's session gaming behavior with one or more specific clusters of game content that have previously been identified by the model building steps, described herein (those steps involved in cluster model generation or other suitable analysis). The result of this matching are used to determine which of the one or more previously identified clusters of game content are most closely matched with the player and game wagering behavior defined by the sampled game play data.

In one embodiment, each previously identified cluster of game content is matched to at least one unique game player type. In this way, the player may be assigned one of several game player types. The matching and determination of a game player type may be determined by a player classifier 268 in a classifying or determining step where the game player is classified into a game player type.

In another embodiment, a player may provide and the computer system may receive a selection of a game to play from the game player. This selection may be used in the determination of the at least one game player type or cluster.

In another embodiment, a player may provide or the computer system may receive (either from the player or otherwise) geographical data related to the location of the game. This geographical data may be provided by the game operator. This geographical data may be used in the determination of the at least one game player type or cluster.

In another embodiment, a player may provide or the computer system may receive (either from the player or otherwise) data related to the language of the game. This language data may be provided by the game operator or a game itself. This language data may be used in the determination of the at least one game player type or cluster. Other game features may also be collected and used to determine at least one game player type or cluster.

After or responsive to the determination of a game player type or nearest centroid, at 288, game selector 270 provides the player with a plurality of games from which to choose from (e.g. a set of recommended games). The plurality of games may be associated with the cluster (nearest centroid) or game player type. The plurality of games may be filtered based on availability to the mobile gaming device 11. For example, only a subset of games may be available to the mobile gaming device 11 based on its location, available gaming machines 10, licensing regulations, and the like. The plurality of games may be filtered based on availability of gaming machines 10 in other embodiments.

The plurality of games may be provided to the player through a real-time window on the gaming machine. The player may be offered a choice on whether they would like to be informed of new games before initiating the first game play. The recommender system 260 may send an alert message to the gaming machine during the game play or at the end of a game. The alert message may provide new or different game selections expected to satisfy the player experience for the identified nearest cluster or game player type. Alternatively, or additionally, the selection of different games may be provided to the player on a video screen between rounds of a game.

Alternatively, the player may be offered a choice of selected games based on the identified nearest cluster or game play type through a separate area on the screen of the gaming machine. In such an embodiment, the new game may run and operate and be displayed in the same separate area on the screen of the gaming machine. In this embodiment, the player has the option of playing the pre-loaded game on the machine and, at the same time, trying out one or more games suggested based on the identified game player type. The new games suggested to the player could be different themes and genre (linked, community, social, progressive, tournament, episodic etc.) than the pre-loaded games on the gaming machines.

In addition, in another embodiment the system 260 may recommend games based one or more time slices, where a time slice represents a discrete duration of activity, such as game play. For instance analysis of a 7 day time slice may provide a different cluster or game player type and selection of games than an analysis for the same player based on a longer time slice, for instance a 10 day time slice. The computer system 260 may be configured to calculate the differences between the two analyses (the 7 day time slice and the 10 day time slice). The computer system 260 may then recommend games based wholly or in part on only the more recent or longer duration time slice. Alternatively, the computer system 260 may recommend games based on a combination of the recent time slice match and the longer time slice match. Further, the computer system 260 is configured to have the ability to store and partition data to later defined time slice based patterns. In this instance, the system is configured to allow for time slicing a data set into discrete time slices, as an example, 1 hour slices, or 1 day slices, or whatever time period is deemed desirable by the game operator.

In another embodiment, a player, either unregistered or registered, may be prompted, at least once, by an electronic gaming machine, to agree to the computer system 260 monitoring his game playing and collecting game play data. Alternatively, or additionally, the player may be prompted to agree to the system 260 collecting game play data related to the activity of the player. Accordingly, the method 280 may include the steps of: receiving an indication of agreement to monitoring of game play from the game player, and/or receiving an indication of agreement to collection of game play data from the game player.

According to subsequent live game playing data collection and analysis, the player may then be presented with a set of games selected to match the player's gaming preferences. Further, the computer system 260 may update or change the player's game player type based on live or near live game playing data or metrics by repeating steps of method 280 after additional game play data is available for collection and analysis. The results of the analysis may be the same or different set of recommended games. As more data is collected about a player's activities the more tailored the recommendations may be as more intelligence about the player is gathered.

In one embodiment, the computer system 260 may update the nearest cluster or player's game player type after a predetermined number of games are played, after a predetermined number of player actions (or session events) are collected, or after a predetermined length of time. The predetermined number of games, predetermined number of player actions (or session events), or predetermined length of time may be set by a game operator or administrator, for instance a casino of electronic gaming machine operator or by the game player, for instance by requesting that the game player input how often or frequently they would like to be presented with a new selection of games. The unregistered player may be prompted again to agree to the system 260 monitoring his game playing at another electronic gaming machine within the same establishment (for instance a casino or a video lottery terminal system with geographical limits, or within geographical limits, for instance, by an online gaming system).

In another embodiment, a registered player having an account or other method by which the player might be identifiable to a gaming system is logged into the computer system, for instance with an electronic gaming machine, or online, and is prompted for approval at least once, at the electronic gaming machine or online, to agree to the system monitoring his game playing. According to subsequent live game playing data collection and analysis the player may then be presented with a set of games selected to match the player's gaming preferences. For instance, the computer system 260 may have previously assigned the player a cluster or game player type based on historical game play data. Further, the computer system 260 may update or change the player's cluster or game player type based on live or near live game playing data or metrics. In one embodiment, the computer system 260 may update the player's game player type after a predetermined number of games are played or after a predetermined length of time. The predetermined number of games or predetermined length of time may be set by a game operator, for instance a casino of electronic gaming machine operator or by the game player, for instance by requesting that the game player input how often they would like to be presented with a new selection of games.

In one embodiment, a registered player has a responsible gaming account or profile. In such an embodiment, the system 260 is configured to consider data or other information from the responsible gaming account in determining the profile for the player or in adjusting a game selection previously offered to a player or previously determined without consideration of the existence of a responsible gaming account or data associated with that account. In adjusting a game selection, the computer system 260 may take a selection of games based on a determined player profile and then add or remove games, the addition or subtraction of games being based on the data associated with or the presence of the player registration or the responsible gaming account. In one embodiment, the computer system 260 may recommend a selection of games in whole or in part also due to the existence of the responsible gaming profile of the player, in addition to, or as an alternative to, data associated with the responsible gaming profile. The responsible gaming data may be processed by the computer system 260 but stored separately, for instance in a separate responsible gaming database or module. In one embodiment, the methods include the step of determining that the wagering game system has responsible gaming data related to registered game players and including the responsible gaming data in the determination of the at least one game player type. Additionally, the computer system may recommend at least one game to the current player that has previously been recommended to registered game players having the same game player type, a similar game player type or a substantially similar game player type.

For a non-registered player, or a player that is unidentified to the gaming system, if the player profile resulting from a live session based analysis falls within a particular risk category, or otherwise identifies certain risk factors, then the computer system 260, may, in part or whole, recommend a selection of games which it would otherwise recommend to registered players also having that risk category.

In another embodiment, the player may request to be presented with a new selection of games, for instance at any time during game player. In one such embodiment, the player would press a button or other indicator to cause the machine to present a new selection of games based on recent or historical game play behavior. This would trigger an updated set of recommendations and initiate the method 400.

Additionally, the gaming preferences of a player and even game player type may be derived or obtained from a player's social networking accounts. In this instance, the computer system 260 would customarily request permission to access the player's social networking account. This embodiment where social networking information or data is factored in to the selection of games or the determination of the nearest cluster or game player type may be used only with registered players, or it may also be used with players that are unregistered or unidentified or even those that do not have a player account. In such instance, the system 260 may hold or have no access to information or any player account identifying the player. The persona may be derived through proprietary software or third party available software. The persona may be used in part to recommend games to registered players or even to players which have patterns similar to registered players being offered the selections. In addition, eligible games may be offered for selections which are non-wagering games, online games as well as wagering games for electronic gaming machines.

The collected game play data relates to game factors or features for game play in an ongoing game by a current game player. This collection of data is performed during a game player's actual game play, in real time or near real time. These game factors may be the same as or a larger set or subset of the game factors described with respect to analyzing the larger data set used to generate clusters or game player types. Game play collector 262 may be provided in any suitable location or device, for instance, a gaming device, a controller in a gaming venue, a local computer system in the gaming venue, a computer system in a data center, a computer system in a social media network or in a private cloud, public cloud, hybrid cloud or community cloud.

Player classifier 268 may weight certain game factors, or indicators, or the dimensions of measurement adjusted so that they are more important or less important than other factors in the overall analysis of the data. In one embodiment, the data analysis is performed using a cluster analysis of the collected set of data. Additionally, or alternatively, the analysis may simply involve identification of particular game factors, the frequency of these game factors, any trends in the appearance of the game factors (for instance, whether particular actors tend to appear closer together in time), or a combination of these different indicators.

Instead of matching the player directly to a cluster, the method may also include determining at least one game player type for the current game player based on the analysis of the collected set of data. As described above, for instance, the analysis may reveal that a game player continually selects different games. The system 260 may, for instance, interpret and determine this as an indicator that the player does not favor games of the type that he stopped playing and use this information to assign the player an appropriate game player type. In another example, if the game player continues to play longer games with multiple rounds of wagers, then the system 260 would identify a game player type that exhibits these features. Each cluster may be associated with one or more game player types or a set of game features. The clusters may also be associated with a set of games, where each game is associated with a set of game features.

The system 260 may then transmit data for display, on a video display, representing the selection of games identified for the nearest cluster or game player type determined by the analysis of the collected set of data. The player may then make a selection of the one of the displayed games and the game machine presents the selected game to the player. For instance, the selection of games may be presented on a video lottery terminal, electronic gaming machine, personal computer, laptop computer, tablet, mobile phone, or a functional equivalent of one of the foregoing. The selection may be collected as additional game play data for further recommendations.

The method 400 may repeat steps to collect a second or additional set of data related to game factors for game play in an ongoing game by a current game player. Thus, this collection of data is performed at or near real time during ongoing actual game play by a game player. The second or additional set of data may be provided in a time period separate from (for instance after) or overlapping the first set of data. The second set of data may relate to a longer period of time than the first set of data. Alternatively, the second set of data may relate to a different set of game factors than the first set of data. The second set of data may be used for additional session events, where the data representation may append consecutive session events to generate a record of play behavior over time.

These game factors may be the same as or a larger set or subset of the game factors described above with respect to analyzing the larger data set used to generate clusters and game player types and suitable game factors are described throughout this disclosure. Additionally, the second set of data may be larger than the first set of data.

The second or additional set of data may be partitioned into events, used to find the nearest cluster to game play type, and then used to recommend additional games. This may be repeated for further additional sets of collected game play data. Certain game factors may be weighted or the dimensions of measurement adjusted so that they are more important or less important than other factors in the overall analysis of the data. In one embodiment, the data analysis is performed using a cluster analysis of the second set of data. Additionally, or alternatively, the analysis may simply involve identification of particular game factors, the frequency of these game factors, any trends in the appearance of the game factors (for instance, whether particular actors tend to appear closer together in time), or a combination of these different indicators.

Thus, in this way, the computer system 260 may continually monitor, collect data, and update the player's previously-determined nearest cluster or current game player's previously-determined game player type. In one embodiment, the step of determining the nearest cluster or at least one game player type for the current game player includes factoring and/or updating a previously identified clusters or game player type.

The updated cluster or game player type may be different from a previously identified cluster or game player type. In this embodiment, the method may further include the step of changing the previously identified cluster or game player type for the current game player to the updated cluster or game player type to make additional recommendations.

In another embodiment, a cluster or game player type may be updated based on an analysis of an additional set of not just one, but a plurality of game play periods, data sets, factors, or a combination of any of the foregoing.

In another embodiment, the computer system 260 may request and receive feedback from the game player related to the player's rating of the recently played game. For instance the computer system 260 may be configured so that a player can assign a numeric rating to the recently played game. Data from this rating may be combined with data about the recently played game to update a previously-determined cluster or game player type. In another embodiment, the method involves updating a previously-determined cluster or game player type based on an additional set of data, the additional set of data related to game player feedback reflecting a player indication of how often the player would play the game. The indication of how often the player would play the game may be received from the player in the form of a selected set of responses, for instance indicating the player would play often, sometimes, or never.

A set of game player types may be created by system 220, 260 for use recommending games. The game player types may be associated with clusters, which may in turn be associated with a set of games. System 220, 260 may collect a set of data related to one or more game factors or game features, for instance based on actual, simulated or historical game play. In another embodiment, the set of data related to one or more game factors may be previously available so that the step of collecting the data may not be required. Suitable game factors, also referred to herein as game features, are described throughout this disclosure.

An optional step involves partitioning the set of data into one or more game play periods or session events. Each game play period may represent a continuous or relatively continuous period of game play, for instance, a series of consecutive games played by a player in one sitting at an electronic gaming machine. Each session event may represent a number of consecutive game actions over a time period. This may be combined with collecting the data and analyzing the data. In addition, gaming data may be held in a central repository and be partitioned based on geo zones which may reflect local or country based partitioning. The computer system 220, 260 may offer a mix of selection from within various partitions based upon language; geo zones as well as time sliced processed data.

The data is analyzed to identify instances of the game factors described above, including the frequency of appearance of the game factors, their distribution within the data set, and clusters, trends or other patters are identified. Certain game factors, or indicators, may be weighted or the dimensions of measurement adjusted so that they are more important or less important than other factors in the overall analysis of the data. In one embodiment, the data analysis is performed using a cluster analysis of the set of data within each game play period. Additionally, or alternatively, the analysis may be performed against the set of data without partitioning into game play periods.

The data analysis allows the computer system to create at least one game player type and/or associated cluster representing a collection of game factors. In one embodiment, the game player type or cluster is an association or collection of one or more game factors. This association or collection may represent a particular model of game player. For instance, the data analysis may show that certain players prefer games that are quickly resolved (from start to finish) and have small wager amounts. Data suggesting this trend could be used to create a cluster or game player type based on this trend. In one embodiment, the cluster or game player type is a collection of data including an identifier that allows the computer system to identify the collection of data, and, optionally, that the data provides a game player type. The cluster or game player type may also include data which indicates the game factors defining the particular features of the games to be affiliated with the game player type. These features may be identified in the affirmative, for instance as features that should or are preferably present in the games to be affiliated with the game player type. Alternatively, or additionally, some features may be identified in the negative, for instance features that should not be or are preferably not present in the games to be affiliated with the game player type.

In one embodiment, computer system 260 may select games for the cluster game player type based at least in part on the analysis of data from one or more game play periods or from analysis of the data set at large, without any partitioning or consideration of partitioning of the data into game play periods. The selection or identification is based on data related to the games and the information or data from the game player type or cluster. For instance, if the game player type is for players that like longer games with multiple rounds of wagers, then the computer system would identify a selection of games that exhibit these features. Data related to a game could be provided manually or it could be generated in a separate data analysis step, for instance analysis of data representative of game play activity, for instance, live, virtual or historical play of a given game. The data related to the games could include a combination of data entered manually, for instance game theme data, as well as other data collected or assembled through analysis of game play activity. Alternatively, the computer system may identify a selection of games based directly on the analysis of the set of data, without any creation of a game player type. In this embodiment, the selection of games may be based directly on the results of the cluster or trend analysis.

Loading and Unloading Game Assets

As described herein, a connection may be established between a mobile gaming device 11 and a gaming machine 10 to enable remote gaming by player. The game may be selected from a set of recommended games. In order to configure and control the mobile gaming device 11 to remotely play a game associated with a gaming machine 10 game assets may be transferred to the mobile gaming device 11.

Figure 22:
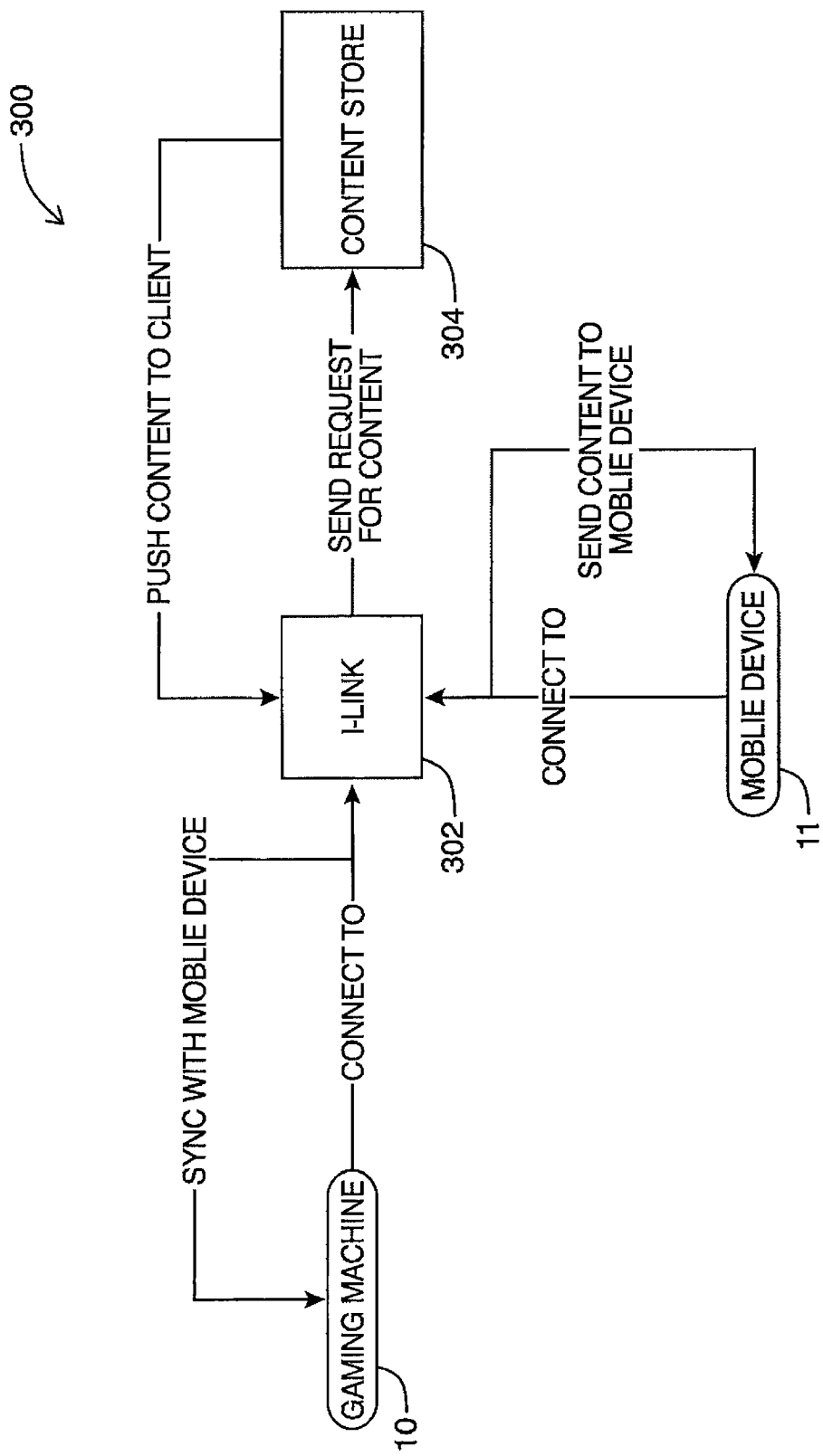
FIG. 22 shows a system for transferring game assets to a mobile gaming device 11 for remote gaming.

Referring now to FIG. 22 there is shown a system 300 for transferring game assets to a mobile gaming device 11 for remote gaming. For remote gaming, multiple issues may be addressed, including for example, how to load game assets to a mobile device 11 and what to do with the loaded game assets after a game ends and the player/mobile device 11 leaves a venue or predefined area (e.g. geo-fence). A venue, game developer or operator may not want players to have subsequent access to game assets that may cost a lot to produce. Further, licensing regulations may prohibit access to games via loaded game assets once a player leaves a licensed area.

The game assets may be download to the mobile gaming device 11 from the gaming machine 10. In some embodiments, the mobile gaming device 11 and the gaming machine 10 may be coupled to an asset server 302 to enable transfer to the mobile gaming device 11 from the gaming machine 10. The game assets may also be stored on a content storage device 304 (e.g. dedicated game asset server(s)) storing all game assets available. The game assets may be downloaded to the mobile gaming device 11 from the content storage device 304. The asset server 302 and/or content storage device 304 may be represented in FIG. 12 as gaming server 214 in some embodiments. The asset server 302 and/or content storage device 304 may also form part of system 220 of FIG. 13 and system 260 of FIG. 15 in some embodiments. These are examples only and other configurations may be used to transfer game assets to mobile device 11.

The game asset transfer may be triggered by selection of a game (e.g. from a set of recommended games), after registration by a player, initiation of game play, progression through a game, and so on.

The asset server 302 and/or content storage device 304 may be per venue or shared per jurisdiction or in the cloud serving multiple jurisdictions. The asset server 302 and/or content storage device 304 may be partitioned based on geographic location and licensing restrictions, for example.

In some embodiments, the mobile player may need to register to be able to down load the game assets to their corresponding mobile device 11. In other embodiments, the mobile player may download the assets to their corresponding mobile device 11 if he/she are within the geo-fenced zone without the need for registration.

In some embodiments, the game assets may contain the images and sounds for the game, but may not include the gameplay engine code. This may be downloaded to the mobile device 11 via a separate server or application. In other embodiments, the gameplay engine code may reside on the gaming machine 10 or a separate server and the mobile device may display an interface of certain aspects of the game and the final results. The game play may be carried out by the engine on the gaming machine 10 or separate server. The game assets can download to the mobile device 11 from a web server, data storage device 304, asset server 302, or other server.

The game assets may be scaled for different target devices and display configurations on the host server side (e.g. asset server 302) and sent to the mobile device 11 depending on its screen resolution and hardware capability. Example conversions are described herein.

When the mobile device 11 leaves the geo-fenced zone the assets may be deleted or a free play version of the game may be enabled.

Accordingly, asset server 302 is operable to detect when the mobile device 11 leaves a geo-fenced zone to trigger deletion of the game assets, in accordance with some embodiments.

In other embodiments, a free-play feature may be enabled. Asset server 302 may implement hierarchal concentric geo-fenced zones. When the mobile device 11 leaves the inside zone, the game assets may remain on the mobile device 11 but the player may be limited to play without wagering (free-play). In some embodiments, when the player leaves an outside zone, the game assets will be deleted to prohibit wagering and free-play.

In some embodiments, the game assets may remain on the mobile device 11 for a certain amount of time. After the amount of time has passed the game assets may be deleted.

Free Play Mode

Figure 23:
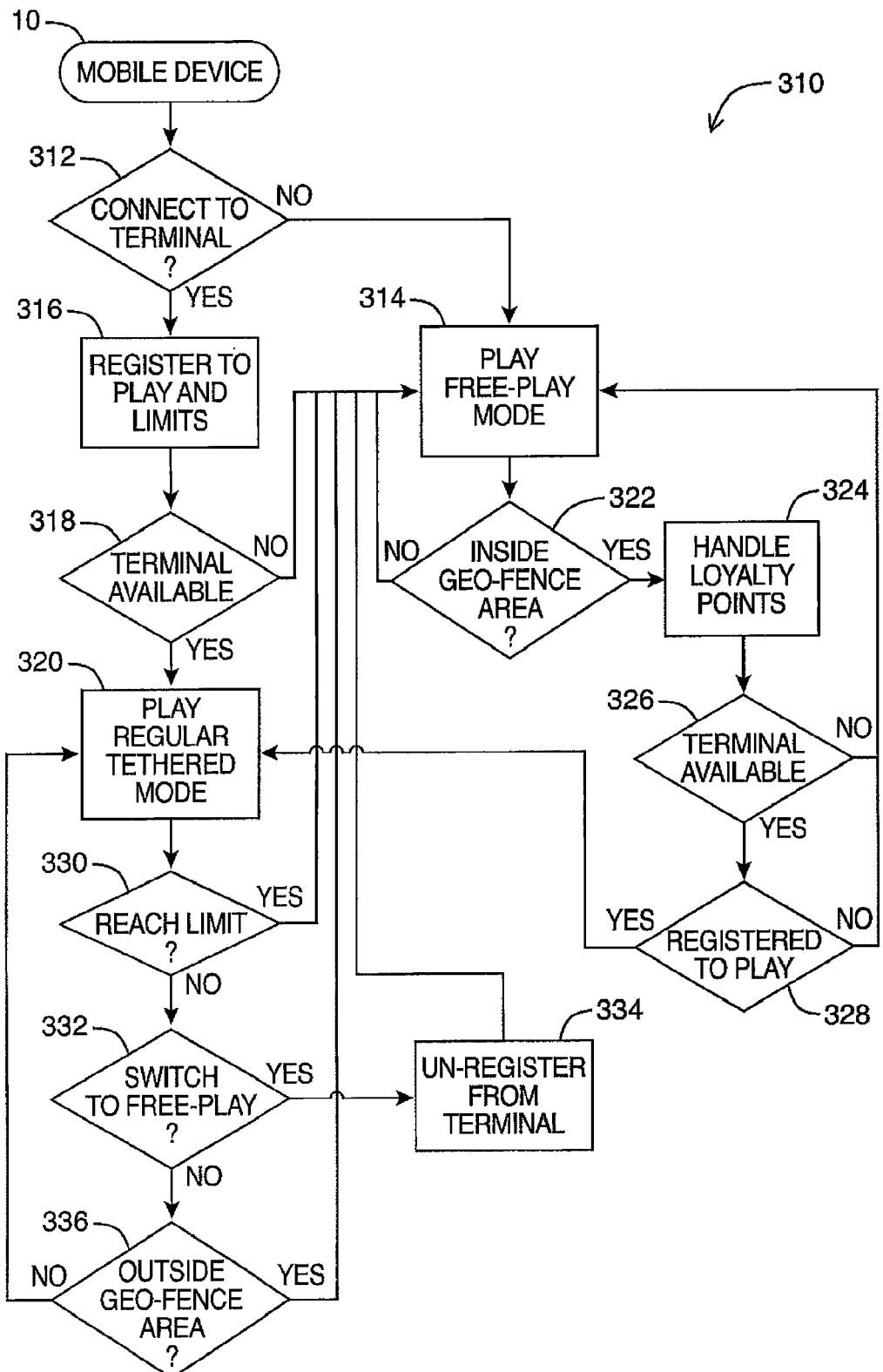
FIG. 23 shows a flowchart of a method for free-play of a game on a mobile device tethered to a gaming machine in accordance with some embodiments.

Referring now to FIG. 23 there is shown a flowchart of a method 310 for free-play of a game on a mobile device tethered to a gaming machine in accordance with some embodiments.

With mobile tethered play (e.g. connection between the gaming machine 10 and the mobile device 11), if a player or mobile device 11 leaves the geo-fenced area, the system may disable gameplay. In other embodiments, the game may have a wagering mode and a free play mode. If a player or mobile device 11 leaves the geo-fenced area, the system may switch to a free-to-play version of the game to continue play. The system may receive a warning that the mobile device 11 has left the geo-fenced area, but instead of exiting the game, it could switch to an internally run version of the game (provided via the loaded game assets). For example, fake reel strips may be displayed and the player may be allowed to play for free. Once back in the geo-fence area, the player may have the option to play in the wagering mode again.

In accordance with some embodiments, in the geo-fence area, if all the gaming machines 10 are taken, the player can play for free using mobile device 11 (e.g. game assets may be downloaded to mobile device 11 and free-play may be enabled). Once a gaming machine 10 becomes available, the mobile device 11 will receive a notification that a gaming machine 10 is free and ask if they wish to play.

At 312, mobile device is operable to initiate a connection to a gaming machine 10 (e.g. terminal) to play one or more games associated with the gaming machine 10.

If the player is unable to connect to gaming machine 10, such as if the player is outside the geo-fenced zone or otherwise cannot connect to gaming machine 10, then at 314 the player may play the desired game in free-play mode.

At 316, the player may register for the gaming machine 10. The player may set a spending limit in some example embodiments for responsible gaming.

At 318, it is determined whether the desired gaming machine is available. If a player registers on a gaming machine 10 that is not available and is queued to play, at 314, they can play for free on their mobile device 10 until the gaming machine 10 (e.g. terminal) is available.

Once the gaming machine 10 is available, at 320, a popup may appear on the screen display of the mobile device asking if they want to play for real (e.g. wagering mode), or cash out the gaming machine 10 and continue to play for free.

At 322, it is determined whether the player is inside the geo-fence area while playing for free.

If the player plays for free in the venue or geo-fenced area, then they may be rewarded with player loyalty points at 324. The free play acts may act as an advertisement or enticement for the establishment. If they play for free outside the geo-fence area, they may not receive any loyalty points. If the player is playing for free because the gaming machine 10 is not available, at 326, it is determined whether the gaming machine is available. If the gaming machine 10 is available, at 328, it is determined whether the player registers to play the game in the wagering mode.

The free game acts may operate in the same manner as the regular tethered game, where a difference may be that logic of the game in free-play may come from the mobile device 11 itself (e.g. via loaded assets) in some example embodiments. The mobile device 11 may communicate with the asset server 302 or gaming machine 10 through wireless communication, for example, but may not transmit outcomes in some example embodiments. When in the geo-fence area, game information may be transmitted to track how much and what games are played, to determine who much loyalty points to award, to recommend games, and so on. The system may keep track of the number of loyalty points and display them on the mobile device.

This system can be used as a responsible gaming feature. At the first of a session, the player may choose how much their spending limit is (e.g. at 316). At 330, it is determined whether the player has reached their spending limit. If the player overspends their budget, at 332, they can switch to free-play to continue their experience, but without spending more money. At 334, the player is unregistered from the gaming machine 10. This frees up the gaming machine 10 for another party to play the game and may help curve overspending.

The core logic for free-play may be stored in the game assets, but may disabled while in tethered wagering mode, only activating once the free-play mode is enabled. During wagering play, at any time, the player may switch to free play mode at 332, but may be cashed out of and unregistered from gaming machine 10 at 334 to allow the next player to take over. They can re-queue again to play via the gaming machine 10 after the next player, for example.

At 336, it is determined whether the player is inside or outside the geo-fence area to in turn determine whether the player can continue playing in wagering mode, or whether the game should switch to free play mode.

Tournament

Figure 24:
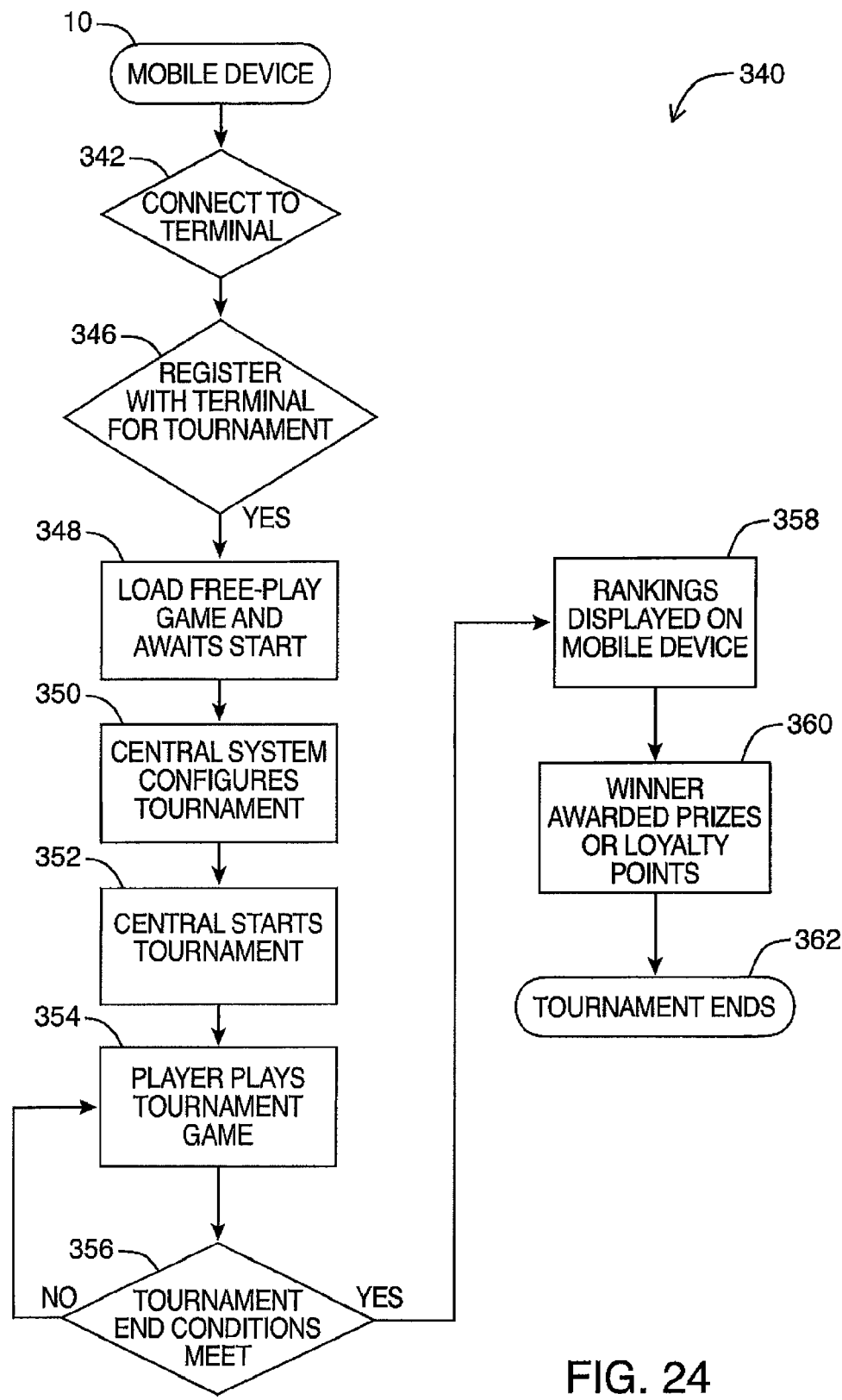
FIG. 24 illustrates a flowchart of a method for free-play with a tournament style.

Another feature of the free-play is the use a tournament style system. FIG. 24 illustrates a flowchart of a method for free-play with a tournament style. Players with mobile gaming devices 11 loaded with the remote gaming application may participate in mini-tournaments. In some embodiments, the winner may receive a prize of some sort. The prize may be advertised. For example, the tournament system may run a simple reel game with very high return percentage math. The gaming machine 10 may be switched to tournament play, via e.g. the back office of the venue. Each mobile device 10 would be then be registered with one or more gaming machines 10. The tournament may support a time limit, a credit limit or a combination of the both. Once the tournament commences, each player plays until time has elapsed or run out of credits, whichever comes first. The tournament can run on the same gaming machine 10 to increase the number of participants.

The player rankings may be displayed on all of the gaming machines 10 involved in the tournament. The winner of the tournament is then determined and may be awarded a prize by the venue. The prize can be free food or drink, loyalty points, for example.

Once the tournament is finished, the player can return to regular play either in wagering mode or free play.

At 342, mobile device 11 is operable to initiate a connection to a gaming machine 10 (e.g. terminal) to play one or more games associated with the gaming machine 10.

At 346, it is determined whether the mobile device 11 has registered with the gaming machine 10 to participate in a tournament.

At 348, the game assets for the game are loaded to the mobile device 11, as described herein, for free play mode.

At 350, a central tournament system (e.g. central system 212 of FIG. 12) configures a tournament between all mobile devices 11 registered for the tournament. The tournament starts at 352 and the players via mobile devices 11 play the tournament game at 354 using the loaded game assets.

At 356, central tournament server determines whether the tournament has ended based on conditions and rules programmed for the tournament. At 358, the rankings for the tournament are displayed on each mobile device 11 participating in the tournament. The rankings may also be displayed on the associated gaming machines 10 the mobile devices 10 registered with.

At 360, a prize is awarded to the winner(s) of the tournament and at 362 the tournament completes.

Distributed Data Storage

In accordance with embodiments described herein, game play data used for recommendations and model generation may be stored in a distributed configuration across a variety of data storage devices. The data storage devices may be located in different jurisdictions and may contain different subsets of game play data. The data storage devices may store overlapping game play data in some example embodiments. The data may be exported to other servers due to the large amount of playing data and the resource restrictions of a single server. Further, data may be exported to generate a collective pool of data for data mining and analysis. For example, the collective pool of data may be used for cluster model generation, recommendations, and so on.

Game play data may be collected from game play by players located in a jurisdiction and stored locally on data storage devices. The game play data may include player data including private information about a player, such as their name, credit score, credit card number, citizenship, residency, address, phone-number, total spending amount, and the like. This information may be collected during registration for example. Gaming and privacy regulations may govern and restrict where the private data may be stored and which locations the private data may be transferred to. User preferences may also restrict access and export of private data.

It may be desirable to pool game play data at a central server or a collection of distributed central servers to collect a large amount of game play data for model generation and recommendations. The central server(s) may coordinate analytics for model and recommendation generation between different servers and jurisdictions. This provides increased processing power, increased memory resources for large amounts of game play data, and access to a larger data set.

If the central server is located in one or more different jurisdictions than where the data was originally collected then the gaming and privacy regulations and user preferences may restrict the export of the private data (a subset of the game play data) to the central server. Accordingly, the private data may be separated from the non-private gaming behavior data, where only the non-private data may be transferred. Further, a summary of private data may be generated such that the summary abstracts from and summarizes the private data to generate non-private summary data. The non-private data may be anonymous data but may include game factors used to generate models and recommendations. The data may also be separated to reduce the amount of data to be stored on a single data storage device.

Local servers may be configured with parsing rules to implement regulatory restrictions and user preferences to govern export of data to the central server(s). That is, local servers may be configured with parsing rules to process player and game play data stored thereon to generate export data for transmission to the central server. The local export servers may be configured with parsing rules specific to regulatory requirements of relevant jurisdictions (e.g. privacy regulation) and user preferences (current location of data, location that data will be exported to). For example, player and game play data may include private and non-private data, and the local servers may separate the private and non-private data based on the parsing rules and apply tags to the exported data. To separate the private data (e.g. personal information about players) from the non-private data (e.g. playing behavior) a hashing algorithm may be used to create an index or tag linking the private and non-private data. That is, a tag for the non-private data may identify (directly or indirectly) associated private data. The tag or index may otherwise provide relevant information about the non-private data such as the location or jurisdiction it is coming from. This may enable central server(s) to aggregate data based on the tag. For example, the non-private data may be aggregated based on location or jurisdiction.

The collective pool of data on central server(s) may be partitioned by jurisdiction, tag, game, and the like. The tag may include jurisdictional data. When the collective pool of data is used to generate models and recommendations different weightings can be applied to the data based on jurisdiction. For example, a game recommendation to a Canadian playing a game in the United States may be generated by weighting Canadian data more than data from other jurisdictions. The collective pool of data may provide a larger data set (e.g. playing data from multiple countries) in improve models and recommendations. Trends and playing behavior may be analyzed using the collective pool of data.

Figure 25:
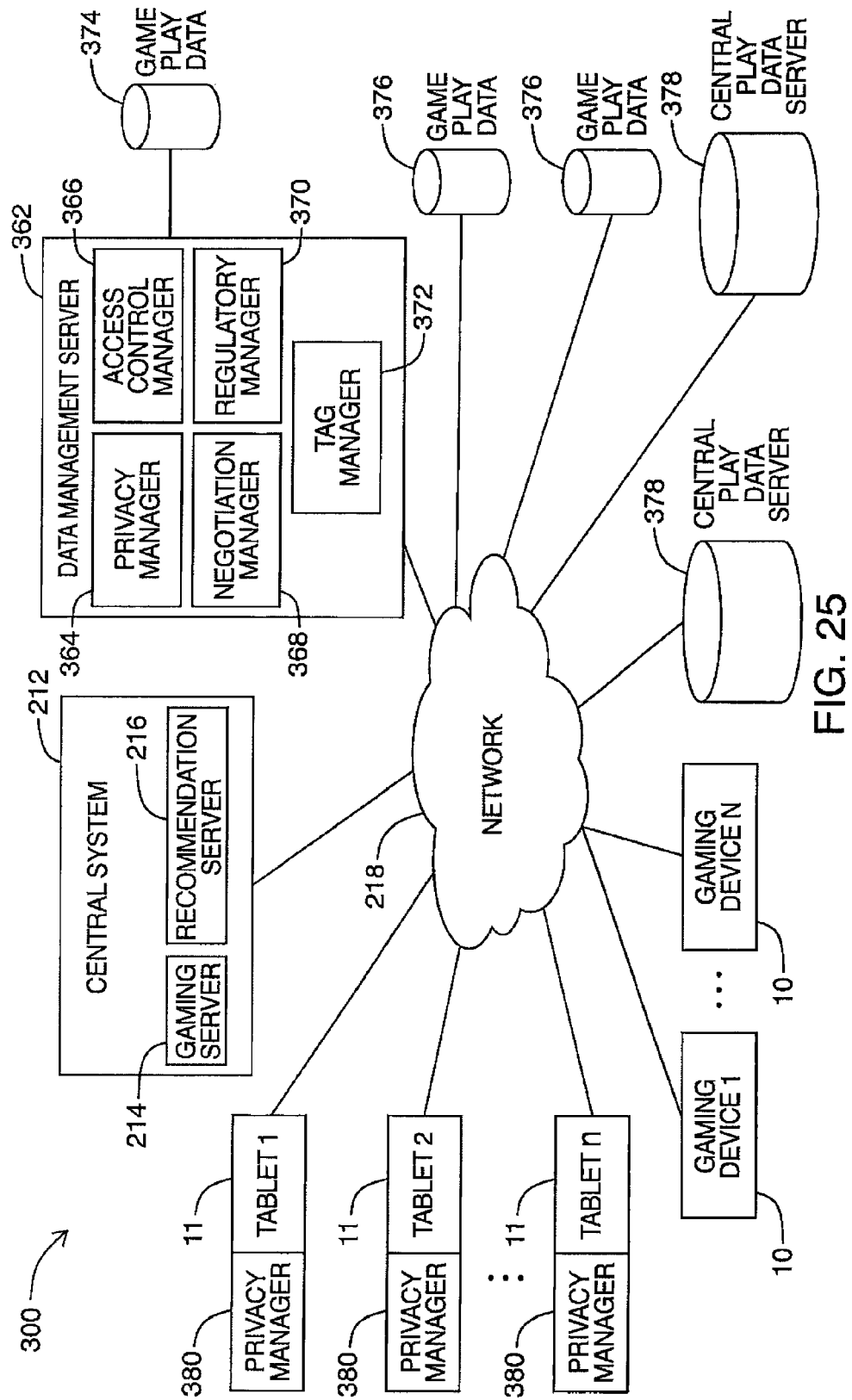
FIG. 25 shows a system for implementing distributed storage of gaming data.

Referring now to FIG. 25 there is shown a system 300 for implementing user preferences, privacy and regulatory restrictions on export and use of game play data. Player and game play data may be stored in a distributed fashion on local game play data storage devices 374, 376 and central data storage servers 378. The game play data storage devices 374, 376 and central data storage servers 378 may be in different or the same jurisdictions. The game play data may be exported from local game play data storage devices 374, 376 to central data storage servers 378 using parsing rules. The parsing rules may be in accordance with privacy and regulatory restrictions implemented by data management server 362 using parsing rules.

Data management server 362 provides a middleware component and mechanism (e.g. in a cloud computing configuration in this example) which will enables owner of personal data (e.g. game player) to monitor use of personal data and implement regulatory restrictions on personal data export.

Data management server 362 enables a game player to agree or disagree to the location where his/her data are stored, by whom data are accessed and how, how and by whom data are processed, when and how data are transferred, and so on.

Data management server 362 would give players the possibility to fully control processing, storing or transmitting of their gaming data and to agree/disagree with processing, storing or transmitting of their gaming data. To a regulator and auditor this may help to increase confidence in transparency how data are treated.

Data management server 362 includes a Privacy Manager 364 which enables a user to access and set his/her preferences for: where his data may be stored physically, who can access their data and which level of access they can have, who can process data, who can transmit data (transfer), what data may be transferred, what actions need permission and approval, and so on. Privacy manager 364 may interact with a device-based privacy manager 380 residing on mobile device 11. The preferences may be used to define parsing rules.

In other words, Privacy Manager 364, 380 collects, stores, and manages privacy preferences requested by the game players. In addition, privacy manager 364 may allow a player to monitor processing, storing or transmitting actions on their data. For example, privacy manager 364 may generate a log of all actions and changes and present to the player on request or in a report.

Access Control Preference Manager 366 determines what processing, storing or transmitting actions are required of personal data for in order for the recommendation system, export software or other component to perform required or desired functions. The required processing, storing or transmitting actions may be implemented as parsing rules. Access Control Preference Manager 366 serves as the component managing cloud service attributes required for the remote evaluation of access control policies. That is, Access Control Preference Manager 366 determines desired or required processing, storing or transmitting actions with respect to game play data.

Negotiation Manager 368 may serve as mediator for negotiation between Privacy Manager 364 and Access Control Preference Manager 366 so actions can occur or be prevented because of privacy limitations. In other words, Negotiation Manager 368 acts as an interface between Privacy Manager 364 and Access Control Preference Manager 366 to map required or desired actions to privacy restrictions based on user preferences. Negotiation Manager 368 provides negotiation functionalities and protocols.

Regulatory Requirements Manager 370 may implement regulatory requirements on game play data through restriction rules (e.g. parsing rules). For example, Regulatory Requirements Manager 370 may receive and process relevant privacy regulations governing use of private data to generate restriction rules for types of data and export thereof. Regulatory Requirements Manager 370 will serve to manage functions related to regulator and specific standards or jurisdictions. Negotiation Manager 368 may serve as mediator for negotiation between Regulatory Requirements Manager 370 and Access Control Preference Manager 366 to consider required or desired actions in view of regulatory restrictions.

Tag manager 372 is operable to implement hashing algorithms and add tags to game play data, when separated for export and pooling purposes, for example. For tagging data, hashing algorithms may be used. Tag manager 372 can add tags which will protect data due to tampering together with tamper proof time stamping and logging. Coupled also with low level access controls and monitoring/alerting technologies tag manager 372 can help to prevent or, at least, alert unauthorized change or moving data. Tag manager 372 may add tags that provide relevant information about game play data, such as the location the data was collected in. For hashing, Tag manager 372 may implement a variety of hashing algorithms, such as SHA 3 (Keccak) hashing algorithm which recently. Additional level hashing would be to "seed" data with some proprietary system which than will give ownership and control over the data.

Figure 26:
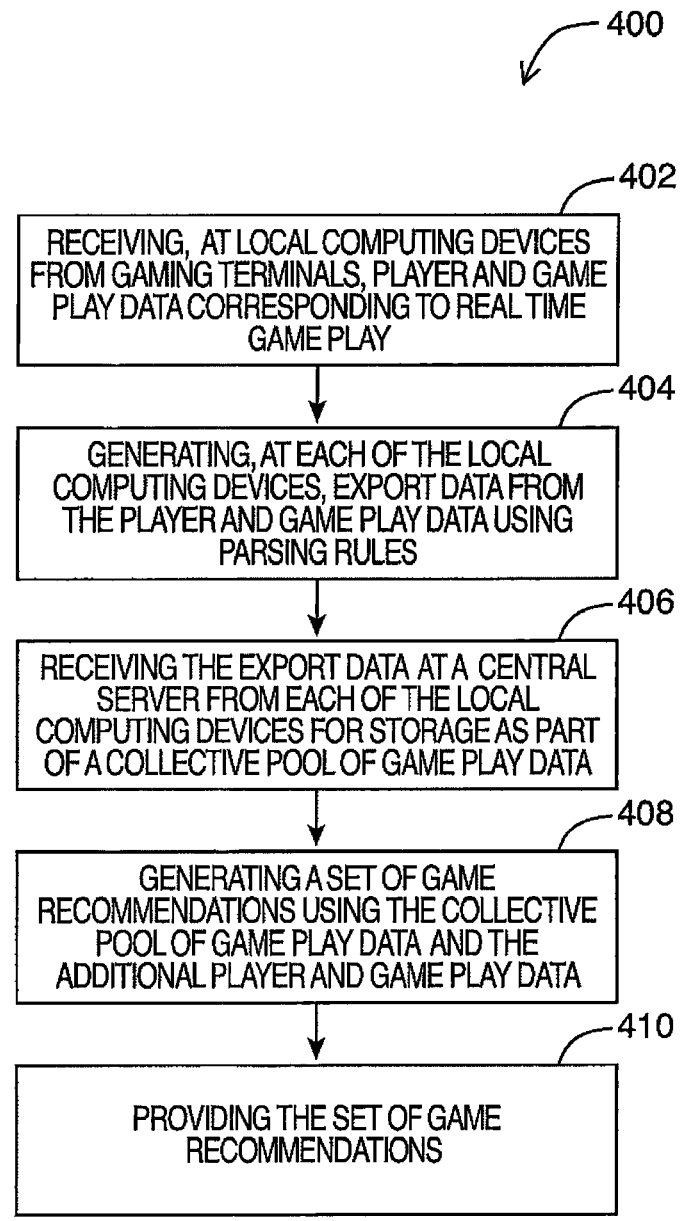
FIG. 26 shows a method for implementing distributed storage of gaming data.

Referring to FIG. 26 there is shown a method 400 for distributing storage of game play data using parsing rules (e.g. based on user preferences, privacy and regulatory restrictions on game play data).

At 402, data management server 362 receives player and game play data corresponding to players' real time game play for storage on local game play servers 376.

At 404, data management server 362 is operable to generate export data from player and game play data stored on local game play servers 376. The data management server 362 is operable to generate the export data using parsing rules. The export data includes filtered the player and game play data. For example, as noted herein, private data (e.g. personal player data) may be filtered from the player and game play data to generate the export data. The parsing rules may implement user preferences (as received by privacy manager 364), required processing, storing or transmitting actions (as determined by access control manager 366), and regulatory requirements (as per regulatory manager 370). The negotiation manager 368 may generate a subset of parsing relevant to generating particular export data in consideration of the local game play server 376 where the player and game play data originally resides, and the destination of the export data, e.g. the central play data server 378 or another local game play server 376. The tag manager 372 is operable to tag export data with a tag or index to provide a link between the export data and the original player and game play data it was originally generated from.

At 406, the export data is transmitted from the local game play server 376 to a central server 378 (or other local game play server 376). In other words, the export data is received at a central server 378.

The central server 378 may receive export data from multiple local game play servers 376 or other central server 378 (e.g. organized in a tiered manner). The central server 378 stores received export data as part of a collective pool of game play data. The collective pool of game play data includes data received from multiple sources. This may provide a larger collection of data from which to generate cluster models and make recommendations.

At 408, recommendation server 216 generates a set of game recommendations, as described in detail herein. The set of game recommendations may be generated using received export data and the collective pool of game play data. For example, the received export data may identify a jurisdiction which may be used by recommendation server 216 to generate recommendations specific to that jurisdiction using the collective pool of game play data.

The recommendation server 216 (or central play data server 378) may receive additional player and game play data corresponding to a player's real time game play in a game on a gaming machine 10 (or tablet 11). This additional player and game play data may be used in connection with the collective pool of game play data at central play data server 378 to make recommendations for the player. The recommendations leverage the increased size of the collective pool of data. The collective pool of game play data may be used to generate the cluster models as described herein. The models may be applied to real time game data to make game recommendations for players, as described herein. The detailed description of game recommendations herein applies to generating game recommendations using the collective pool of data on the central server 378.

At 410, the recommendation server 216 provides the set of game recommendations. The set of game recommendations may be received at a local gaming device 10 or tablet 11 from recommendation server 216. The set of game recommendations may be received via another local computing device for provision to the player.

The player may select a game from the set of game recommendations, and the method 400 may return to 402 where additional player and game play data corresponding to a player's real time game play will be received, for export or further recommendations, for example. Accordingly, some or all of the steps of method 400 may repeat for additional data collection, recommendations, or a combination of both.

Microgaming

A mobile device 11 may establish a connection to a variety of types of gaming machines 10, such as for example an electronic gaming table 10 that enables community or individual games.

Figure 27:
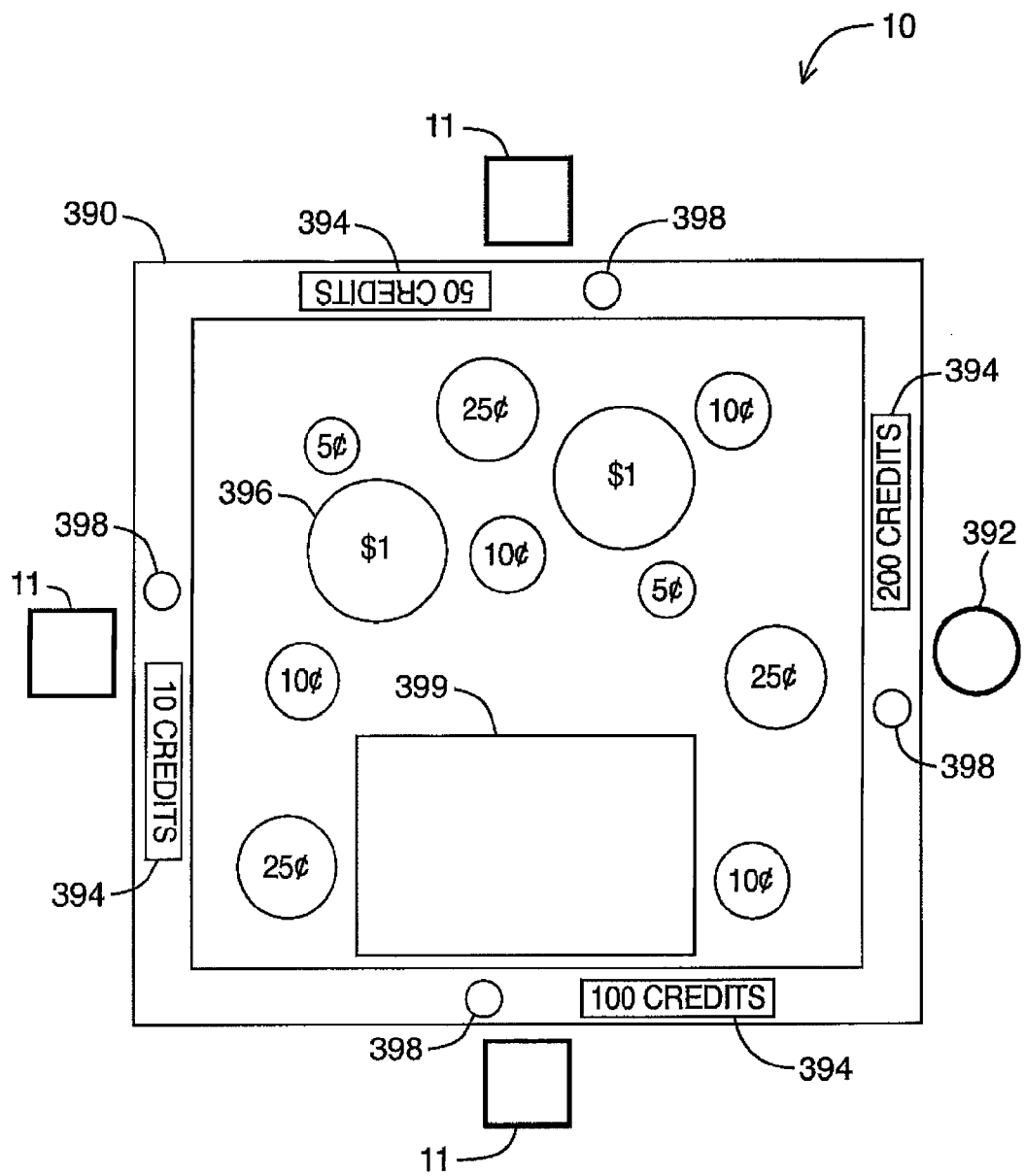
FIG. 27 shows an example gaming machine.

FIG. 27 is a top down view of a substantially horizontal gaming table 10 showing a particular icon-selection game in progress. In this example, four mobile devices 11 are coupled to the gaming table 10. A user interface on the mobile devices 11 may replicate the surface of the gaming table 10, receive input data from players, and provide output data to players. There may be physical players 392 at the gaming table 10 to play with one or more players using mobile gaming devices 11. The entire top surface of the gaming table 10 may be a touch screen 390 which may be replicated on user interface of mobile gaming device 11, which may also have a touch screen.

The touch screen 390 technology may be conventional, such as a flat screen monitor with a capacitive-type touch screen overlay. The touch screen 390 is preferably square to make all the players' positions equivalent; however, rectangular touch screens are more commercially available. The position of the player's may be less relevant with remote gaming configurations as the players need not be physically present at gaming table 10. All player controls may be via the touch screen 390 or through user interface of mobile device 11.

When a player arrives at the gaming table 10 or connects thereto via a mobile device 11, the player creates a bank of credits, which are displayed at screen areas 394. The screen areas 394 may be replicated on user interface of mobile gaming device 11. The player may use a player tracking card, cash, a paper ticket, or other means to create the bank of credits. A conventional card reader or cash/ticket receiver may be located in the table 10 support structure or on a registration terminal as described herein.

In the game illustrated in FIG. 27, a variety of icons 396 are displayed having different wager amounts (or denominations). At least some of the icons 396 are associated with a randomly selected hidden prize. Other ones of the icons 396 may be losing icons awarding no prize. Generally, the awards for the higher wager icons 396 are higher than the lower wager icons 396. Examples of the wagers are 5 cents, 10 cents, 25 cents, and one dollar. When an icon 20 is touched (which may be via user interface of mobile gaming device 11), the advertised wager is deducted from the player's bank and the hidden prize is revealed and credited to the player's bank. The wager may even be a fraction of a single credit, and the fractions are added by the processor in the gaming system when deducting from or adding credits to the player's bank. The fractions may displayed in an area of the screen 390 (or on user interface of mobile gaming device 11).

So that the gaming system knows which player made the icon selection, the selecting player touches a "player active" button 398 on the screen (or on user interface of mobile gaming device 11) to briefly lock out other players until the selection is made. The button 398 may need to be touched while the player touches the icon 396 (or user interface of mobile gaming device 11), or the button 398 remains activated once touched until the player makes the selection. In one example, each player is associated with a different color and, when a player touches the button 398, all icons 396 turn that color to indicate to the other players who is the active player.

In one embodiment, players that concurrently touch their buttons 398 (or user interface of mobile gaming device 11) effectively select the same icon 396 that is touched by any one of the active players. This allows the players to truly share in the same gaming experience. Each player then wins a prize as if the players separately touched the icon 396 (or user interface of mobile gaming device 11).

The players may play independently in a random order so as to play at their own comfortable rate. Any player may join the game or cash out without affecting the other players. Cash-out may be by printed ticket, chips, crediting the player's central account (if the player uses a player tracking card), or other suitable means such as NFC based credit transfer on a smart phone.

Any or all players may elect to play an individual game on a portion 399 of the large screen 390. Any game may remain as the community game or any other game, and the community game is not affected by any player choosing to play an individual game. The gaming system may adapt the community game, as needed, due to the portion 399 not being used for the community game. The player may select from a variety of games (including any community game) by touching a selection button (or user interface of mobile gaming device 11), which displays a menu of available games in the portion 399 (or on user interface of mobile gaming device 11). The player then selects any available game, such as a conventional video poker game, a conventional video reels type game, etc., and plays the game in a conventional way. Any number of players may play individual games. Even a single player may be able to player the "community game," since it is desirable that no action by any player can adversely affect another player's enjoyment of all the games offered by the gaming table 10. In one embodiment, a player playing an individual game may also simultaneously participate in a community game by selecting a community game to join.

In another embodiment, the player may choose to initiate another community game in portion 399, and additional players may elect to join the community game by menu selection (or via user interface of mobile gaming device 11). The community game screen display would then expand to the other players' locations (e.g., from 25% of the screen 18 to 50% of the screen 390). None of the players' gaming experiences are interrupted by such selections. The players may even elect to simultaneously participate in multiple community games.

Other Features

In alternative embodiments, the mobile gaming device may be connected to the gaming machine with a cable, either directly connected to a port of the gaming machine or via a network communicating with the gaming machine.

The software used to program the gaming machines and servers in accordance with the embodiments described herein may be initially stored on a ROM, such as a CD or an electronic memory device. Such CDs and devices are non-transitory computer readable mediums having the appropriate computer instructions stored thereon. The programming may also be downloaded to the gaming machines via the casino's network.

It should be appreciated that the terminals, processors, or computers described herein may be embodied in any of a number of forms, such as a rack-mounted computer, a desktop computer, a laptop computer, or a tablet computer. Additionally, a computer may be embedded in a device perhaps not generally regarded as a computer but with suitable processing capabilities, including an electronic gaming machine, a Web TV, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. As used herein, the term "online" refers to such networked systems, including computers networked using, e.g., dedicated lines, telephone lines, cable or ISDN lines as well as wireless transmissions. Online systems include remote computers using, e.g., a local area network (LAN), a wide area network (WAN), the Internet, as well as various combinations of the foregoing. Suitable user devices may connect to a network for instance, any computing device that is capable of communicating over a network, such as a desktop, laptop or notebook computer, a mobile station or terminal, an entertainment appliance, a set-top box in communication with a display device, a wireless device such as a phone or smartphone, a game console, etc. The term "online gaming" refers to those systems and methods that make use of such a network to allow a game player to make use of and engage in gaming activity through networked, or online systems, both remote and local. For instance, "online gaming" includes gaming activity that is made available through a website on the Internet.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments may provide a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine and excludes transitory signals.

The terms "program" or "software" are used herein in a generic sense to refer to any type of computer code or set of computer-executable instructions that can be employed to program a computer or other processor to implement various aspects of as discussed above. Additionally, it should be appreciated that according to one aspect of this embodiment, one or more computer programs that when executed perform methods need not reside on a single computer or processor, but may be distributed in a modular fashion amongst a number of different computers or processors to implement various aspects of embodiments described herein.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, addresses or other mechanisms that establish relationship between data elements.

Various aspects of embodiments described herein may be used alone, in combination, or in a variety of arrangements not specifically discussed in the embodiments described in the foregoing and the concepts described herein are therefore not limited in their application to the details and arrangement of components set forth in the foregoing description or illustrated in the drawings. For example, aspects described in one embodiment may be combined in any manner with aspects described in other embodiments.

Also, embodiments described herein may provide a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While embodiments have been described with reference to certain exemplary features thereof, those skilled in the art may make various modifications to the described embodiments. The terms and descriptions used herein are set forth by way of illustration only and not meant as limitations. In particular, although embodiments have been described by way of examples, a variety of devices would practice the inventive concepts described herein. Embodiments have been described and disclosed in various terms, the scope of the embodiments is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible as defined in the following claims and their equivalents.

What is claimed is:

1. A remote gaming method comprising:
   establishing a wireless communications link between a mobile gaming device operated by a player and a first gaming terminal to concurrently play one or more games, wherein the one or more games involve a plurality of players;
   providing, on a display of the mobile gaming device, a designated area assigned to the player, wherein there are additional designated areas assigned to different players;
   generating credits for the plurality of players for concurrently playing the one or more games;
   receiving a signal initiated by the player, via the mobile gaming device, that identifies the player as an active player in a first game of the one or more games;
   initiating the display of an individual game in the designated area assigned to the player as part of the first game, while the remaining players have an option to concurrently play a community game displayed on the additional designated areas;
   concurrently displaying, on the mobile gaming device, a plurality of icons in the designated area assigned to the player as part of the first game, each icon being associated with a particular wager amount, wherein the icons concurrently displayed are associated with a plurality of different wager amounts, and wherein at least some of the icons are associated with a hidden prize;
   receiving a signal identifying a particular icon being touched via the mobile gaming device;
   deducting the wager amount associated with the icon touched by the player from a bank of credits associated with the player; and
   granting any award to the player associated with the icon touched by the player.

2. The method of claim 1, wherein the particular wager amount associated with each icon is displayed on each icon.

3. The method of claim 1, wherein the particular wager amount associated with each icon is identified by one of a color or shape of each icon.

4. The method of claim 1, wherein the players may play in any sequence by any player initiating a signal that identifies the player as an active player in one of the one or more games.

5. The method of claim 1, wherein the individual game comprises another community game.

6. The method of claim 1, wherein the players may participate in multiple games displayed on different portions of a display simultaneously with different players.

7. The method of claim 1, further comprising:
   establishing a wireless communications link between a mobile gaming device operated by another player and the first gaming terminal to play at least one of the one or more games.

8. The method of claim 1, further comprising:
   providing a stationary registration terminal within a first regulated gaming venue, the registration terminal having a transceiver for communicating with the mobile gaming device, the registration terminal being connected in a network with a plurality of gaming machines including the first gaming terminal;
   establishing the wireless communication link via the registration terminal.

9. The method of claim 1, further comprising:
carrying out the first game by the first gaming terminal, including determining a final outcome of the first game and any award for the outcome; and
transmitting signals from the first gaming terminal to the mobile gaming device identifying the final outcome of the first game and the award.

10. The method of claim 1, further comprising:
detecting a selection by the player of a second game involving a plurality of players;
carrying out the second game, including determining a final outcome of the second game and any award for the outcome; and
transmitting signals to the mobile gaming device identifying the final outcome of the second game and the award.

11. The method of claim 10, wherein the second game is available to be played on a second gaming terminal, wherein the method further comprises:
establishing a wireless communications link between the mobile gaming device and the second gaming terminal;
transferring credits from the first gaming terminal to the second gaming terminal;
carrying out the second game by the second gaming terminal; and
transmitting signals by the second gaming terminal to the mobile gaming device identifying the final outcome of the second game and the award.

12. The method of claim 10, wherein the first gaming terminal and the second gaming terminal are located in different gaming venues.

13. The method of claim 10, wherein the first gaming terminal is licensed for use in a first gaming zone operated by a first operator, and the second gaming terminal is licensed for use in a second gaming zone operated by a second operator, wherein the player is located in the first gaming zone.

14. The method of claim 13, wherein at least a portion of revenue generated by the player playing the second type game is provided to the second operator.

15. The method of claim 10, further comprising:
detecting the player's real time game play;
based on detecting the player's real time game play, determining a set of recommended games available to be played on the mobile gaming device, wherein the set of recommended games comprises the second game; and
transmitting signals to the mobile gaming device identifying at least the second game of the set of recommended games.

16. The method of claim 15, further comprising applying data from the player's real time game play to an algorithm to determine that the player is a certain type of player, then selecting the set of recommended games based on the certain type of player.

17. The method of claim 15, wherein the set of recommended games is associated with a gaming model of a plurality of gaming models, and wherein the method further comprises:
detecting a threshold amount of data for the player's real time game play;
partitioning the data for the player's real time game play into a plurality of game events; and
determining that the gaming model corresponds to the one or more events of the plurality of game events.

18. The method of claim 15, wherein the set of recommended games is associated with a gaming model of a plurality of gaming models, and wherein the method further comprises:
determining each of the plurality of models from collected game play data using cluster analysis; and
associating a set of recommended games with each of the plurality of gaming models.

19. The method of claim 18, wherein the player's real time game play is associated with game factors, and wherein the gaming model comprises a collection of game factors representing a predetermined gaming and play behavior model of game player.

20. The method of claim 19, wherein the game factors comprise one or more members selected from the grouping consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

21. The method of claim 15, wherein the set of recommended games is associated with a game player type, wherein the game player type is associated with a gaming model of a plurality of gaming models, and wherein the method further comprises:
detecting a threshold amount of data for the player's real time game play;
determining the game player type based on analysis of the data for the player's real time game play; and
determining that the gaming model corresponds to the game player type.

22. The method of claim 1, wherein the mobile gaming device is automatically identified using a Near Field Communications (NFC) protocol.

23. The method of claim 1, wherein the player is playing anonymously, without the use of a player tracking card.

24. The method of claim 1, further comprising:
periodically controlling the mobile gaming device to communicate between a plurality of transceivers in a venue;
using Received Signal Strength Indicator (RSSI) level signals derived by communications with the transceivers to determine whether the mobile gaming device is within a designated area within the venue; and
if it is determined that the mobile gaming device is outside of the designated area, blocking the mobile gaming device from carrying out the first game.

25. The method of claim 24, further comprising:
transferring game assets to the mobile gaming device, wherein the game assets comprise game content for the first game; and
if it is determined that the mobile gaming device is outside of the designated area, deleting the game assets on the mobile gaming device.

26. The method of claim 24, wherein the first game comprises a wagering mode and a free mode, wherein the method further comprises:
transferring game assets to the mobile gaming device, wherein the game assets comprise game content for the first game;
carrying out, using the game assets, the first game in the wagering mode; and
if it is determined that the mobile gaming device is outside of the designated area, continuing to carry out, using the game assets, the first game in the free mode.

27. The method of claim 1, wherein the carrying out the first game by the first gaming terminal comprises displaying game animation on the mobile gaming device conveying to the player that the first game is presently occurring, and wherein the method further comprises:
in the event of a communications link failure between the mobile gaming device and the first gaming terminal during the game, prior to receiving the signals by the mobile gaming device identifying the final outcome of the game and the award but after the game animation has begun, continuing the game animation by the mobile gaming device during the communications link failure for a time until the communications link has been re-established;
once the communication link has been re-established, transmitting the signals to the mobile gaming device identifying the final outcome of the first game and the award, stopping the game animation; and
displaying, by the mobile gaming device, the final outcome of the game and the award, such that the game perceived by the player is not interrupted during the communications link failure.

28. The method of claim 1, wherein the first gaming terminal comprises a gaming program to carry out the one or more games, the gaming program comprising game inactivity rules requiring game play within a maximum allowable time to prevent a remote gaming session from being terminated, and wherein the method further comprises:
allowing the player to pause the remote gaming session by entering a command via the mobile gaming device to pause the remote gaming session for a certain time;
suspending the game inactivity rules, by the first gaming terminal, for the certain time so the remote gaming session does not terminate due to game inactivity;
receiving a first signal by the first gaming terminal indicating that the player is again using the mobile gaming device to play the first game;
re-applying the game activity rules after the first signal is received; and
terminating the gaming session if the player does not use the mobile gaming device to play the first game within the certain time.

29. The method of claim 1, wherein the first gaming machine generates video animation in an original format when displaying a first game on the display screen, wherein the method further comprises:
detecting a required video animation second format for the mobile gaming device which is different from the original format;
converting the video animation from the original format to the second format for the mobile gaming device; and
displaying the game to the player on the mobile gaming device using the second format.

30. The method of claim 1, further comprising:
collecting game play data corresponding to the player's real time game play;
determining one or more processing, storing or transmitting actions permitted on the collected game play data based on user preferences and regulatory restrictions; and
upon determining that the one or more processing, storing or transmitting actions are permitted on the collected game play data, performing the one or more processing, storing or transmitting actions that are permitted on the collected game play data.

31. A remote gaming system comprising one or more processors and one or more data storage devices storing one or more sequences of instructions which, when executed by the one or more processors, causes the one or more processors to:
establish a wireless communications link between a mobile gaming device operated by a player and a first gaming terminal to concurrently play one or more games, wherein the one or more games involve a plurality of players;
provide, on a display of the mobile gaming device, a designated area assigned to the player, wherein there are additional designated areas assigned to different players;
generate credits for the plurality of players for concurrently playing the one or more games;
receive a signal initiated by the player, via the mobile gaming device, that identifies the player as an active player in a first game of the one or more games;
initiate the display of an individual game in the designated area assigned to the player as part of the first game, while the remaining players have an option to concurrently play a community game displayed on the additional designated areas;
concurrently display, on the mobile gaming device, a plurality of icons in the designated area assigned to the player as part of the first game, each icon being associated with a particular wager amount, wherein the icons concurrently displayed are associated with a plurality of different wager amounts, and wherein at least some of the icons are associated with a hidden prize;
receive a signal identifying a particular icon being touched via the mobile gaming device;
deduct the wager amount associated with the icon touched by the player from a bank of credits associated with the player; and
grant any award to the player associated with the icon touched by the player.

32. The system of claim 31, wherein the particular wager amount associated with each icon is displayed on each icon.

33. The system of claim 31, wherein the particular wager amount associated with each icon is identified by one of a color or shape of each icon.

34. The system of claim 31, wherein the players may play in any sequence by any player initiating a signal that identifies the player as an active player in one of the one or more games.

35. The system of claim 31, wherein the individual game comprises another community game.

36. The system of claim 31, wherein the players may participate in multiple games displayed on different portions of a display simultaneously with different players.

37. The system of claim 31, wherein the one or more processors establish a wireless communications link between a mobile gaming device operated by another player and the first gaming terminal to play at least one of the one or more games.

38. The system of claim 31, further comprising:
a stationary registration terminal within a first regulated gaming venue, the registration terminal having a transceiver for communicating with the mobile gaming device, the registration terminal being connected in a network with a plurality of gaming machines including the first gaming terminal;
wherein the one or more processors establish the wireless communication link via the registration terminal.

39. The system of claim 31, wherein the one or more processors:
detect a selection by the player of a second game involving a plurality of players;
carry out the second game, including determining a final outcome of the second game and any award for the outcome; and
transmit signals to the mobile gaming device identifying the final outcome of the second game and the award.

40. The system of claim 31, wherein the second game is available to be played on a second gaming terminal, wherein the method further comprises:
establishing a wireless communications link between the mobile gaming device and the second gaming terminal;
transferring credits from the first gaming terminal to the second gaming terminal;
carrying out the second game by the second gaming terminal; and
transmitting signals by the second gaming terminal to the mobile gaming device identifying the final outcome of the second game and the award.

41. The system of claim 40, wherein the first gaming terminal and the second gaming terminal are located in different gaming venues.

42. The system of claim 40, wherein the first gaming terminal is licensed for use in a first gaming zone operated by a first operator, and the second gaming terminal is licensed for use in a second gaming zone operated by a second operator, wherein the player is located in the first gaming zone.

43. The system of claim 42, wherein at least a portion of revenue generated by the player playing the second type game is provided to the second operator.

44. The system of claim 40, wherein the one or more processors:
detect the player's real time or near real time game play;
based on detecting the player's real time game play, determine a set of recommended games available to be played on the mobile gaming device, wherein the set of recommended games comprises the second game; and
transmit signals to the mobile gaming device identifying at least the second game of the set of recommended games.

45. The system of claim 44, wherein the set of recommended games is associated with a gaming model of a plurality of gaming models, and wherein the one or more processors:
detect a threshold amount of data for the player's real time game play;
partition the data for the player's real time game play into a plurality of game events; and
determine that the gaming model corresponds to the one or more events of the plurality of game events.

46. The method of claim 44, wherein the set of recommended games is associated with a gaming model of a plurality of gaming models, and wherein the one or more processors:
determine each of the plurality of models from collected game play data using cluster analysis; and
associate a set of recommended games with each of the plurality of gaming models.

47. The method of claim 44, wherein the player's real time game play is associated with game factors, and wherein the gaming model comprises a collection of game factors representing a predetermined gaming and play behavior model of game player, wherein the game factors comprise one or more members selected from the grouping consisting of: game session length, play behavior, game behavior, game language, game location, game selection, elapsed time with one game, wagering behavior, game type, game theme, wager amounts, wager denominations, play rates, typical bonus values, game brand, prize distributions, amounts of incremental wagers, frequency of wagering, for instance the presence or absence of multiple rounds of wagering in a game, the number of rounds of wagers permitted in a game, maximum wager amounts permitted, minimum wager amounts permitted, amount of wagering, elapsed time between selected events for instance starting a new game, reaction to bonus rounds, reaction to progressive outputs, pay table features, amount of incremental wagers, frequency of wagering, elapsed time for player reaction, amount of wagering, elapsed time between wagers, frequency of player action, game rules, game complexity, ability for a player to control or have an effect on a game outcome, whether an outcome is predetermined, whether parallel wagering is provided, average game speed, average wager amounts, average wager rate, presence or frequency of bonus rounds, presence and frequency of progressive outputs, payout percentages, win rates, win percentages, loss rates, loss percentages, use of special features, frequency of use of special features, number of lines played, total amount wagered, and type of payment received.

48. The system of claim 31, wherein the mobile gaming device is automatically identified using a Near Field Communications (NFC) protocol and Received Signal Strength Indicator (RSSI) level signals.

49. The system of claim 31, wherein the one or more processors:
transfer game assets to the mobile gaming device, wherein the game assets comprise game content for the first game; and
if it is determined that the mobile gaming device is outside of the designated area, delete the game assets on the mobile gaming device.

50. The system of claim 31, wherein the one or more processors display a game animation on the mobile gaming device conveying to the player that the first game is presently occurring, and in the event of a communications link failure between the mobile gaming device and the first gaming terminal during the game, prior to receiving the signals by the mobile gaming device identifying the final outcome of the game and the award but after the game animation has begun, the one or more processors:

continue the game animation by the mobile gaming device during the communications link failure for a time until the communications link has been re-established;

once the communication link has been re-established, transmit the signals to the mobile gaming device identifying the final outcome of the first game and the award and stop the game animation; and trigger display, by the mobile gaming device, the final outcome of the game and the award, such that the game perceived by the player is not interrupted during the communications link failure.

51. The system of claim 31, wherein the first gaming terminal comprises a gaming program to carry out the one or more games, the gaming program comprising game inactivity rules requiring game play within a maximum allowable time to prevent a remote gaming session from being terminated, and wherein the one or more processors:

allow the player to pause the remote gaming session by entering a command via the mobile gaming device to pause the remote gaming session for a certain time;

suspend the game inactivity rules, by the first gaming terminal, for the certain time so the remote gaming session does not terminate due to game inactivity;

receive a first signal by the first gaming terminal indicating that the player is again using the mobile gaming device to play the first game;

re-apply the game activity rules after the first signal is received; and terminate the gaming session if the player does not use the mobile gaming device to play the first game within the certain time.

52. The system of claim 31, wherein the first gaming machine generates video animation in an original format when displaying a the first game on the display screen, wherein the one or more processors:

detect a required video animation second format for the mobile gaming device which is different from the original format;

convert the video animation from the original format to the second format for the mobile gaming device; and display the game to the player on the mobile gaming device using the second format.

53. The system of claim 31, wherein the one or more processors:

collect game play data corresponding to the player's real time game play;

determine one or more processing, storing or transmitting actions permitted on the collected game play data based on user preferences and regulatory restrictions; and upon determining that the one or more processing, store or transmit actions are permitted on the collected game play data, performing the one or more processing, storing or transmitting actions that are permitted on the collected game play data.

54. A non-transitory computer-readable storage medium storing one or more sequences of instructions which, when executed by one or more processors, causes the one or more processors to perform a method of remote gaming, the method comprising:

establishing a wireless communications link between a mobile gaming device operated by a player and a first gaming terminal to concurrently play one or more games, wherein the one or more games involve a plurality of players;

providing, on a display of the mobile gaming device, a designated area assigned to the player, wherein there are additional designated areas assigned to different players;

generating credits for the plurality of players for concurrently playing the one or more games;

receiving a signal initiated by the player, via the mobile gaming device, that identifies the player as an active player in a first game of the one or more games;

initiating the display of an individual game in the designated area assigned to the player as part of the first game, while the remaining players have an option to concurrently play a community game displayed on the additional designated areas;

concurrently displaying, on the mobile gaming device, a plurality of icons in the designated area assigned to the player as part of the first game, each icon being associated with a particular wager amount, wherein the icons concurrently displayed are associated with a plurality of different wager amounts, and wherein at least some of the icons are associated with a hidden prize;

receiving a signal identifying a particular icon being touched via the mobile gaming device;

deducting the wager amount associated with the icon touched by the player from a bank of credits associated with the player; and granting any award to the player associated with the icon touched by the player.

* * * * *